US010619382B2

(12) United States Patent
Waugh et al.

(10) Patent No.: US 10,619,382 B2
(45) Date of Patent: Apr. 14, 2020

(54) KEYLESS LOCK SYSTEM

(71) Applicant: Pacific Lock Company, Valencia, CA (US)

(72) Inventors: Gregory Waugh, Stevenson Ranch, CA (US); Matthew Watson Yuen, Los Angeles, CA (US); Joshua Fleagane, Pasadena, CA (US)

(*) Notice: Subject to any disclaimer, the term of this patent is extended or adjusted under 35 U.S.C. 154(b) by 16 days.

(21) Appl. No.: 15/444,207

(22) Filed: Feb. 27, 2017

(65) Prior Publication Data

US 2017/0247914 A1  Aug. 31, 2017

Related U.S. Application Data

(60) Provisional application No. 62/301,533, filed on Feb. 29, 2016.

(51) Int. Cl.
| | | |
|---|---|---|
| E05B 47/06 | (2006.01) | |
| E05B 65/48 | (2006.01) | |
| E05B 65/52 | (2006.01) | |
| E05B 65/00 | (2006.01) | |
| E05B 67/38 | (2006.01) | |
| E05B 67/36 | (2006.01) | |
| E05B 17/20 | (2006.01) | |

(Continued)

(52) U.S. Cl.
CPC .......... *E05B 65/48* (2013.01); *E05B 17/2084* (2013.01); *E05B 47/026* (2013.01); *E05B 47/0603* (2013.01); *E05B 65/0075* (2013.01); *E05B 65/52* (2013.01); *E05B 67/36* (2013.01); *E05B 67/383* (2013.01); *E05B 81/08* (2013.01); *E05B 83/04* (2013.01); *B60R 25/24* (2013.01); *B60R 2325/205* (2013.01); *E05B 2017/2096* (2013.01); *E05B 2047/0095* (2013.01); *E05B 2067/386* (2013.01)

(58) Field of Classification Search
CPC ...... E05B 83/04; E05B 81/08; E05B 47/0603; E05B 2047/0095; E05B 65/48; E05B 65/52; E05B 65/0075; E05B 67/383; E05B 67/36; E05B 17/2084; E05B 47/026; E05B 2017/2096; E05B 2067/386; B60R 2325/205; B60R 25/24
USPC .... 70/95–100, DIG. 11, 278.1, 278.7, 279.1, 70/283; 292/DIG. 36, DIG. 46
See application file for complete search history.

(56) References Cited

U.S. PATENT DOCUMENTS

| | | |
|---|---|---|
| 695,347 A | 3/1902 | Soley |
| 1,490,987 A | 4/1924 | Soref |

(Continued)

FOREIGN PATENT DOCUMENTS

| | | | |
|---|---|---|---|
| WO | WO 2012/054839 | 4/2012 | |
| WO | WO 2012/054839 A1 | 4/2012 | |
| WO | WO 2012054839 A1 | 4/2012 | ........... E05B 67/383 |

OTHER PUBLICATIONS

Brouchure—4000D-X Dry Van Series; Utitlity Manurfacturing Company; 2005;.

(Continued)

*Primary Examiner* — Lloyd A Gall
(74) *Attorney, Agent, or Firm* — Peter Ganjian; Patent Law Agency, LLC

(57) ABSTRACT

The present invention discloses a lock system, comprising a lock assembly that includes a hasp and an interlock mechanism detachably engaging with the hasp. Further included is a latch system that latches the interlock mechanism in a lock position.

6 Claims, 93 Drawing Sheets

(51) Int. Cl.
　　*E05B 47/02*　　(2006.01)
　　*E05B 81/08*　　(2014.01)
　　*E05B 83/04*　　(2014.01)
　　*B60R 25/24*　　(2013.01)
　　*E05B 47/00*　　(2006.01)

(56) References Cited

U.S. PATENT DOCUMENTS

| | | | |
|---|---|---|---|
| 1,564,463 A | 12/1925 | Ellison | 70/380 |
| 1,788,396 A | 4/1928 | Johnson | |
| 1,921,434 A | 8/1933 | Stone | B62D 43/007 70/14 |
| 2,460,615 A | 2/1949 | Andrew | 70/369 |
| 3,143,872 A | 8/1964 | Check | 70/38 A |
| 3,172,279 A | 3/1965 | Patriquin | 70/38 A |
| 3,404,549 A | 10/1968 | Best | |
| 3,690,130 A | 9/1972 | Eutzler | E05B 69/006 211/4 |
| 3,817,062 A | 6/1974 | Randel | |
| 3,820,360 A | 6/1974 | Best | |
| 3,882,699 A | 5/1975 | Flack et al. | 70/38 A |
| 3,901,058 A | 8/1975 | Best | |
| 3,996,774 A | 12/1976 | Best | |
| 4,068,510 A | 1/1978 | Neary | 70/379 R |
| 4,075,878 A | 2/1978 | Best | 70/49 |
| 4,102,161 A | 7/1978 | Proefrock | |
| 4,109,496 A | 8/1978 | Allemann et al. | 70/380 |
| 4,112,716 A | 9/1978 | Wippich | E05B 67/003 70/38 C |
| 4,228,669 A | 10/1980 | Bischoff | 70/379 R |
| 4,254,648 A | 3/1981 | Dietrich | 70/380 |
| 4,328,690 A | 5/1982 | Oliver | 70/369 |
| 4,347,720 A | 9/1982 | Kenyon | E05B 67/003 70/14 |
| 4,570,466 A * | 2/1986 | Matthews | E05B 47/0002 292/150 |
| 4,672,828 A | 6/1987 | Theriault | |
| 4,793,166 A | 12/1988 | Marks | |
| 4,926,670 A | 5/1990 | Deforrest, Sr. | 70/374 |
| 5,063,764 A * | 11/1991 | Amis | E05C 3/045 292/207 |
| 5,083,122 A * | 1/1992 | Clark | E05B 47/0012 340/5.22 |
| 5,121,618 A | 6/1992 | Scott | 70/367 |
| 5,127,244 A | 7/1992 | Myers | |
| 5,174,136 A | 12/1992 | Thwing | 70/38 A |
| 5,179,901 A * | 1/1993 | Adcock | E05G 1/06 109/45 |
| 5,193,372 A | 3/1993 | Sieg et al. | 70/369 |
| D336,030 S | 6/1993 | Falk et al. | |
| 5,233,851 A | 8/1993 | Florian | |
| 5,345,794 A | 9/1994 | Jenks | |
| 5,361,611 A | 11/1994 | Hisler | A01K 97/00 211/4 |
| 5,532,521 A * | 7/1996 | Leininger | B60P 3/03 307/10.2 |
| 5,765,408 A | 6/1998 | Sanseverino | B60R 25/02147 70/14 |
| 5,878,604 A | 3/1999 | Stone | E05B 13/002 292/148 |
| 6,005,306 A | 12/1999 | Pickard | |
| 6,009,731 A | 1/2000 | Emmons et al. | |
| 6,109,080 A | 8/2000 | Chen et al. | |
| 6,146,356 A | 11/2000 | Wang et al. | 604/96.01 |
| 6,233,984 B1 | 5/2001 | Blehi, III | |
| 6,317,025 B1 * | 11/2001 | Leon | G07C 1/32 235/380 |
| 6,338,261 B1 | 1/2002 | Liu | E05B 67/36 70/14 |
| 6,374,653 B1 | 4/2002 | Gokcebay et al. | |
| 6,425,274 B1 | 7/2002 | Laitala et al. | 70/394 |
| 6,467,317 B1 | 10/2002 | Hillabush | B60D 1/60 280/507 |
| 6,581,419 B1 | 6/2003 | Strodtman | |
| 6,606,890 B1 | 8/2003 | Widen | |
| 6,609,739 B1 | 8/2003 | Avganim | E05B 67/36 292/288 |
| 6,634,196 B2 | 10/2003 | Huang | |
| 6,758,075 B1 | 7/2004 | Thwing | 70/389 |
| 6,766,671 B2 | 7/2004 | Haczynski et al. | 70/23 |
| 6,854,303 B2 | 2/2005 | Shiao | E05B 67/38 70/2 |
| 6,883,356 B1 | 4/2005 | Wu | 70/379 R |
| 6,915,670 B2 | 7/2005 | Gogel | E05B 13/001 292/148 |
| 6,948,345 B1 | 9/2005 | Ruan | 70/370 |
| RE38,832 E | 10/2005 | Thwing | |
| 6,989,732 B2 * | 1/2006 | Fisher | G07C 9/00103 109/45 |
| 7,003,994 B2 | 2/2006 | Ruan | 70/416 |
| 7,047,774 B1 | 5/2006 | Gogel | 70/32 |
| 7,066,500 B2 * | 6/2006 | Haber | E05B 17/2038 292/106 |
| 7,278,284 B1 | 10/2007 | James | E05B 13/002 292/205 |
| 7,412,855 B2 | 8/2008 | Dolev | E05B 9/08 70/11 |
| 7,543,466 B2 | 6/2009 | Loughlin et al. | |
| 7,770,422 B1 | 8/2010 | Sierra | E05B 67/36 70/2 |
| 7,836,736 B2 | 11/2010 | Humphris | |
| 7,946,142 B2 | 5/2011 | Matyko | E05B 67/36 292/302 |
| 8,004,393 B2 | 8/2011 | Haber | |
| 8,281,624 B2 | 10/2012 | Rizzi | E05B 73/0017 211/7 |
| 8,353,189 B2 * | 1/2013 | Bogdanov | E05B 47/0692 70/278.3 |
| 8,495,898 B2 * | 7/2013 | Gokcebay | G07C 9/00666 70/214 |
| 8,516,864 B2 * | 8/2013 | Greiner | B62B 3/1404 292/201 |
| 8,677,792 B2 * | 3/2014 | Wheeler | E05B 17/0058 70/218 |
| 8,776,557 B2 | 7/2014 | Wang | |
| 8,833,118 B1 * | 9/2014 | McLane | E05C 1/08 70/85 |
| 8,935,944 B2 | 1/2015 | Boesel | E05B 55/48 292/285 |
| 8,938,998 B2 | 1/2015 | Haber | |
| 8,978,426 B2 | 3/2015 | Wang | |
| 9,212,508 B2 | 12/2015 | Loughlin | E05B 67/003 |
| 10,107,008 B2 | 10/2018 | Waugh et al. | |
| 2004/0083777 A1 | 5/2004 | Vito | |
| 2004/0093914 A1 | 5/2004 | Vito | |
| 2004/0144141 A1 | 7/2004 | Ng | |
| 2004/0221626 A1 | 11/2004 | Palzkill et al. | |
| 2004/0244442 A1 | 12/2004 | Shiao et al. | |
| 2005/0199027 A1 | 9/2005 | Mannella | |
| 2005/0252257 A1 | 11/2005 | Woods | E05B 67/04 70/33 |
| 2006/0144100 A1 | 7/2006 | Thomsen | E05B 83/12 70/2 |
| 2006/0236730 A1 | 10/2006 | Wyers | B60D 1/065 70/14 |
| 2008/0105004 A1 | 5/2008 | Wang | E05B 57/36 70/2 |
| 2008/0105005 A1 | 5/2008 | Wang | E05B 57/38 70/32 |
| 2011/0316291 A1 | 12/2011 | Loughlin | E05B 13/001 292/101 |
| 2012/0011682 A1 | 1/2012 | Boonstra | E05B 67/383 16/384 |
| 2012/0210754 A1 | 8/2012 | Thomsen | E05B 13/002 70/14 |
| 2013/0276488 A1 | 10/2013 | Haber | |
| 2014/0223974 A1 | 8/2014 | Dolev | E05B 67/36 70/14 |

(56) References Cited

U.S. PATENT DOCUMENTS

2015/0075231 A1    3/2015    Waugh .................... E05B 67/36
                                                        70/2

OTHER PUBLICATIONS

Brouchure—The Enforcer High Security Locking Systems; Cargoard 8075 ; Transport Security, Inc. www.transportsecurity.comk.

Polar Steel Cam Type Clok on; Polar Hardware Manuractuirng Co., Inc. ;www.polarmfg.com ;.

Photo of Pad Lock—1;.

Photo of Pad Lock—2;.

THPXL Internal Shackle Door Lock; www.trimaxlocks.com ;.

U.S. Appl. No. 11/907,149, filed Oct. 10, 2007 ; File History;.

U.S. Appl. No. 14/718,023 Office Action dated Sep. 11, 2017;.

Johnson, Gale, Xperinetix Has a Better Idea, The Locksmith Ledger. Dec. 2000, 5 pages, San Diego, CA.

Letter from Mr. John Ulaszek to Mr. Gregory Waugh, President of Pacific Lock Company, the Assignee of the current application, 3 pages, Jan. 22, 2007.

Letter from Mr. John Ulaszek to Mr. Gregory Waugh, President of Pacific Lock Company, the Assignee of the current application, 3 pages, Feb. 9, 2007.

Provisional application cover sheet for U.S. Appl. No. 60/220,416, filed Jul. 24, 2000 and an attached page with a figure.

Security Padlock Uses IC Core Cylinders, Gale Johnson, Locksmith Ledger, vol. 60, No. 13 (4 pages).

Pacific Lock, Gregory B. Waugh, The National Locksmith, Jan. 2006, 6 pages.

Pacific Lock Introduces the World's First Hockey-Pucks for SFIC's and Kik Cylinders, The National Locksmith, Jan. 2007, 6 pages.

Lynk, William M., "Interchangeable Cores Small Format," The National Locksmith, 2000, 44 pages.

Digital Seal From Babaco; www.babaco.com ; 2011;.

Truk Lok III ; www.babaco.com ; 2011 ;.

Truk Lok II ; www.babaco.com ; Jul. 29, 2013 ;.

Lock-Style Pull Solenoid—12VDC ; https://www.adafruit.com/product/1512 ; https://www.youtube.com/watch?v=92kwSeiwl3U; 2013.

Lockitron Motoorized Door Lock Body; https://www.adafruit.com/product/2579 ; 2011.

* cited by examiner

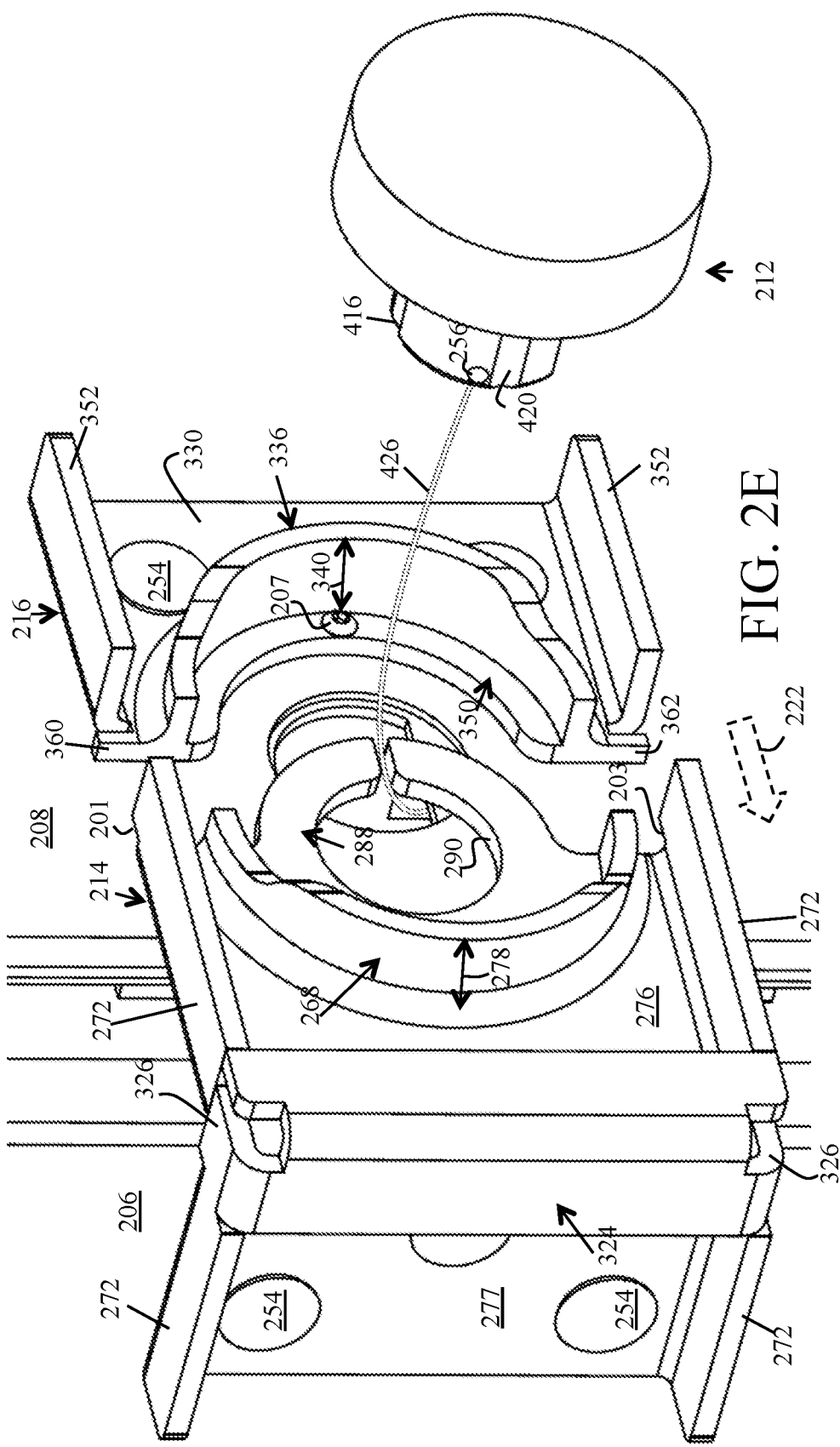

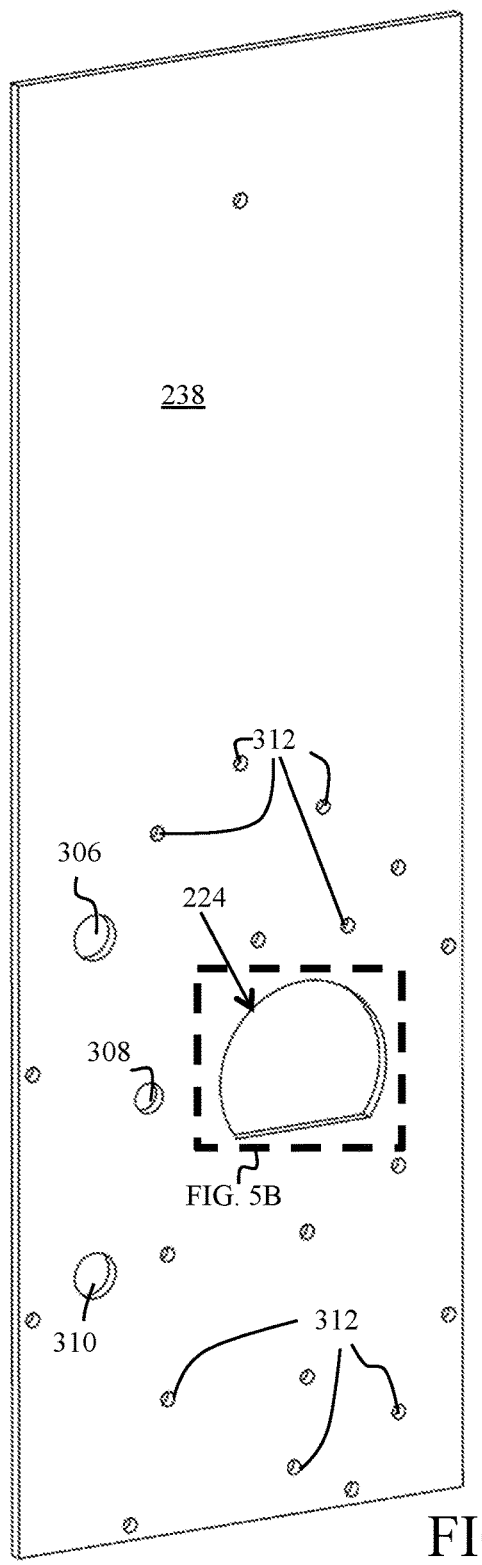
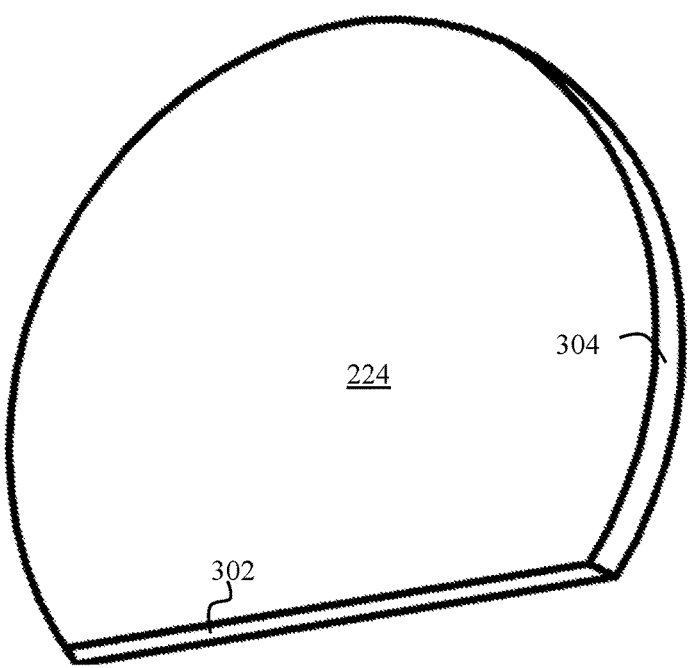
FIG. 5A
FIG. 5B

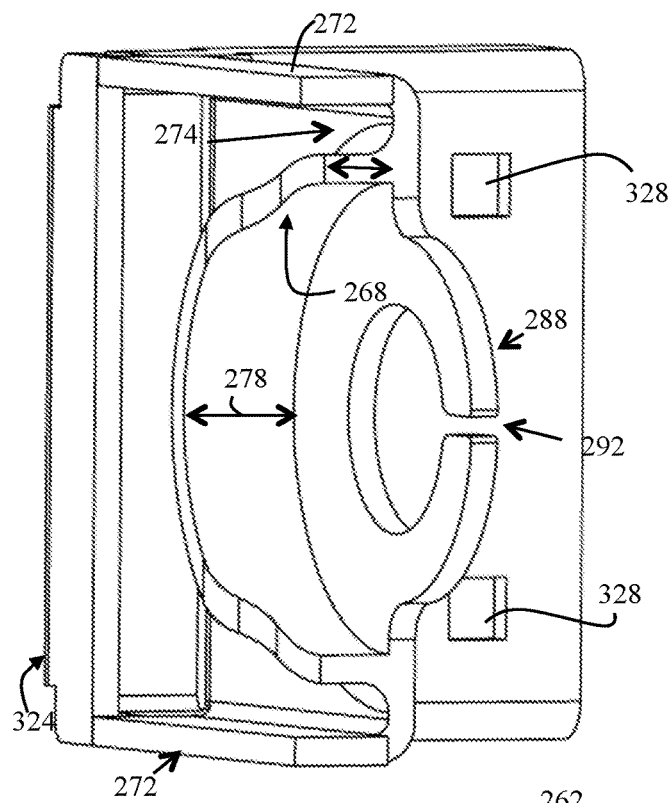
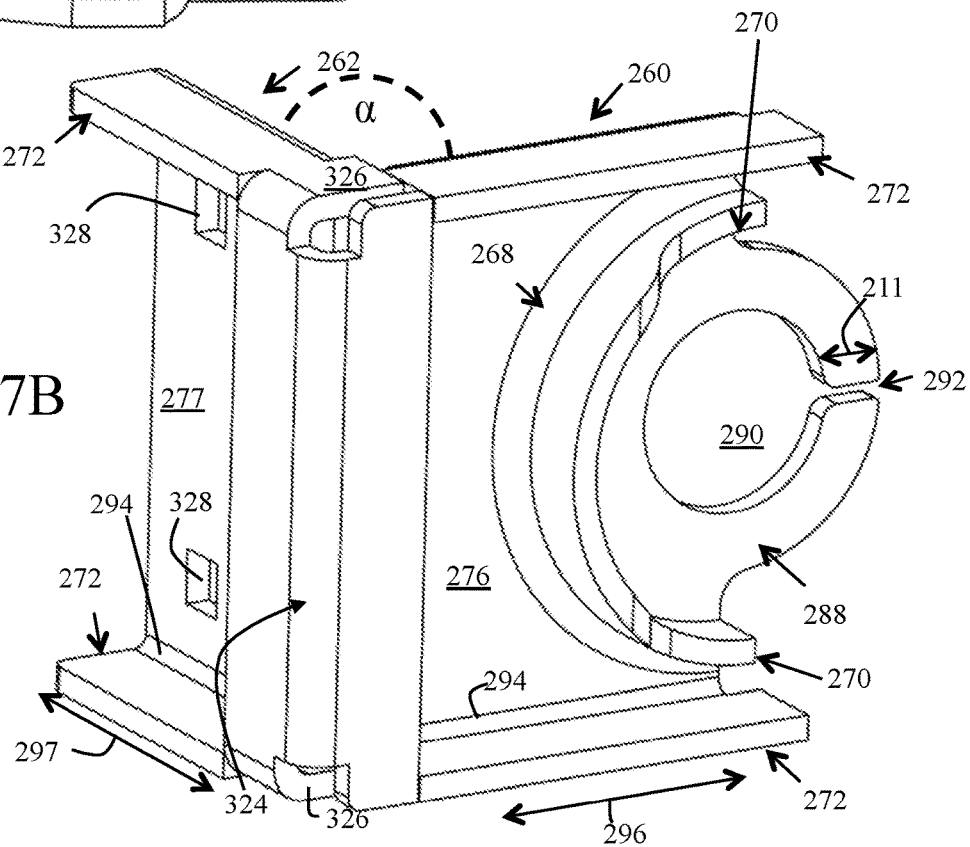
FIG. 7A
FIG. 7B

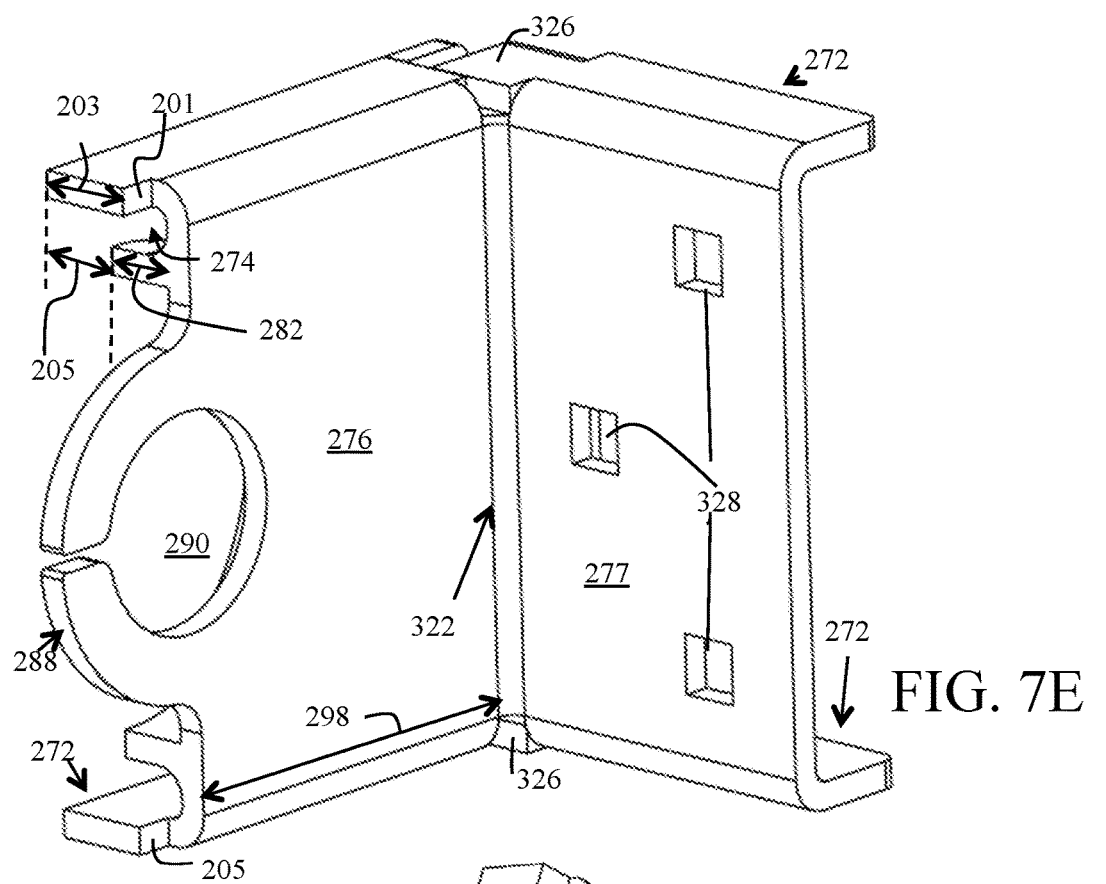
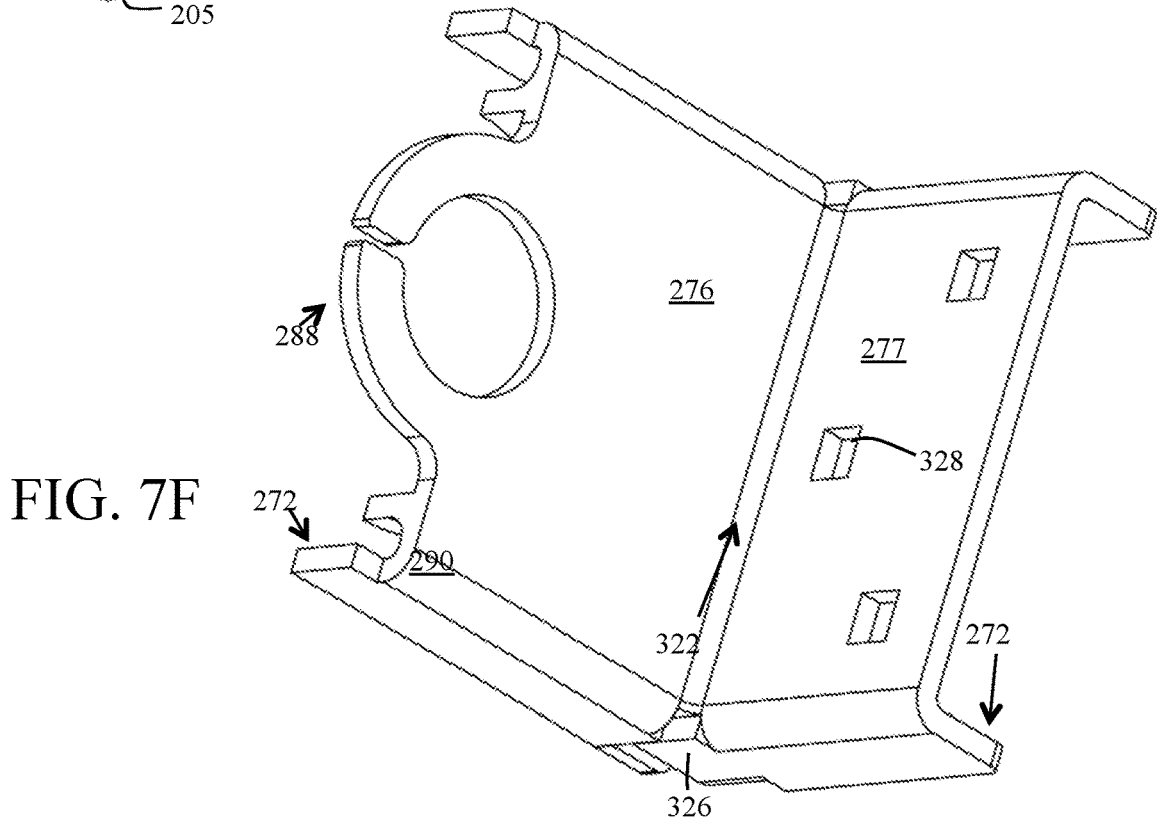

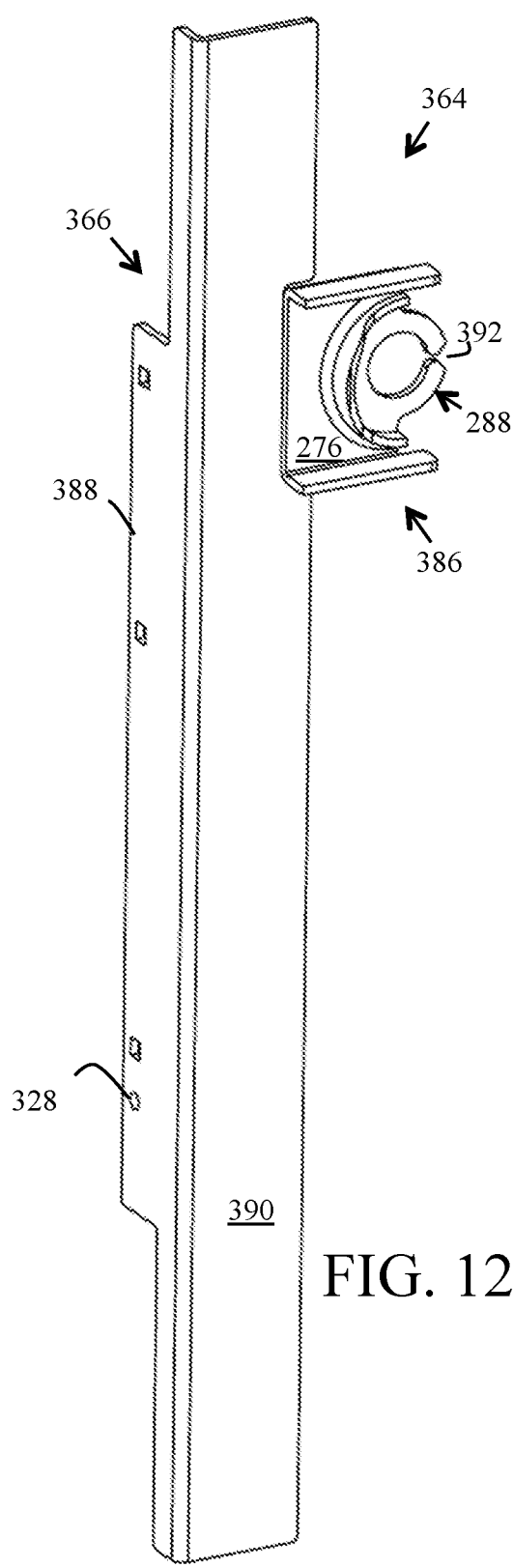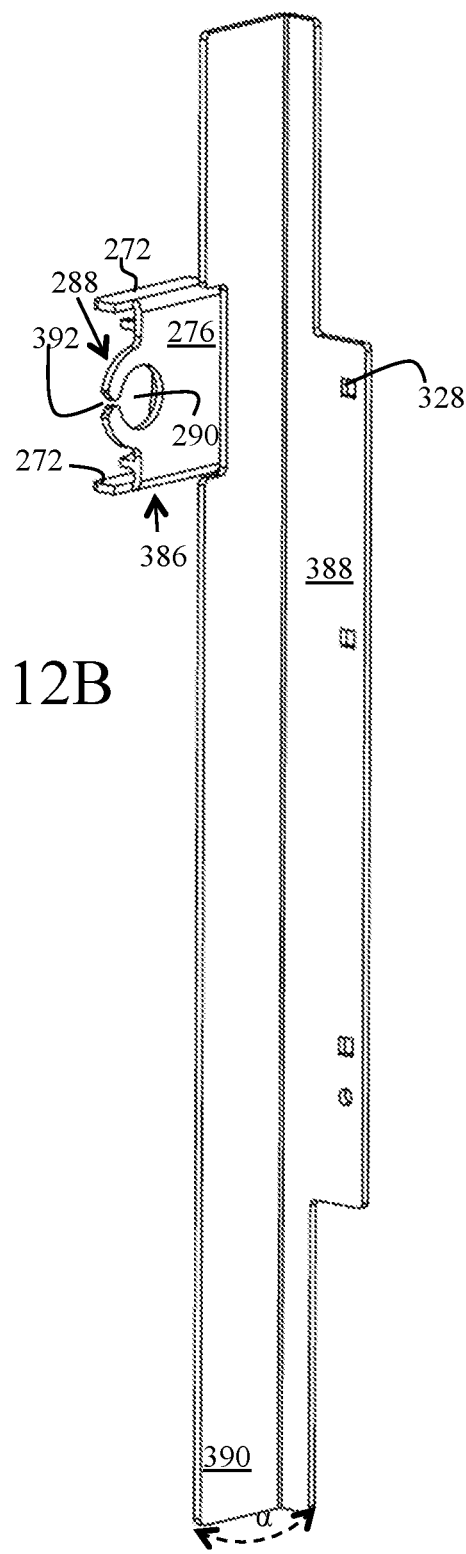
FIG. 12A
FIG. 12B

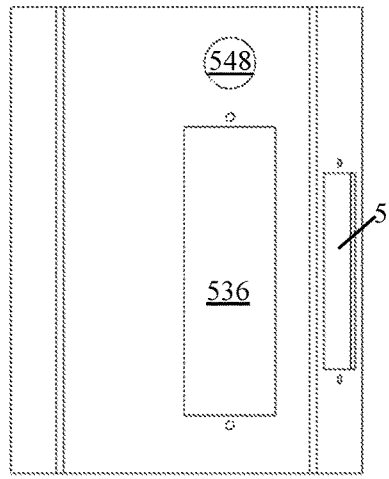
FIG. 23I
FIG. 23J
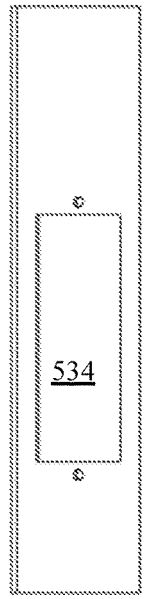
FIG. 23K
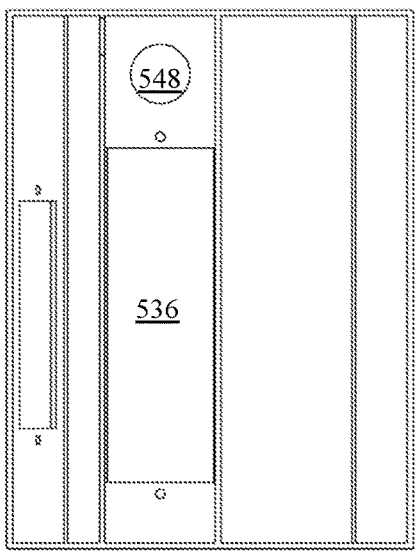
FIG. 23L
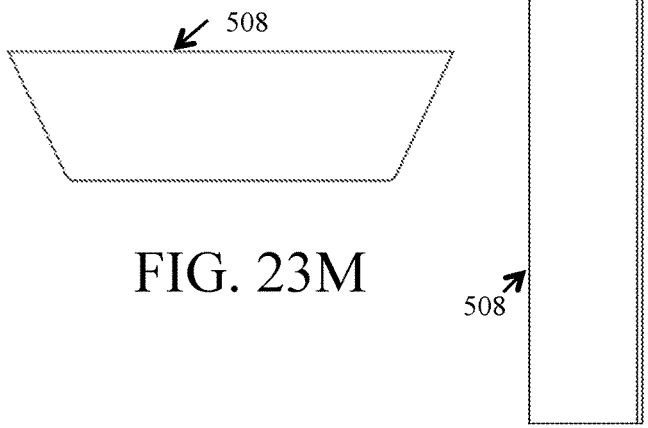
FIG. 23M
FIG. 23N

KEYLESS LOCK SYSTEM

CROSS-REFERENCE TO RELATED APPLICATIONS

This Application claims the benefit of priority of co-pending U.S. Utility Provisional Patent Application 62/301,533, filed 29 Feb. 2016, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention are related to keyless lock system.

Description of Related Art

Most enclosures such as cargo doors, cabinet doors, safety box, or lockbox door, etc. are secured by a lock assembly, which may include a conventional hasp assembly where a conventional lock device such as a conventional padlock may be mounted onto the hasp assembly to lock and prevent access to an enclosed area. A non-limiting example of a padlock may be a hidden shackle lock, also known as "hockey puck" padlock.

Combination of hockey puck padlock and hasp assembly offers security solution that unfortunately, requires the use of physical, mechanical keys to lock and unlock. Use of physical, mechanical keys to lock or unlock is disadvantageous, requiring complex key management and key control. This is especially true for organizations with large number of enclosures to secure, which are also physically spread across a wide geographic area.

A further disadvantage of security solutions that use physical, mechanical keys are that they are susceptible to a direct, forced entry attack on a key-cylinder of the padlock (which is exposed), which is a major security flaw. For example, using a hand drill, the (commonly) brass key-cylinder may be drilled out of the padlock with relative ease. With the key-cylinder drilled out, the shackle may be rotated and released from the padlock.

Accordingly, in light of the current state of the art and the drawbacks to current lock devices mentioned above, a need exists for a keyless lock system that would provide a low cost, but high security solution that is difficult to tamper and defeat using a keyless lock assembly that may include a hasp assembly and a keyless lock mechanism, that would not require a physical, mechanical key and hence, would not require or need an associated key-cylinder to lock or unlock.

BRIEF SUMMARY OF THE INVENTION

A non-limiting, exemplary aspect of an embodiment of the present invention provides a lock system, comprising:
a lock assembly that includes:
a hasp; and
an interlock mechanism detachably engaging with the hasp; and
a latch system that latches the interlock mechanism in a lock position.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

One or more embodiments of the present invention provide a keyless lock system that is a low cost, but high security solution that is difficult to tamper and defeat that uses keyless lock assembly that includes a hasp assembly and a keyless lock mechanism and that does not require a physical, mechanical key and hence, does not have an associated key-cylinder to lock or unlock. Accordingly, keyless lock system in accordance with one or more embodiments of the present invention lack the inherent attack point, which is the key-cylinder that is exposed even for "hockey puck" type locks.

The present invention defines a "hasp" as a plate (generally made of metal) that may be comprised of a single piece or multiple pieces that is adapted to be fastened to a barrier (e.g., door, lid, etc.) and further adapted to receive an interlock mechanism for locking the barrier.

Figure 1:
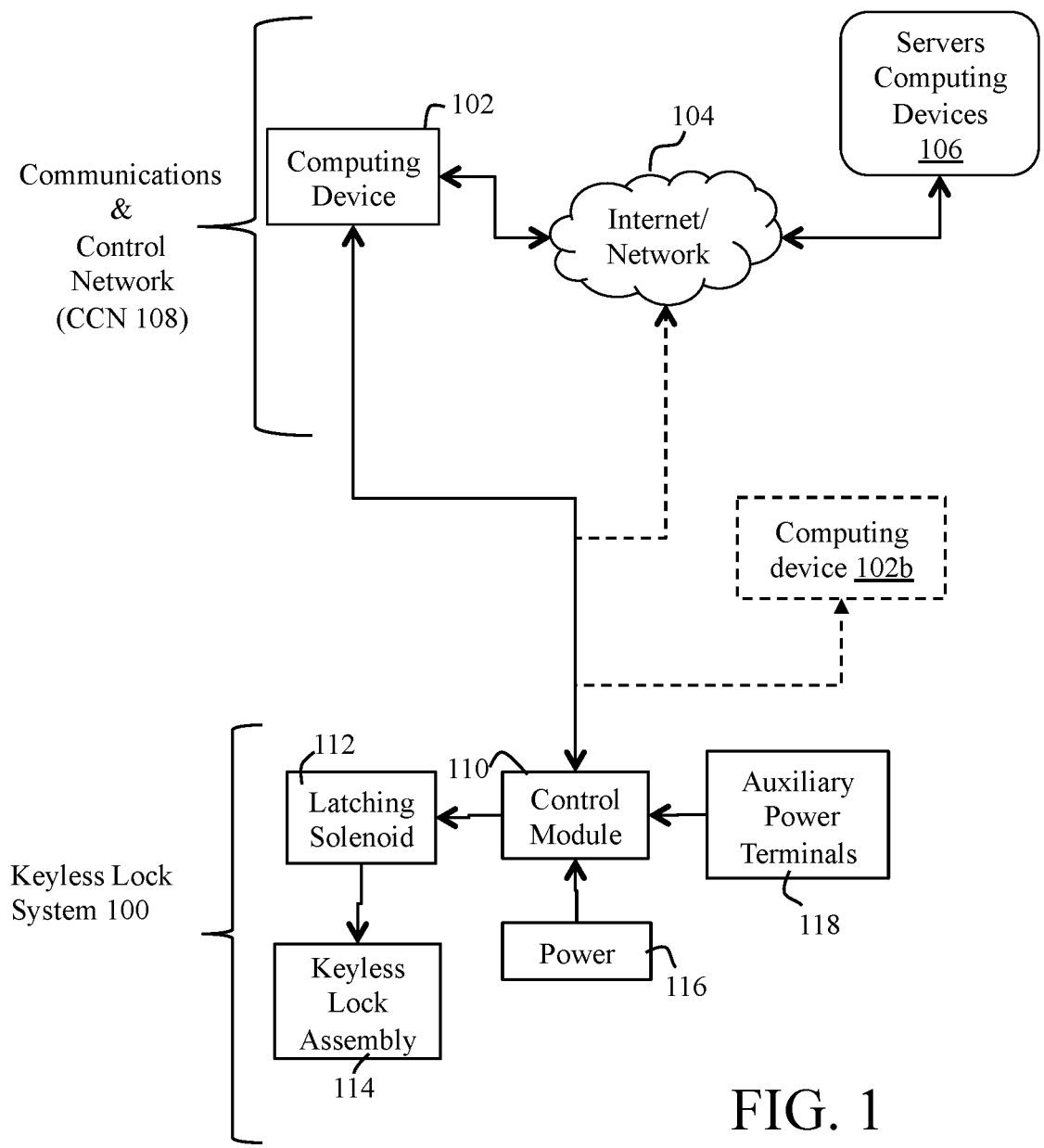
FIG. 1 is a non-limiting, exemplary illustration of a general overview of non-limiting, exemplary network system architecture for implementing one or more embodiments of the present invention.

FIG. 1 is a non-limiting, exemplary illustration of a general overview of non-limiting, exemplary network system architecture for implementing one or more embodiments of the present invention. As indicated above, keyless lock system 100 is a network-enabled unit that may be networked through a well known Communications and Control Network (CCN) 108 via a computing device 102 for keyless operation of the keyless lock system 100.

As illustrated, a non-limiting, exemplary method of implementing a networking system architecture for CCN 108 is to provide one or more well-known Internet enabled computing devices 102 (e.g., laptop, mobile devices such as Smartphone, etc.) that may be networked with one or more well-known servers 106 via well known Internet/Network 104 that may communicate with a well known control module 110 of keyless lock system 100.

Server computing devices 106 and computing devices 102 are well known devices extensively used for networking. Network/Internet 104 may be any one of a number of conventional, well-known network systems that may include functionalities for packaging data in well-known methodologies into one or more formats (of one or more packets) suitable for communications between networked devices.

It should be noted that any one of the one or more embodiments of the present invention may be implemented in other well known types of system architecture (or processing environments capable of supporting the methodologies of the various embodiments of the present invention) such as, for example, peer-to-peer architecture, client/server, hybrid of both, etc. Client/server, peer-to-peer, or hybrid combination environments, database and or application servers, and networks or networking in general, including a large variety of protocols used for communication and control, translations of signals, and so on are very well documented in various technical, trade, and patent literature.

Further, it should be noted that any one of the one or more embodiments of the present invention may also be implemented as a standalone device. As a non-limiting example, a computing device 102b (shown in broken dashed line) such as a mobile computing device such as a Smartphone may optionally directly communicate with the well known, conventional control module 110 (e.g., a Bluetooth module, Near Field Communications (NFC) module, WiFi module, etc.) of keyless lock system 100 without the need or requirement of CCN 108.

Whether networked or standalone, upon receipt of unlock transmission signal (i.e., data packet recognized by control module 110), a well known latching solenoid 112 is actuated from a latched position to an unlatched position, which would enable a user (as detailed below) to actuate keyless lock assembly 114 from a lock position to an unlock position. In other words, control module 110 transmits an electrical signal (e.g., a 12 V signal) for actuating latching solenoid 112. It should be noted that various well known and well documented communications protocols may be used between the computing device 102 and control module 110, non-limiting examples of which may include Bluetooth, NFC, WiFi, etc., which may optionally include well known existing encryption technologies, etc.

Power 116 to control module 110 may be provided by a variety of power systems, non-limiting examples of which may include one or more Alternative Current (AC) sources, Direct Current (DC) sources such as one or more batteries, combinations of both, including use of well known uninterruptible power supply (UPS) systems. In general, latching solenoid 112 may include a latch member driven by a solenoid. Further, the manner of delivery of power to latching solenoid for operation and control may be accomplished by a variety of mechanisms or systems, including wired, wireless, network based, etc. For example, well known computing devices (e.g., a mobile computing device such as a mobile phone) using well known Bluetooth, Near Field Communication (NFC), or other well known technologies (e.g., location based systems) may be used to activate a control module to power latching solenoid, which would provide a keyless (wired or wireless) operation. For example, keyless lock system 100 in accordance with one or more embodiments of the present invention may comprise of a well known Bluetooth module powered by an internal battery or other power source that may receive control signals from a mobile device in well known manner to enable supply of power to latching solenoid.

Optionally, a set of external auxiliary power terminals 118 (detailed below) may also be provided to directly power control module 110 in case of complete failure of power 116 (including UPS systems). For example, set of external auxiliary power terminals 118 may be directly wire connected from terminals 118 to control module 110, with terminals 118 outside the enclosure capable of receiving a non-limiting, exemplary terminals of a battery to power ON control module 110. Once powered ON, control module 110 would be able to receive control signals/data from the computing device 102 to actuate latching solenoid 112.

FIGS. 2A to 2F are non-limiting, exemplary illustrations of a keyless lock system mounted onto a non-limiting, exemplary cabinet in accordance with one or more embodiments of the present invention, which also progressively illustrate a systems overview of a non-limiting, exemplary method of unlocking and opening a cabinet door from a fully closed and locked position (FIGS. 2A) to a fully open position (FIG. 2F) in accordance with one or more embodiments of the present invention.

Figure 2A:
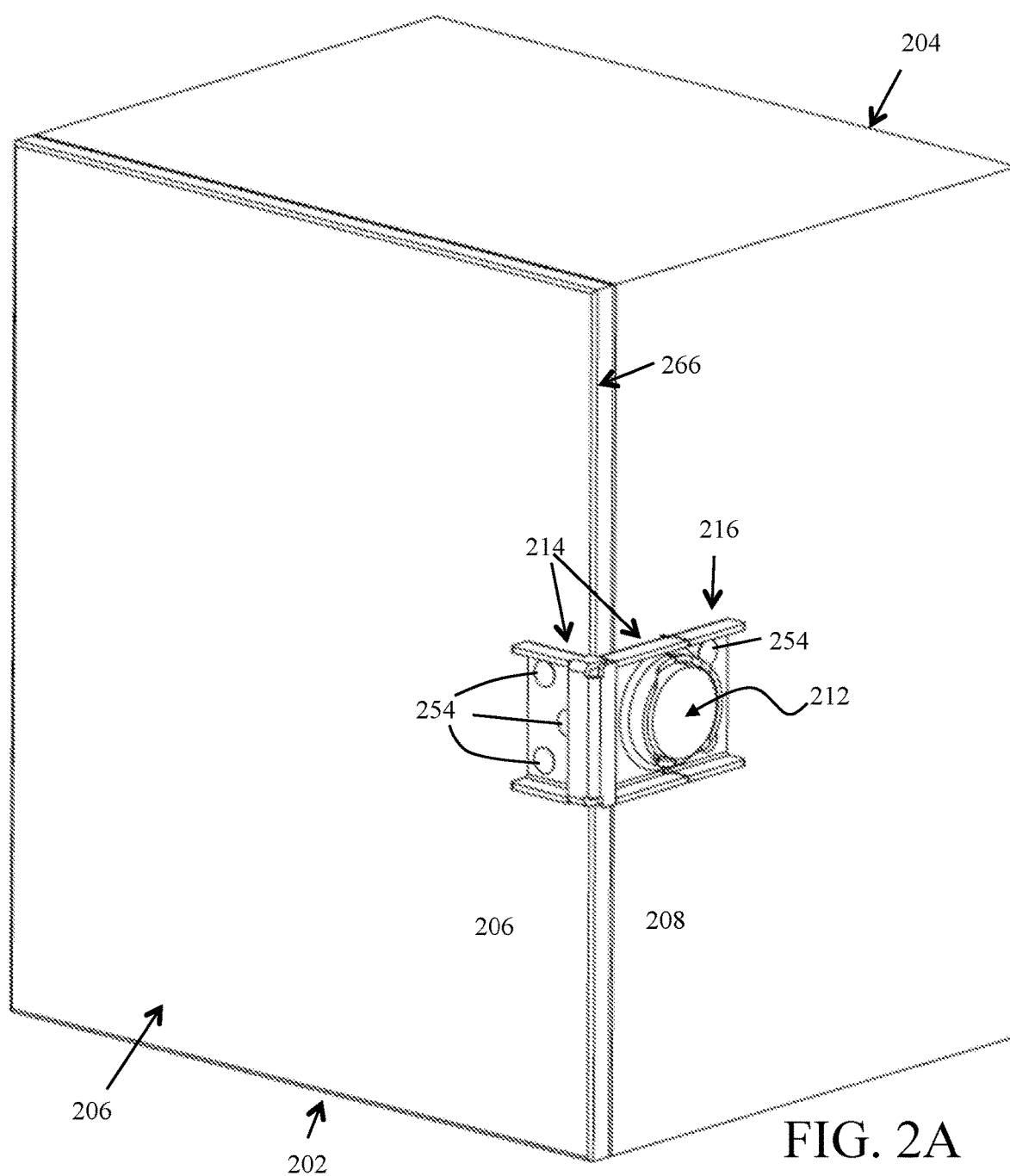
FIGS. 2A to 7R are non-limiting, exemplary illustrations of a keyless lock system in accordance with one or more embodiments of the present invention.
Figure 2B:
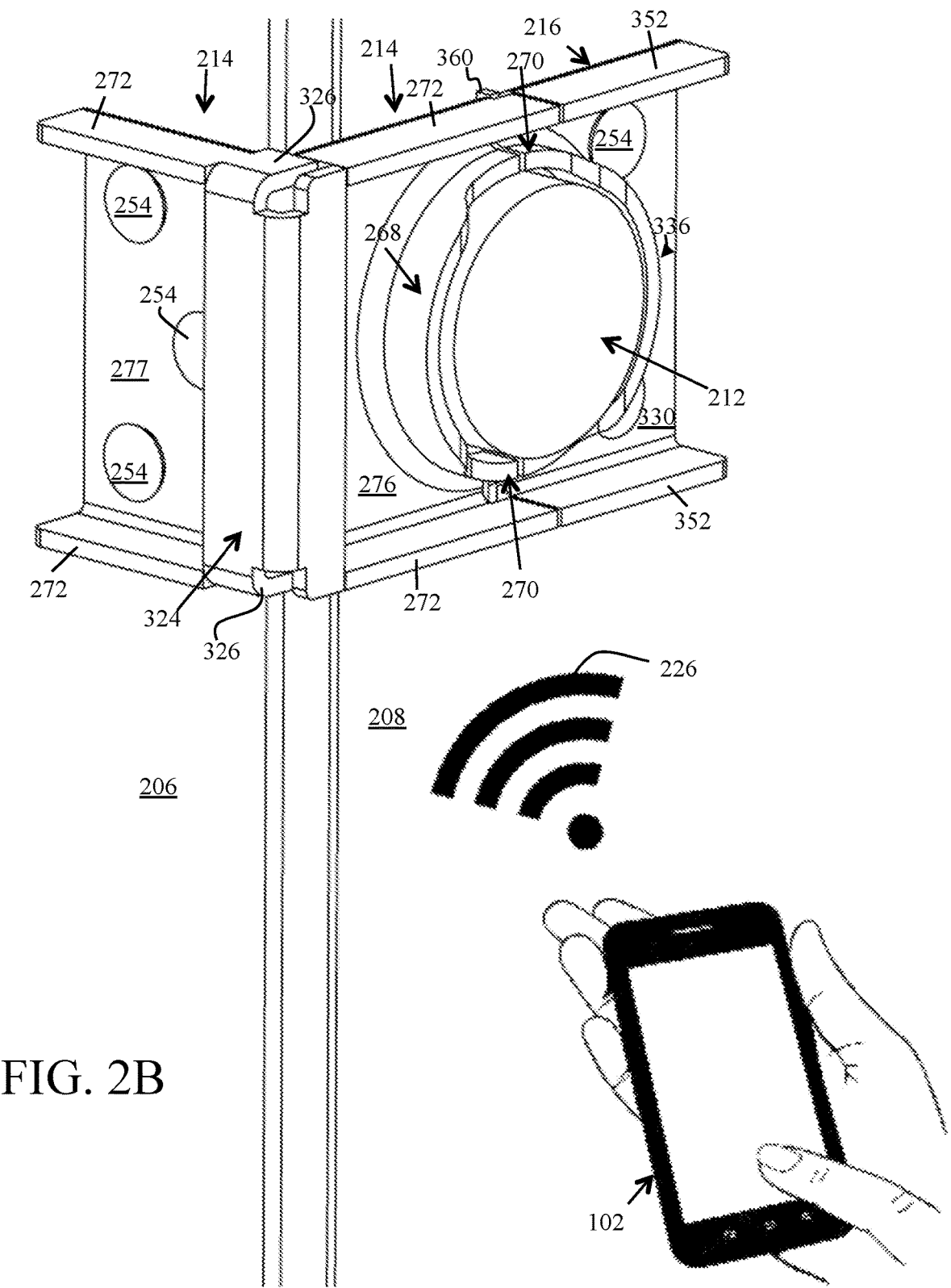
Figure 2C:
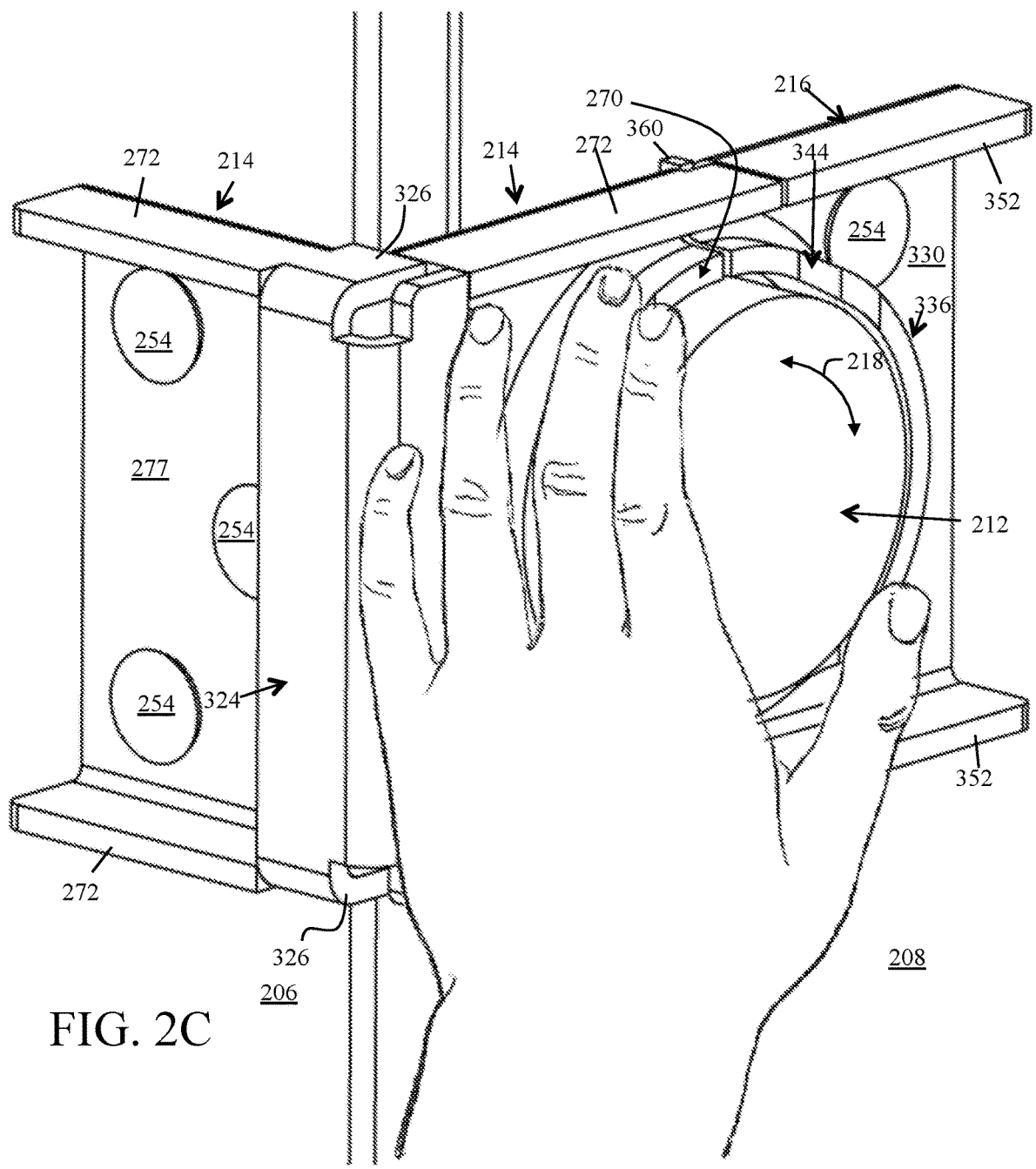
Figure 2D:
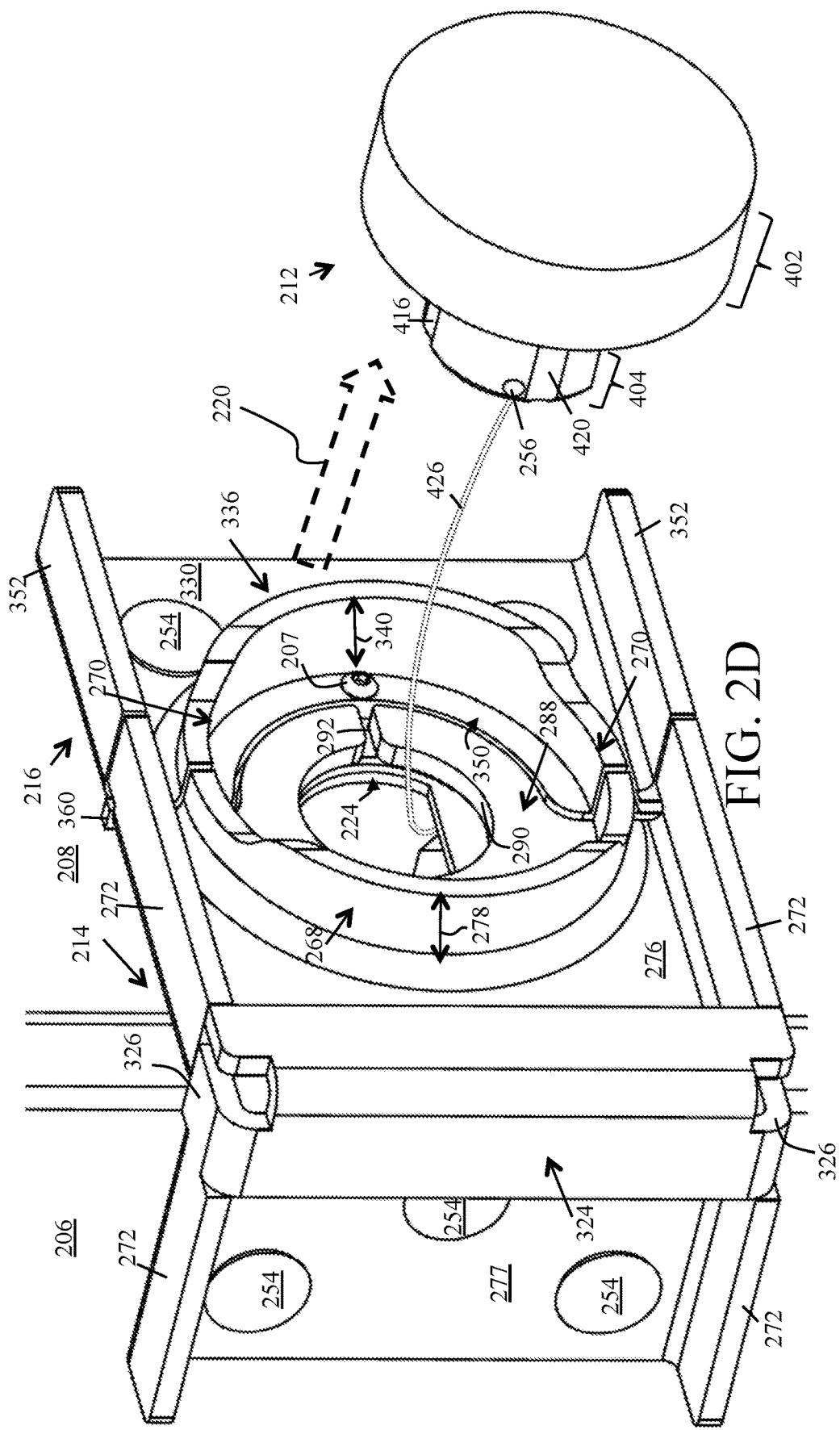

As illustrated in FIGS. 2A to 2F and further detailed below, one or more non-limiting, exemplary embodiments of the present invention provide keyless lock system 100 that may be mounted onto a cabinet 202. Keyless lock system 100 is comprised of a keyless lock assembly 114 that includes a hasp 214/216 and an interlock mechanism 212. A function of hasp 214/216 is to maintain barrier (or door) 206 of cabinet 202 in lock position and protect interlock mechanism 212 against possible attack (by prying, application of torque, or others). As detailed below, a non-limiting example of interlock mechanism 212 may be a lock-cap in a non-limiting, exemplary form of a slug—typically a rounded piece or metal with specific interlocking surfaces that provides the primary locking strength of the keyless lock system 100 while capping an interlock opening 224 (FIG. 2D). As illustrated, interlock mechanism 212 detachably engages with hasp 214/216 and as further detailed below, is latched to locked position by latching solenoid 112, which provides a secondary locking strength of keyless lock system 100.

As best illustrated in FIG. 2B, computing device 102 may be used that may include a well known communications protocol such as Bluetooth, NFC, WiFi, etc. to wirelessly transmit a signal in a form of a data packet 226 to control module 110 of keyless lock system 100. As further detailed below, upon receipt of the appropriate signal (or data packet) 226 from computing device 102, control module 110 actuates latching solenoid 112 from a latched position to an unlatched position, disengaging a latch 232 from interlock mechanism 212 (detailed below in relation to FIG. 2G-1 and 2K).

Figure 2F:
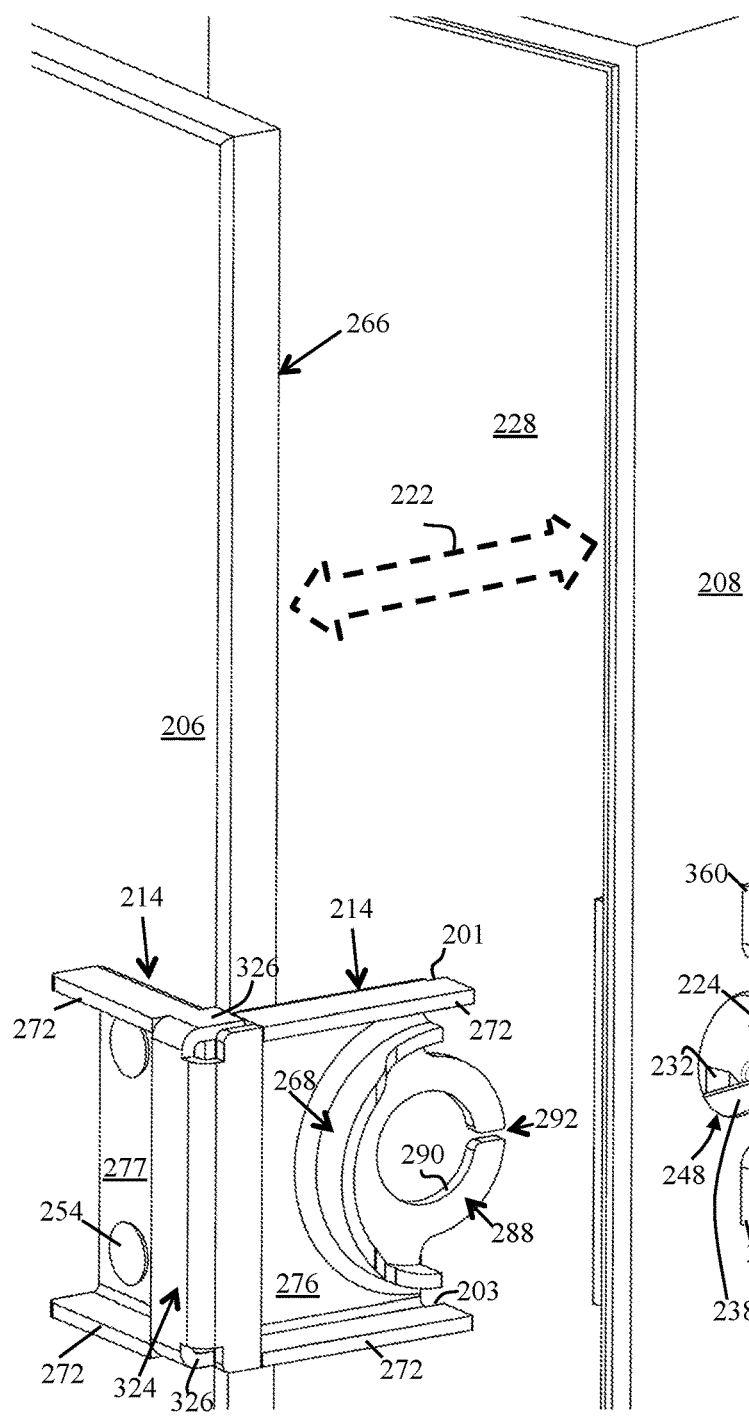
Figure 2F:
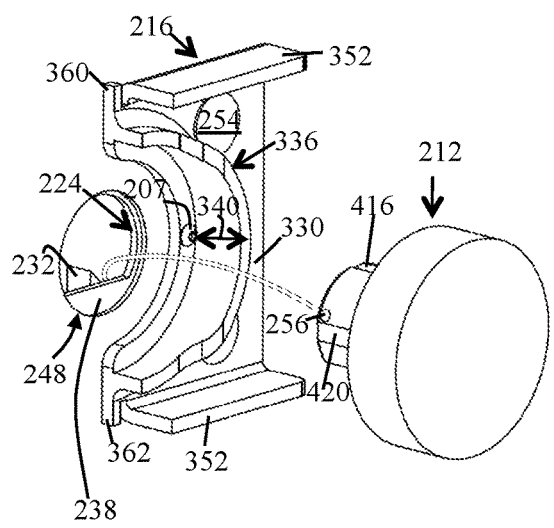

As best illustrated in FIG. 2C, the disengagement or unlatching of latching solenoid 112 frees interlock mechanism 212 to be rotated (one of clockwise or counterclockwise) to an unlock position (as shown by arrow 218). As best illustrated in FIG. 2D, once rotated to an unlock position, interlock mechanism 212 may then be pulled out of interlock opening 224 (in the direction shown by arrow 220) and removed. As best illustrated in FIGS. 2E and 2F, barrier (or door 206) of cabinet 202 may be freely opened (as shown by arrow 222) once interlock mechanism 212 is removed, enabling access to interior 228 of cabinet 202.

Figures 1, 2G:
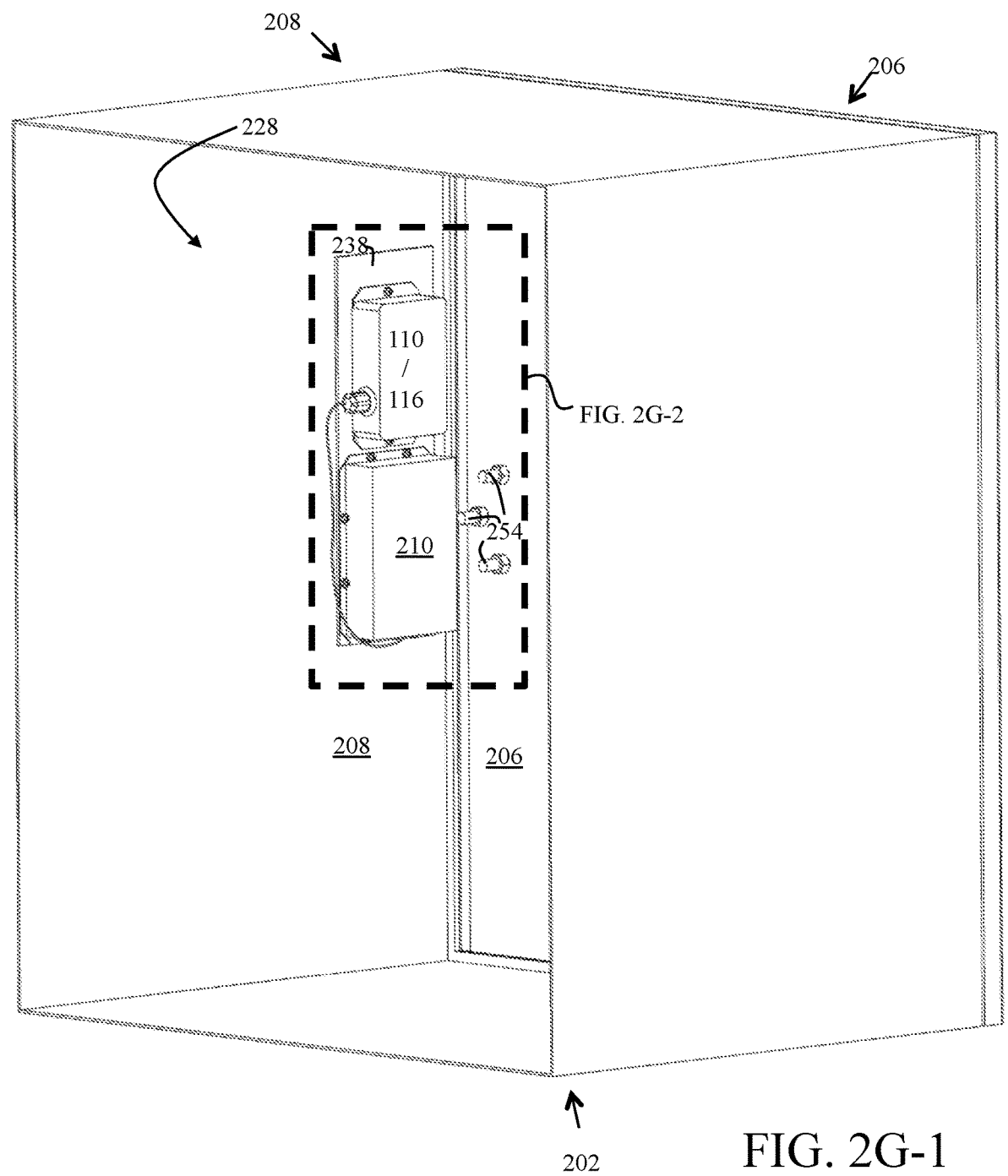
Figures 2, 2G:
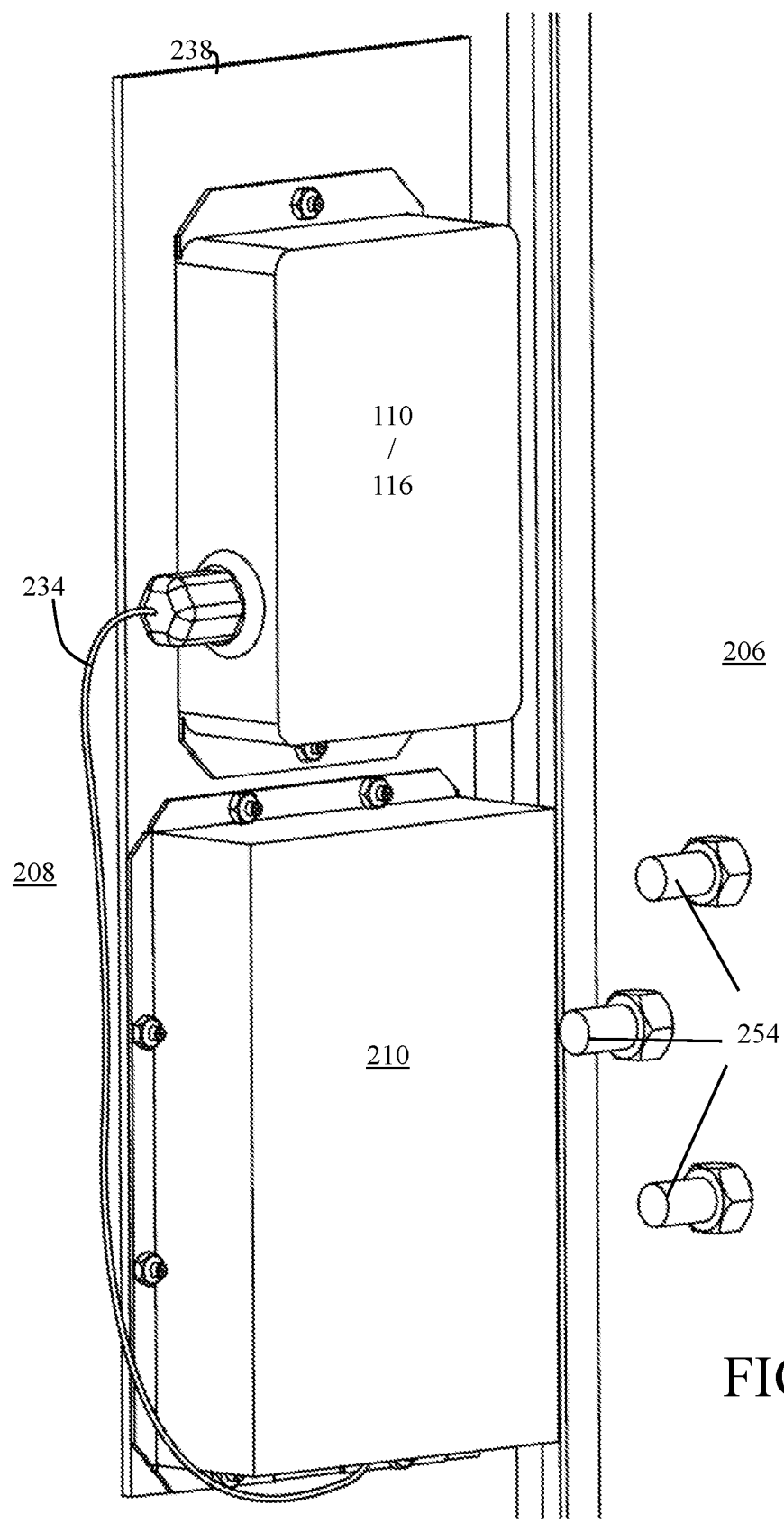
Figures 2, 2G, 3:
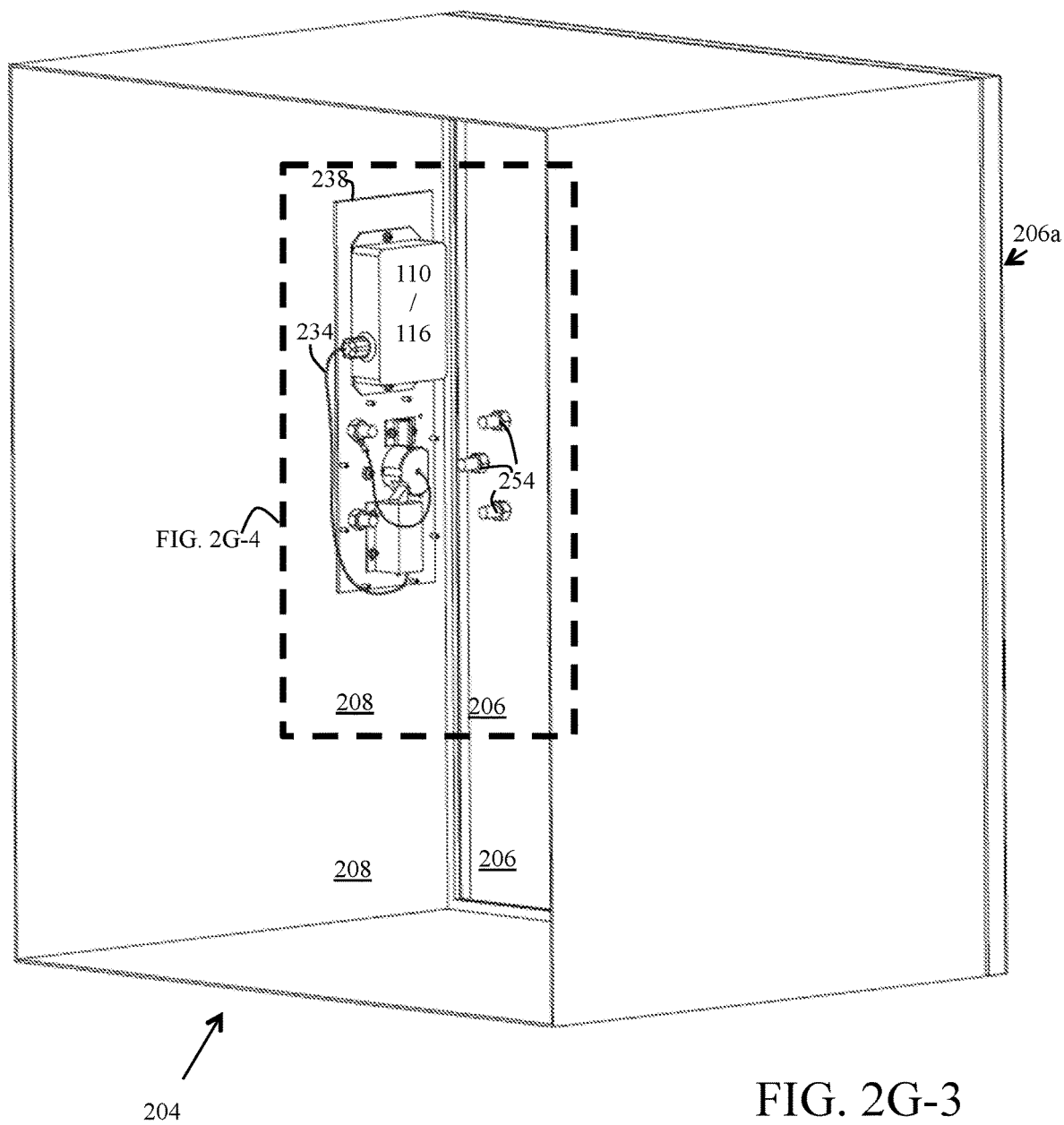
Figures 2, 2G, 3, 4:
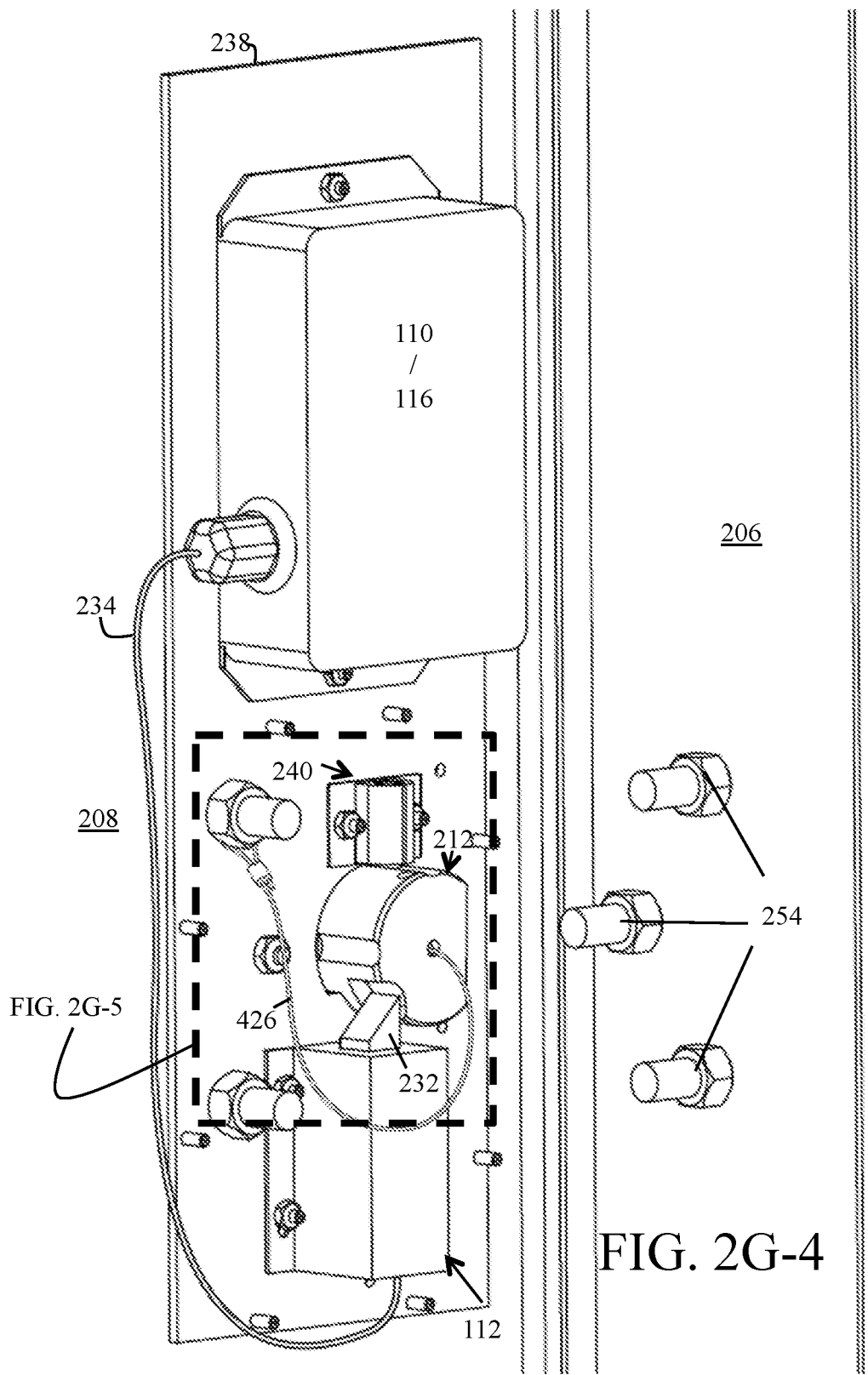
Figures 2, 2G, 3, 4, 5:
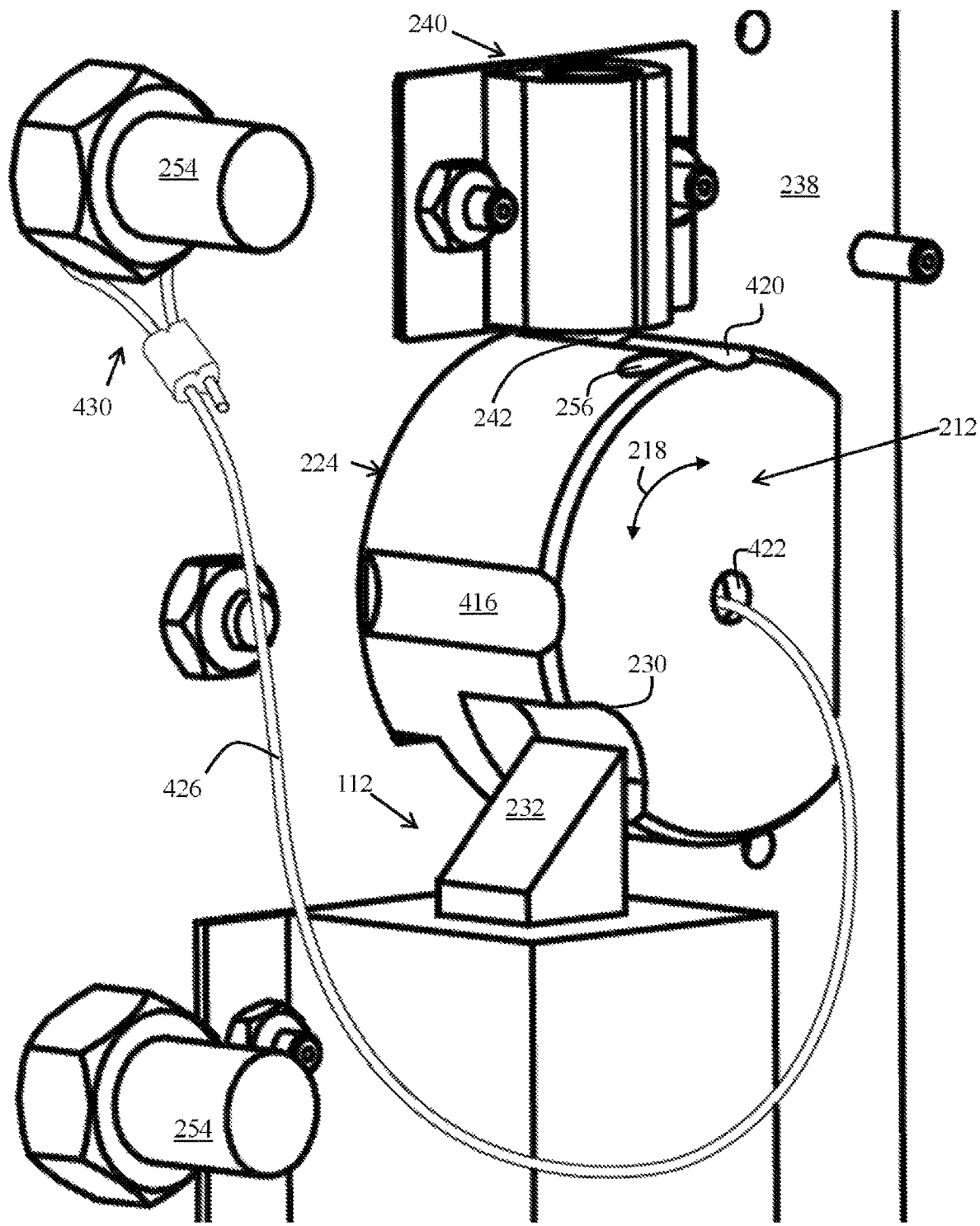

FIGS. 2G-1 to 2G-5 are non-limiting, exemplary perspective interior view illustrations of a closed and locked cabinet shown in FIGS. 2A (with backside wall 204 of cabinet 202 removed), which detail cooperative relationship between various components of keyless lock system 100 when in a closed and locked position in accordance with one or more embodiments of the present invention. FIG. 2G-2 is a close-up enlarged interior view of a portion shown within dashed lines in FIG. 2G-1. FIGS. 2G-3 and 2G-4 are identical to FIGS. 2G-1 and 2G-2, but with a cover 210 removed and FIG. 2G-5 illustrating a very enlarged view of a portion shown within dashed lines of FIG. 2G-4.

As illustrated in FIGS. 2A to 2G-5 (best illustrated in FIG. 2G-5), in a fully closed and locked position, interlock mechanism 212 is fully engaged with hasp 214/216, wall 208 of cabinet 202 (via an optional support structure 238), and as further detailed below, is latched in the locked position by latching solenoid 112, which provides the secondary locking strength of keyless lock system 100. As detailed below, interlock mechanism 212 includes a relief 230 for receiving a latch 232 of latching solenoid 112 wherein latch 232 snaps to extended lock position within relief 230.

Figures 1, 2H:
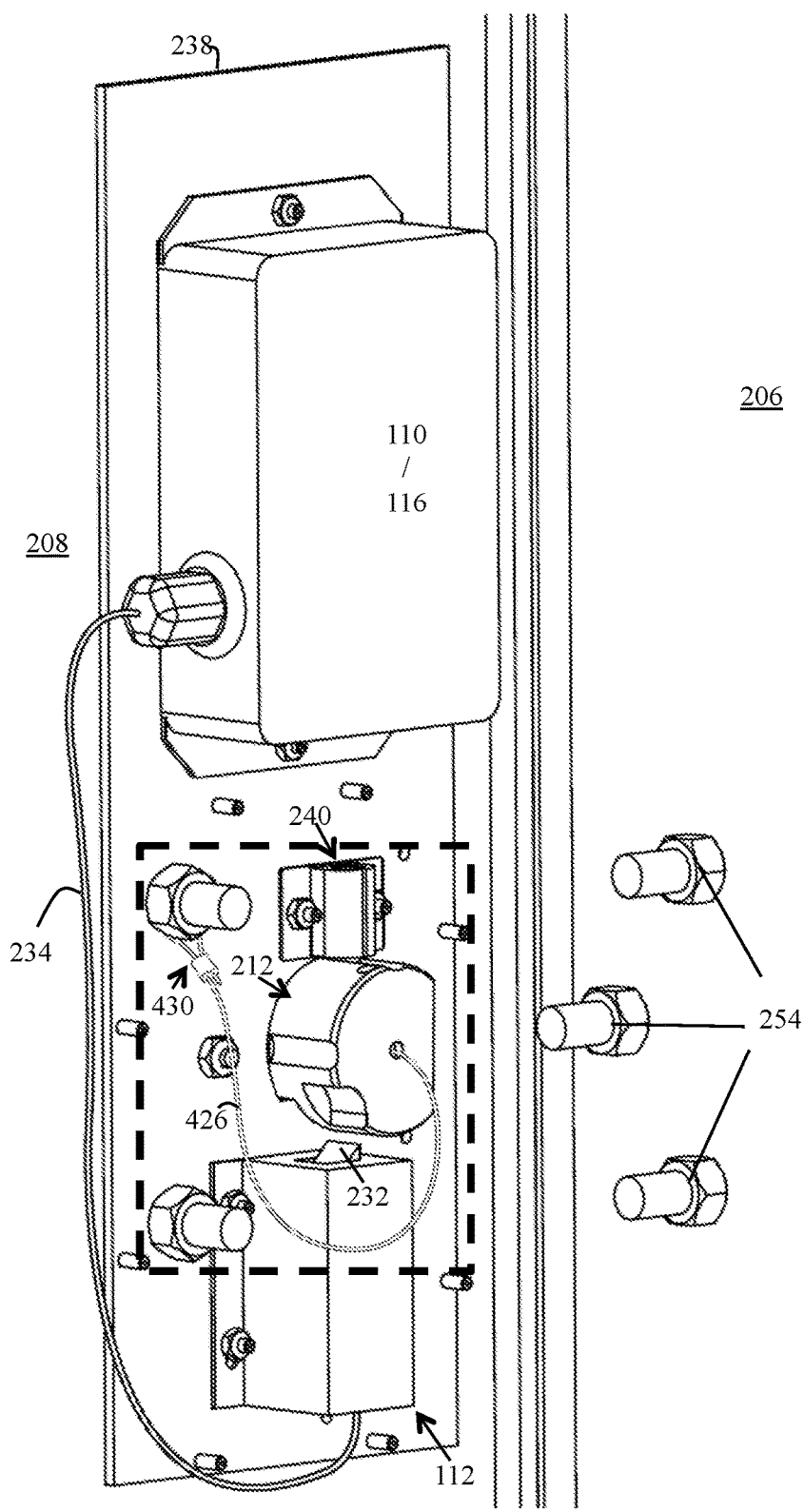
Figures 2, 2H:
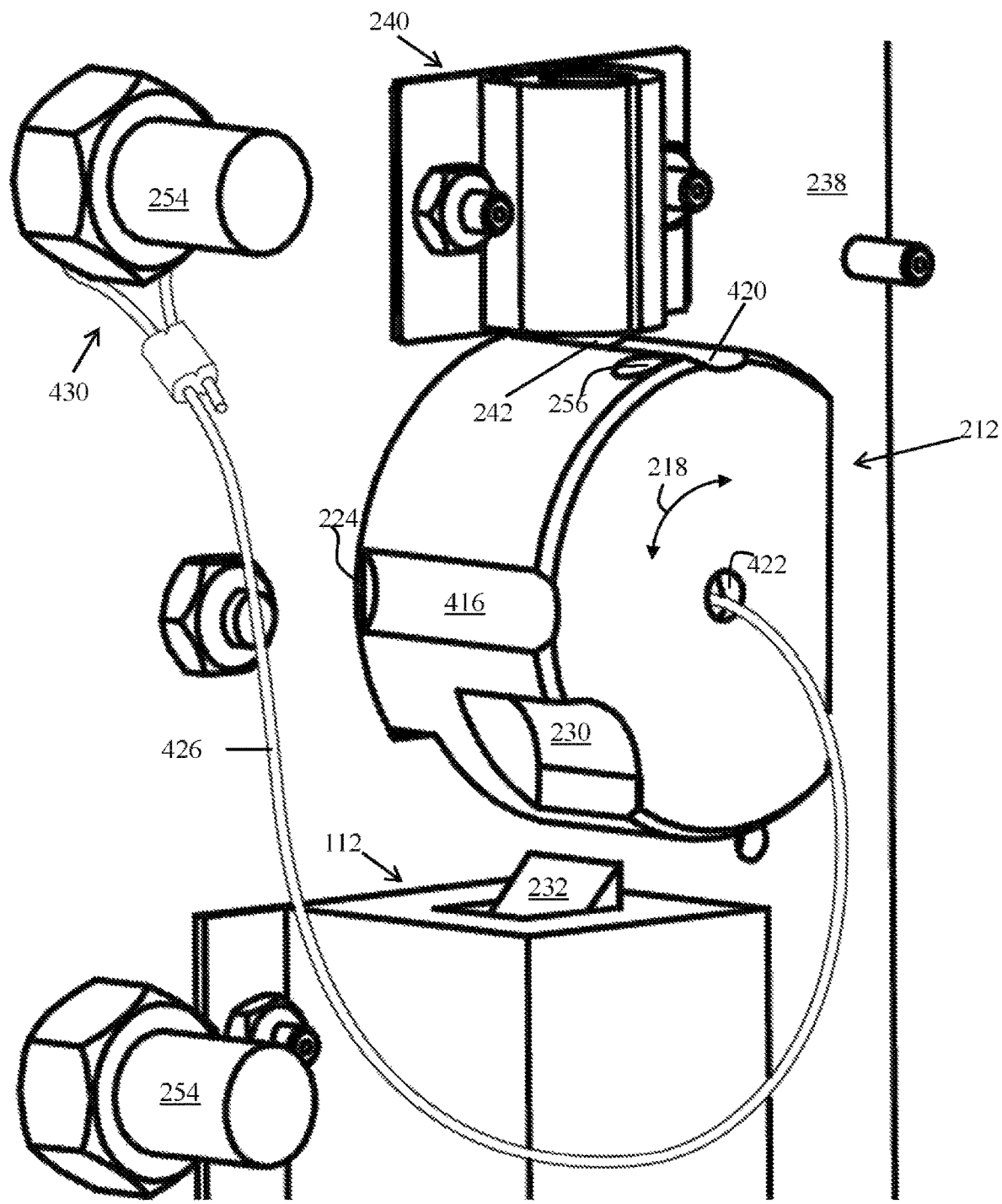

FIGS. 2H-1 and 2H-2 are non-limiting, exemplary perspective interior view illustrations of cabinet 202 shown in FIGS. 2A to 2G-5 (with backside wall 204 of cabinet 202 removed), which detail cooperative relationship between various components of keyless lock system 100 when unlock signal data packet 226 is received from computing device 102 while keyless lock system 100 is closed and in locked position in accordance with one or more embodiments of the present invention. As illustrated in FIGS. 2H-1 and 2H-2 (and in combination with of FIG. 2B), upon receipt of the appropriate signal (or data packet) 226 from computing device 102, control module 110 actuates latch 232 of latching solenoid 112 (via wire connection 234) from a latched position (best shown in FIG. 2G-5) to an unlatched position (best shown in FIG. 2H-2). Latch 232 of latching solenoid 112 in an unlatched position is disengaged (retreated or retracted) from relief 230 of interlock mechanism 212.

Figures 1, 2I:
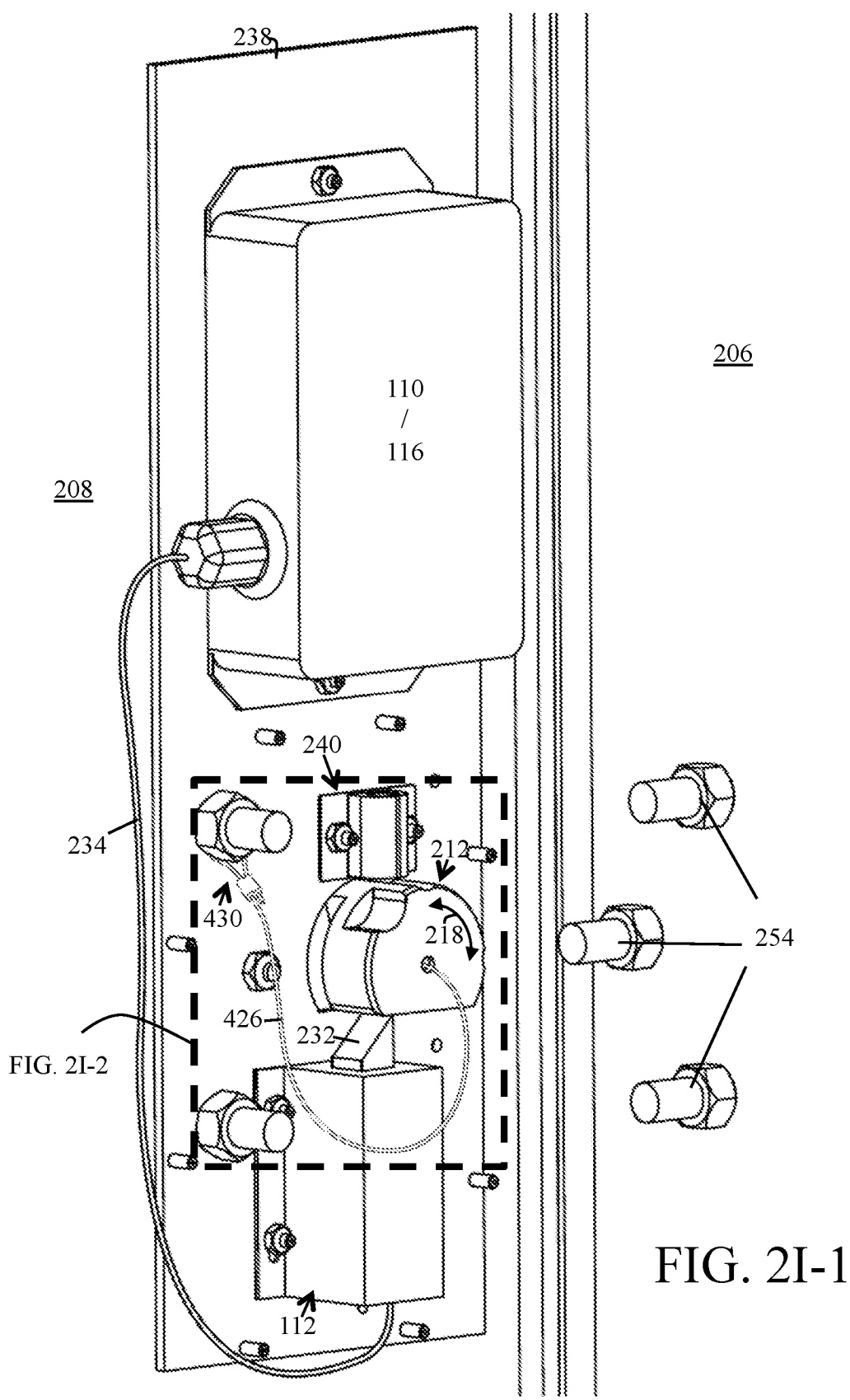
Figures 2, 2I:
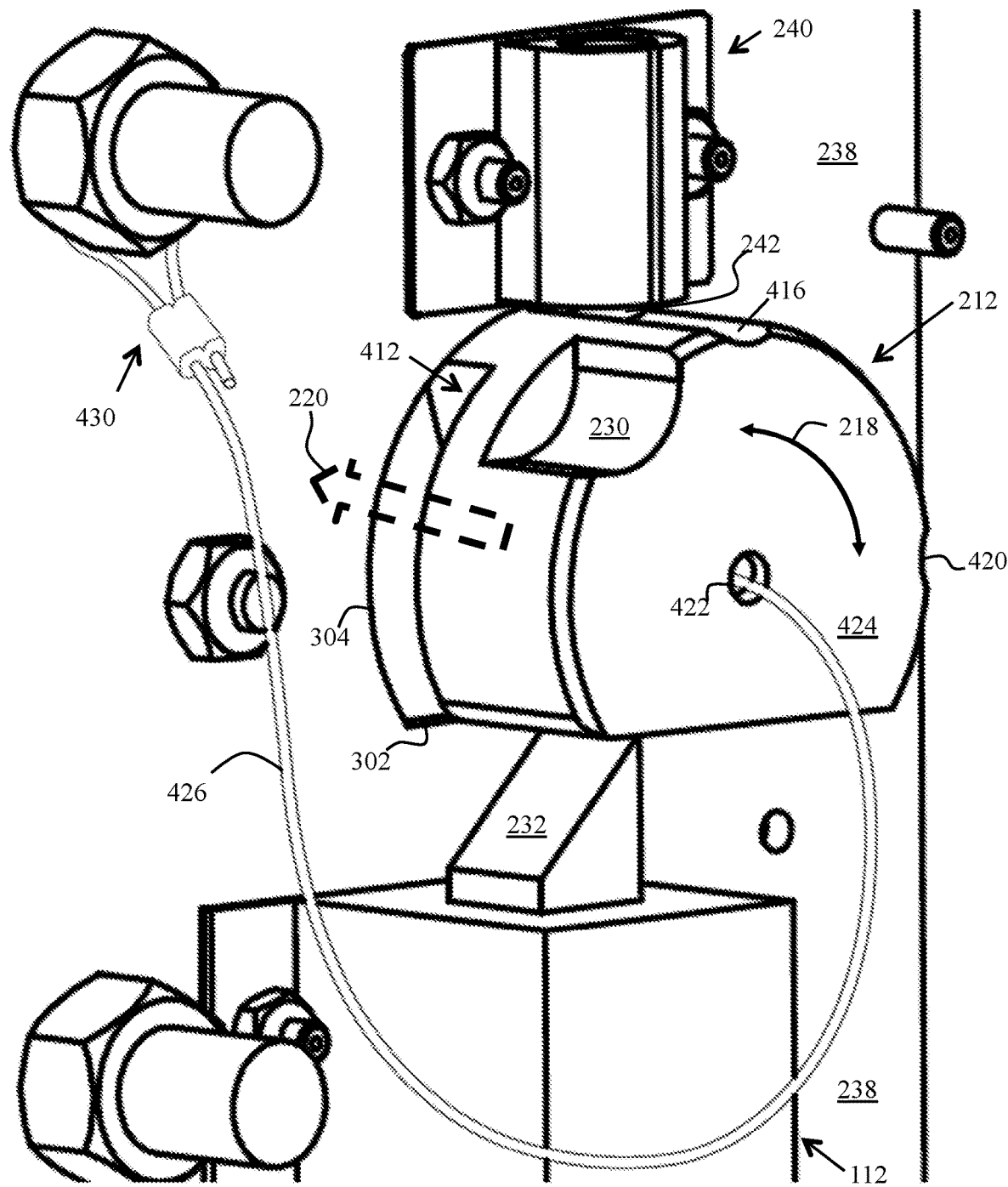

FIGS. 2I-1 and 2I-2 are non-limiting, exemplary perspective interior view illustrations of cabinet 202 shown in FIGS. 2A to 2H-2 (with backside wall 204 of cabinet 202 removed), which detail cooperative relationship between various components of keyless lock system 100 after latch 232 of latching solenoid 112 is retracted and when interlock mechanism 212 is rotated from closed and in locked position to unlock position in accordance with one or more embodiments of the present invention. As illustrated in FIGS. 2I-1 to 2I-2 (and in combination with FIG. 2C), the disengagement or unlatching of latch 232 of latching solenoid 112 from relief 230 of interlock mechanism 212 frees interlock mechanism 212 to be rotated (one of clockwise or counterclockwise) from locked position (best shown in FIG. 2G-5) to an unlock position (as shown by arrow 218 in FIG. 2I-2).

Figures 1, 2J:
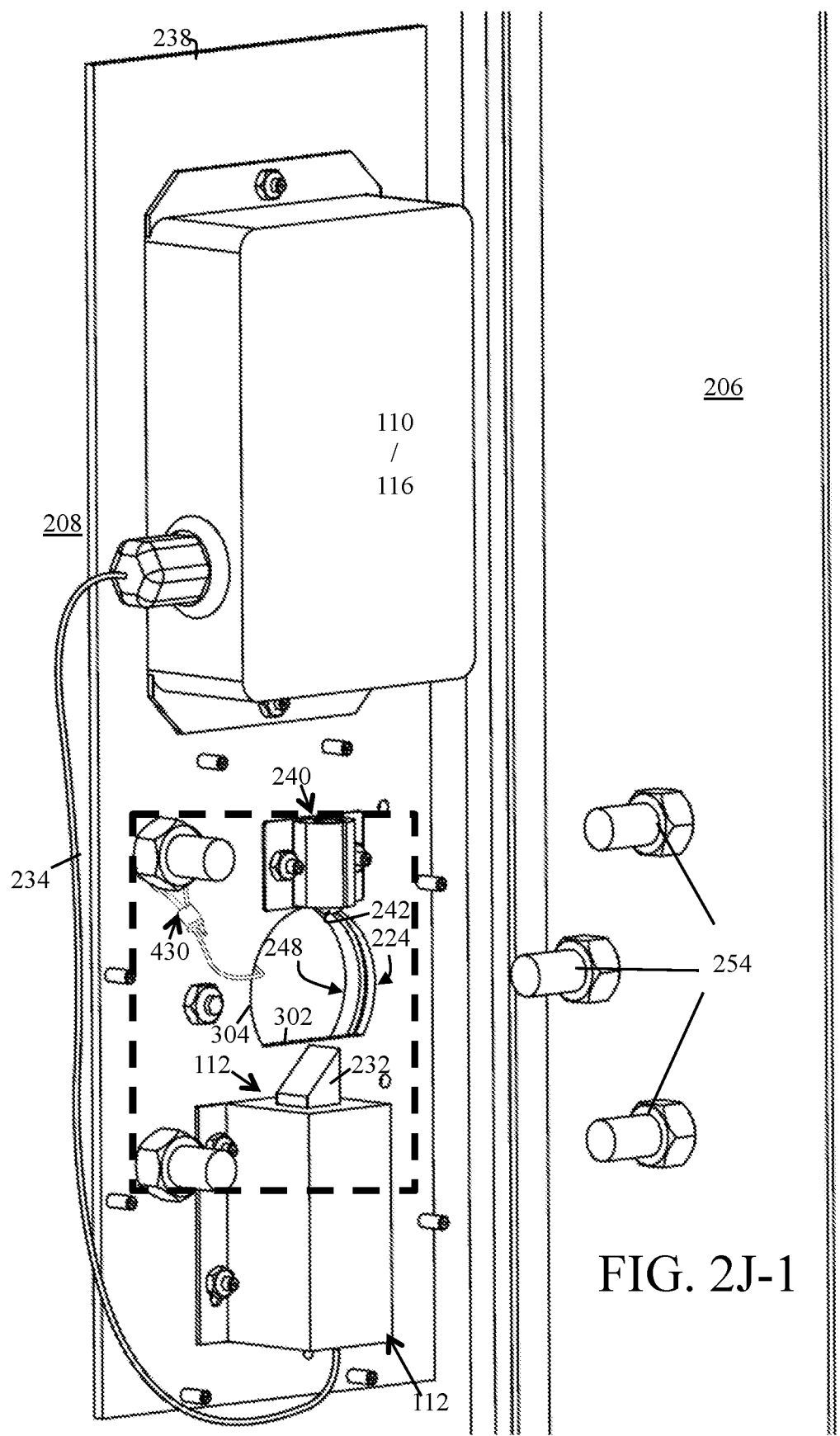
Figures 2, 2J:
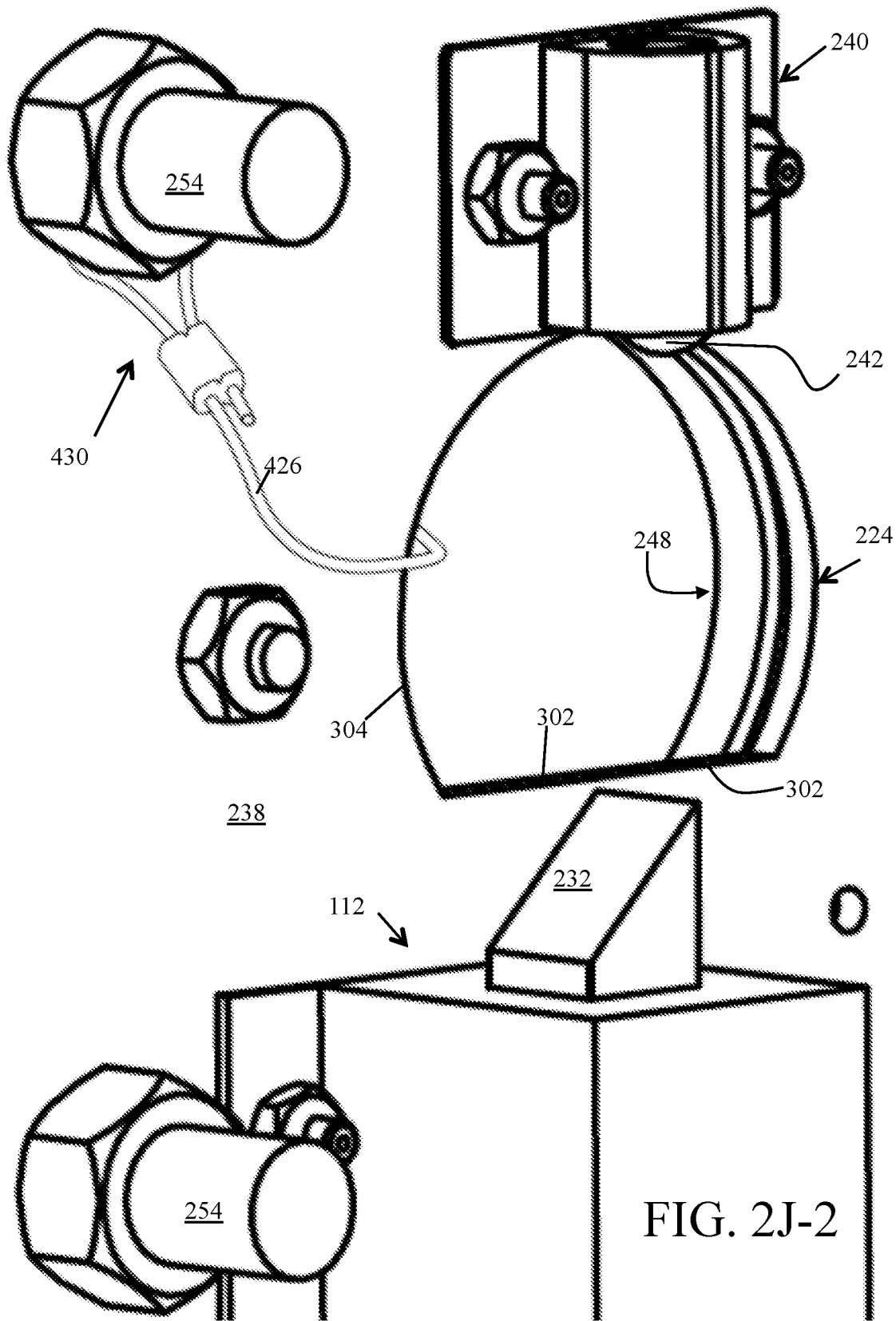

FIGS. 2J-1 to 2J-2 are non-limiting, exemplary perspective interior view illustrations of cabinet 202 shown in FIGS. 2A to 2I-2 (with backside wall 204 of cabinet 202 removed), which detail cooperative relationship between various components of keyless lock system 100 after interlock mechanism 212 is rotated and removed in accordance with one or more embodiments of the present invention. As illustrated in FIGS. 2J-1 to 2J-2 (and in combination with FIG. 2D), once rotated to an unlock position, interlock mechanism 212 may then be pulled out of interlock opening 224 (in the direction shown by arrow 220) and removed.

Figure 2K:
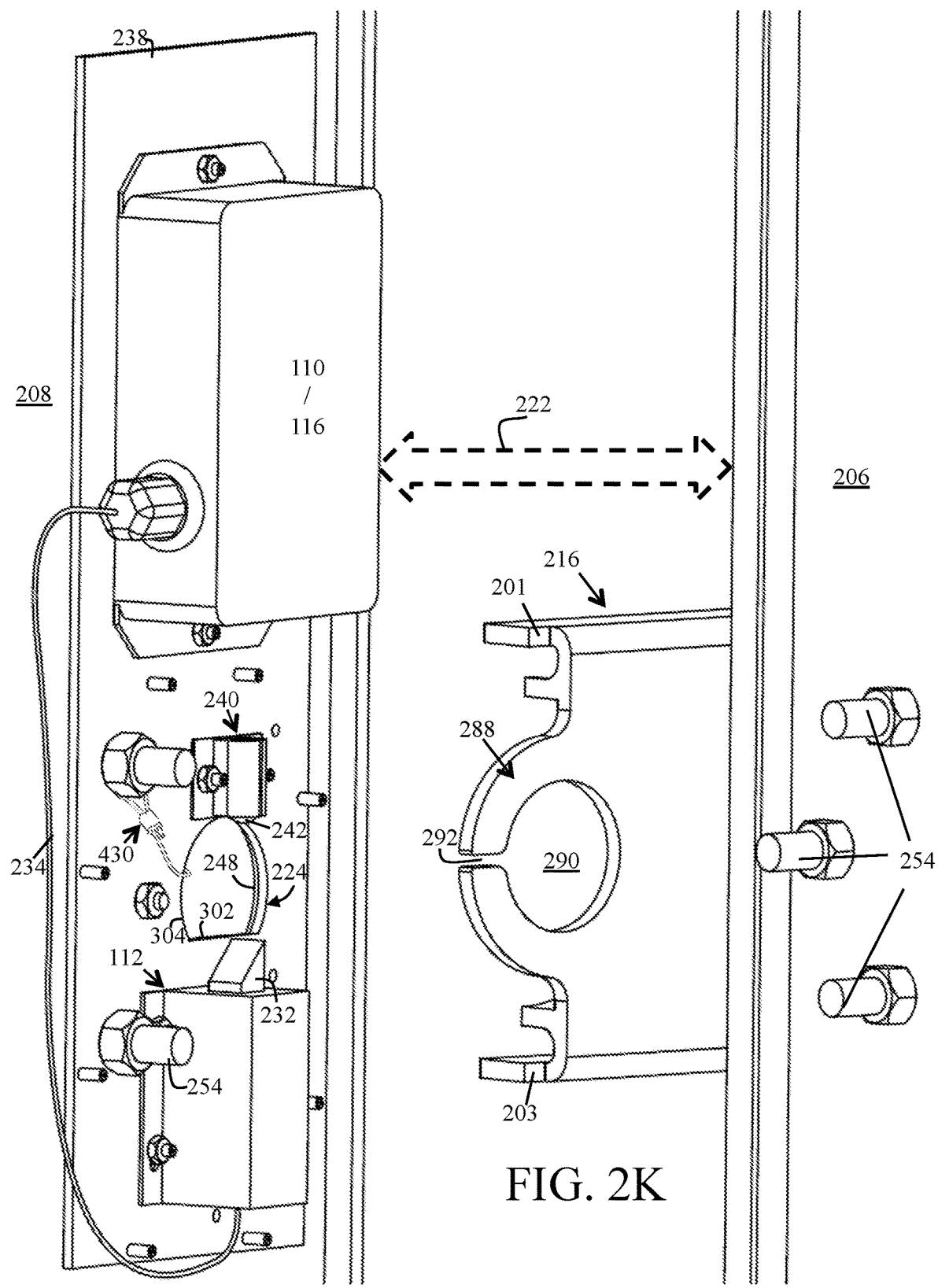

FIG. 2K is non-limiting, exemplary enlarged perspective interior view illustration of cabinet 202 shown in FIGS. 2A to 2J-2 (with backside wall 204 of cabinet 202 removed), which detail cooperative relationship between various components of keyless lock system 100 after door 206 of cabinet 202 is opened in accordance with one or more embodiments of the present invention, with the exterior view of the same shown in FIGS. 2E and 2F.

Figure 3A:
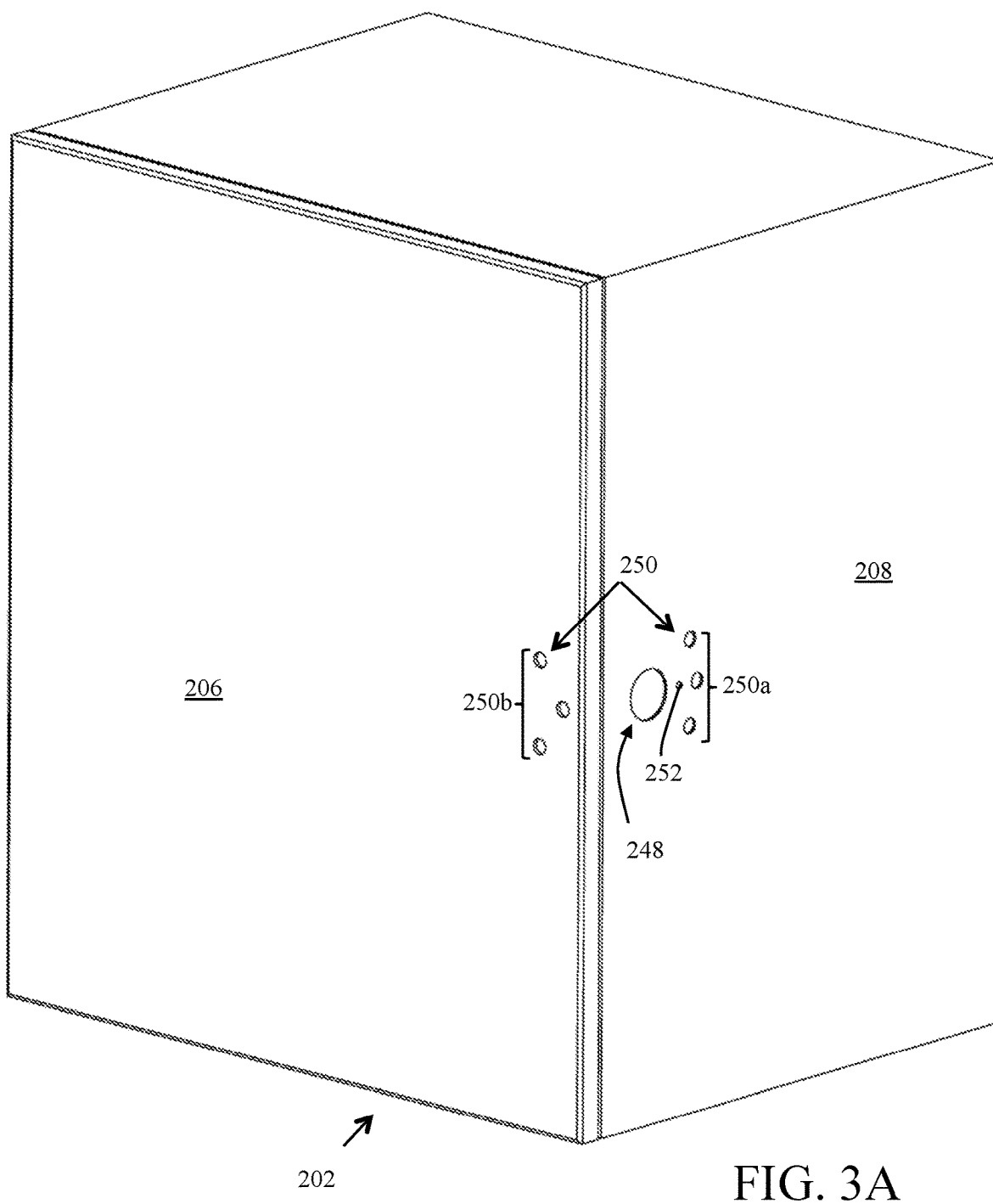
Figure 3B:
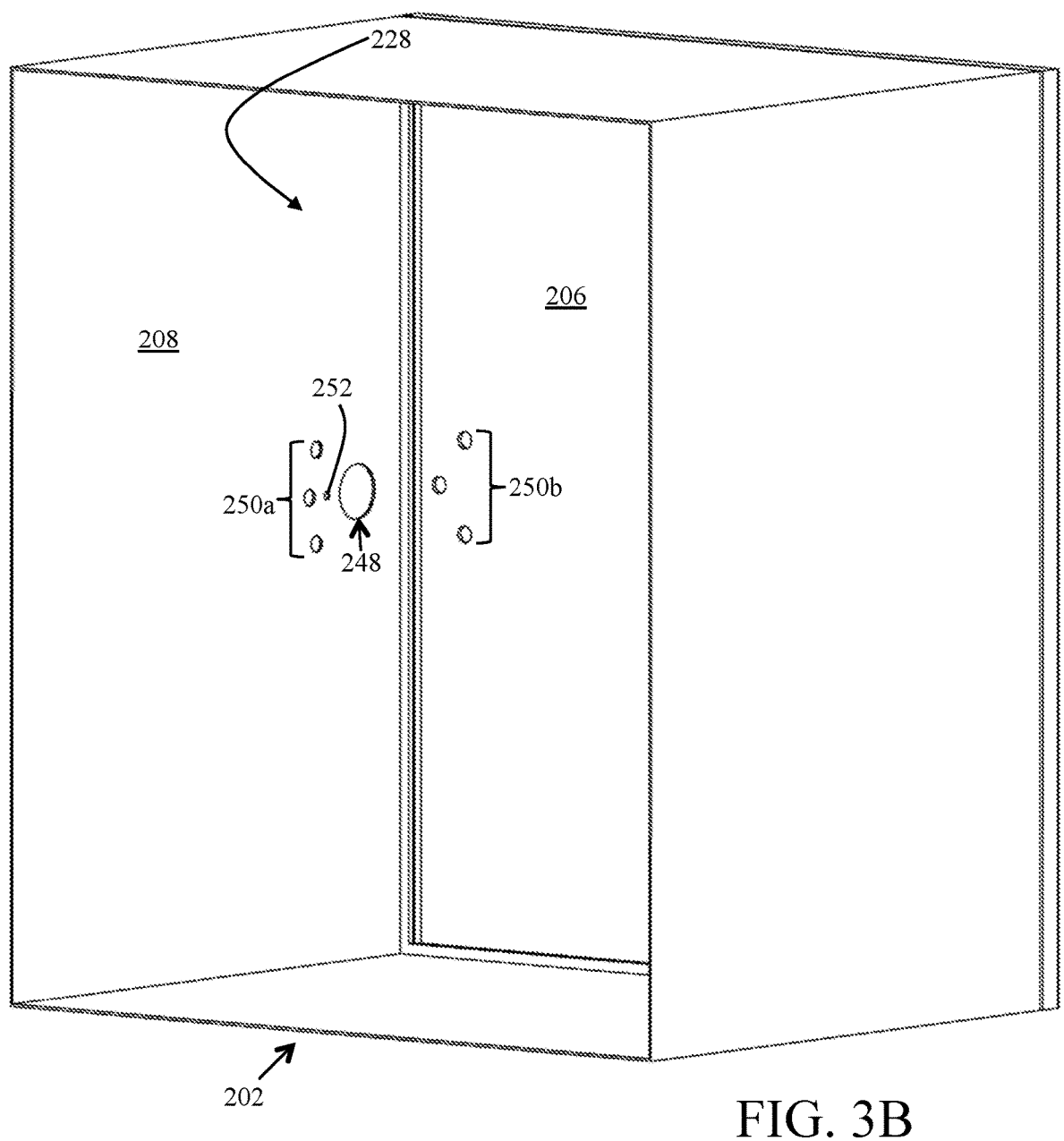

FIGS. 3A and 3B are non-limiting exemplary illustrations of various openings of a cabinet that are used by the keyless lock system in accordance with one or more embodiments of the present invention but without showing the keyless lock system, with FIG. 3A illustrating an exterior view and FIG. 3B illustrating an interior view thereof. As illustrated in FIGS. 3A and 3B, one or more embodiments of keyless lock system 100 of the present invention may require at least one main opening 248 that receives interlock mechanism 212. In general, if the optional support structure 238 is used, main opening 248 may be configured or shaped larger than interlock opening 224 defined by support structure 238 (detailed below). However, at the very least, main opening 248 may be configured or shaped the same as interlock opening 224 defined by support structure 238. On the other hand, if support structure 238 is not used (where wall 208 has sufficient structural integrity in terms of structural strength to withstand prying forces), main opening 248 may be configured to have a shape that commensurately corresponds with complementary engagement portion (e.g., interlock recess or groove 412) of interlock mechanism 212 (detailed below). For example, in the non-limiting, exemplary instance using interlock mechanism 212 with no support structure 238, main opening 248 may be configured exactly as interlock opening 224.

As further illustrated in FIGS. 3A and 3B, one or more embodiments of keyless lock system 100 of the present invention may also require at least one attachment opening 250 that secure hasp 214/216 to cabinet 202 using fasteners. In this non-limiting, exemplary instance, a first set of attachment openings 250a is positioned on wall 208 and a second set of attachment openings 250b is positioned on door 206. As detailed below, one or more embodiments of the present invention further provide a hidden (inconspicuous) opening 252 that further secure hasps 214/216 with fastener 207, with opening 252 covered over by interlock mechanism 212 (detailed below).

Figure 4A:
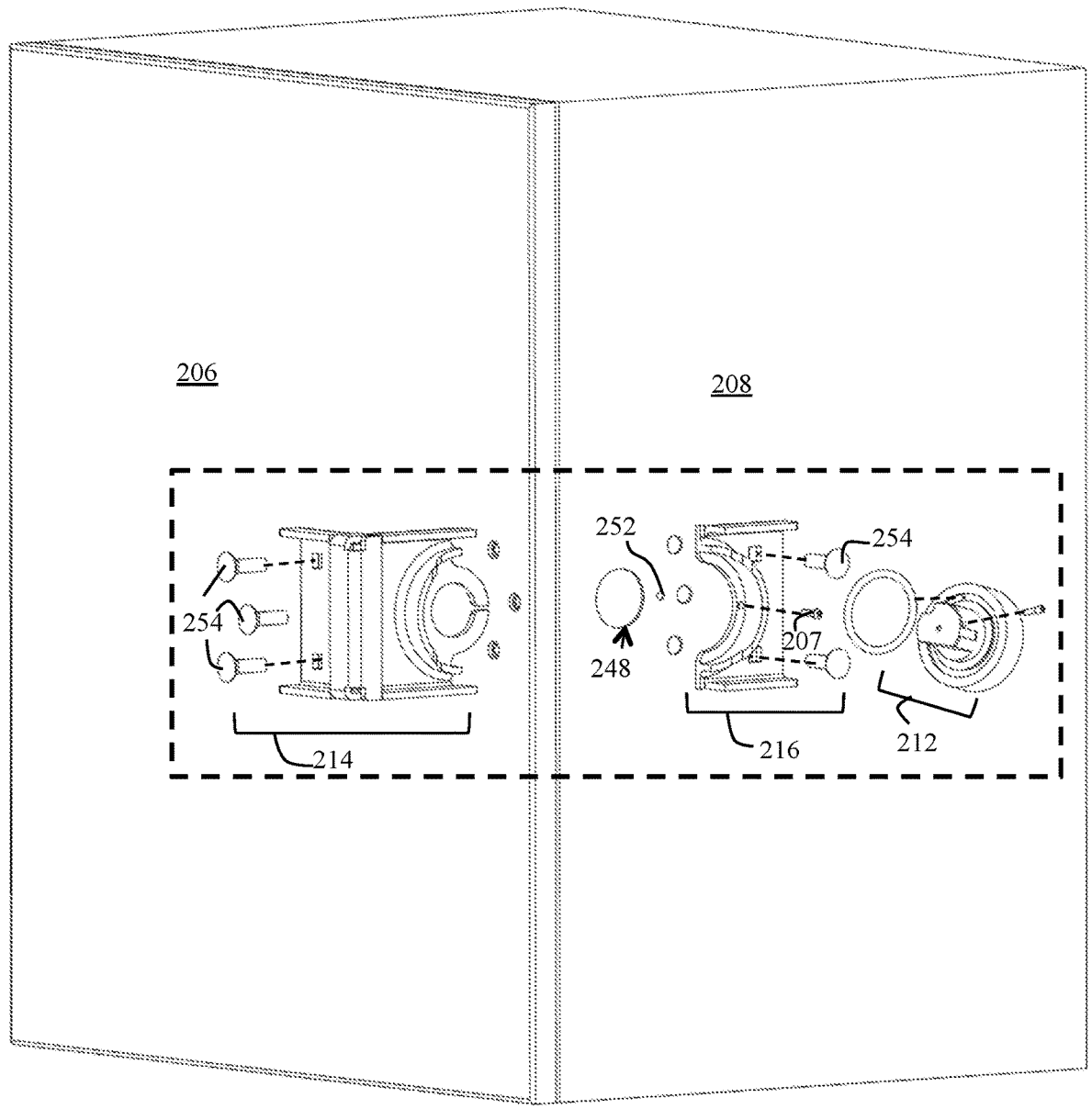
Figure 4B:
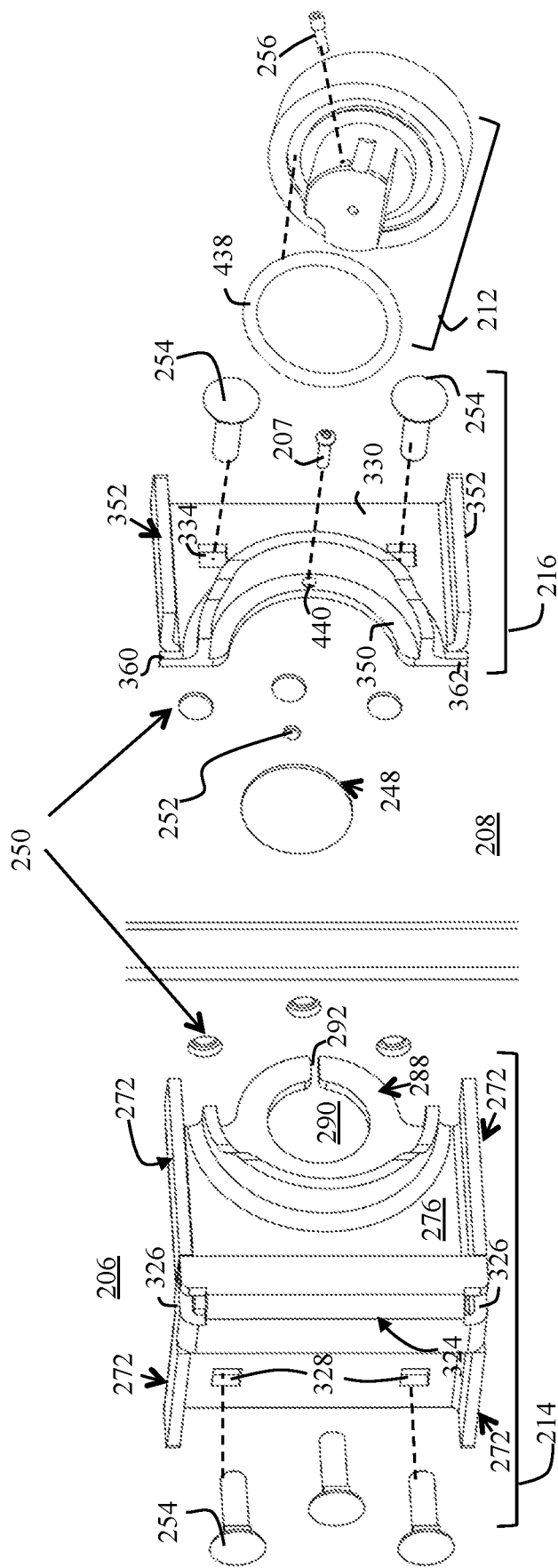
Figure 4C:
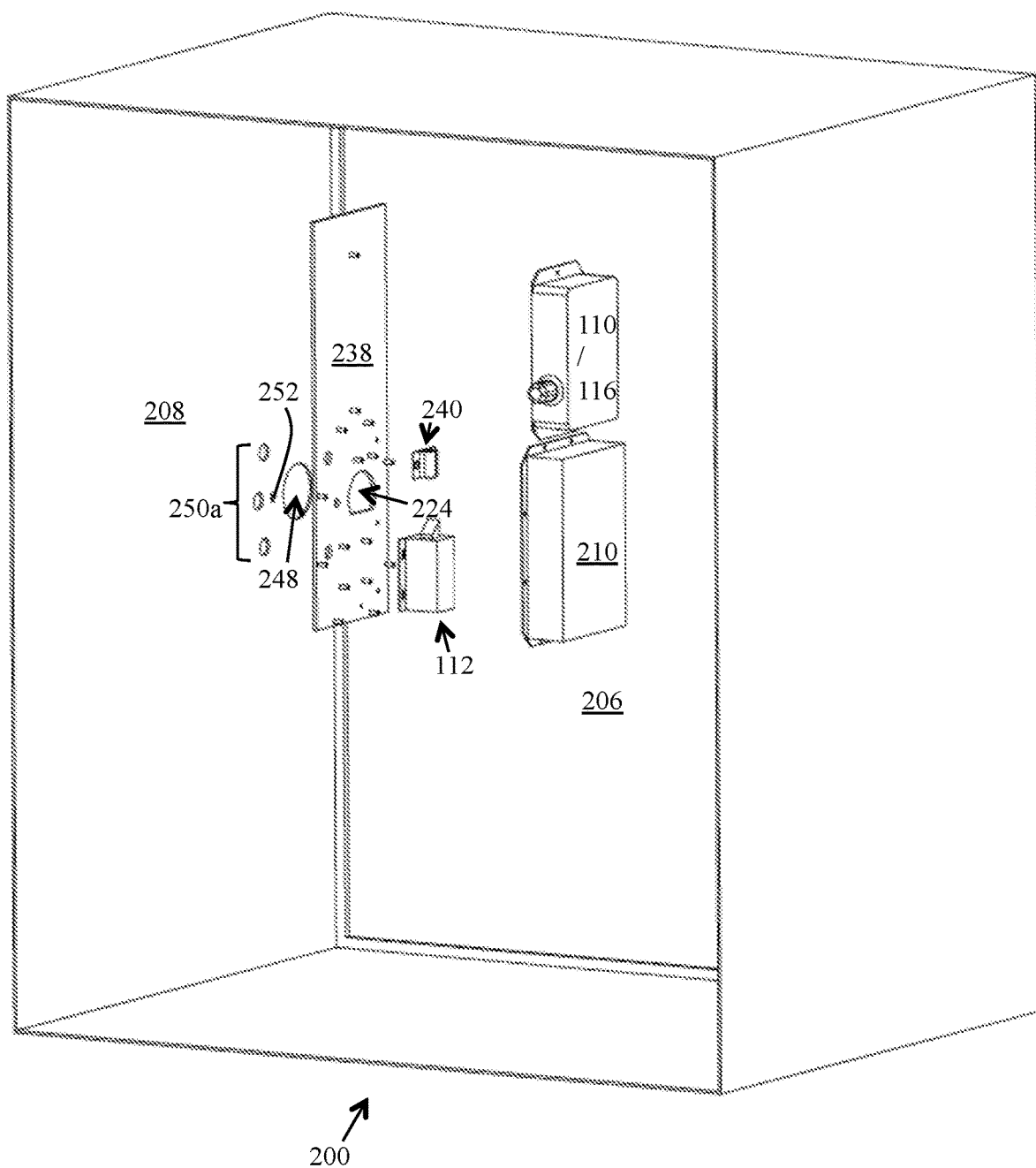
Figure 4D:
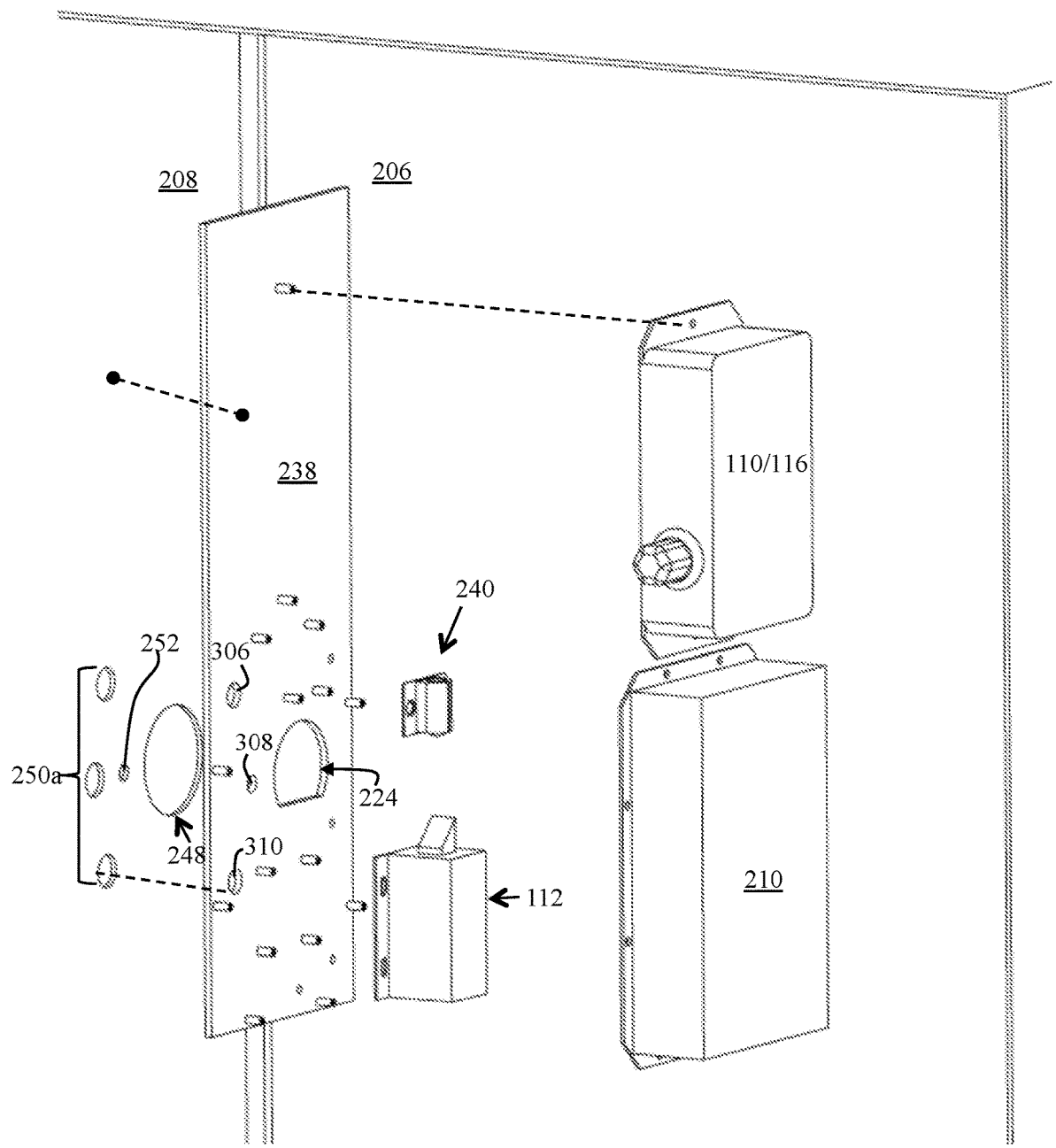

FIGS. 4A to 4D are non-limiting exemplary exploded view illustrations of the various components of the keyless lock system in accordance with one or more embodiments of the present invention, with FIGS. 4A and 4B illustrating an exploded view in relation to the exterior of cabinet and FIGS. 4C and 4D illustrating an exploded view in relation to the interior of cabinet. Exploded views shown in FIGS. 4A to 4D illustrate disassembled, separated components that show the cooperative working relationship, orientation, positioning, and exemplary manner of assembly of the various components of keyless lock system 100 in accordance with one or more embodiments of the present invention, with each component detailed below.

FIGS. 5A and 5B are non-limiting exemplary illustrations of a support structure in accordance with one or more embodiments of the present invention. As indicated above, keyless lock system 100 of the present invention may optionally use a support structure 238 in a form of a non-limiting, exemplary back-plate or panel as illustrated in FIGS. 5A and 5B. Support structure 238 is mechanically connected to an interior side of wall 208 of cabinet 202 as has been illustrated in FIGS. 2A to 4D by a set of fasteners such as nuts/bolts combinations. Support structure 238 may comprise of metal or alloys thereof such as steel or other highly strong metal such as aluminum that provide reinforcement for added structural integrity in terms of structural strength to which support structure 238 is physically, mechanically connected such as wall 208 of the cabinet 202.

As indicated above, the use of support structure 238 is optional. For example, a cabinet with sufficient structural strength to counter prying forces applied to remove interlock mechanism 212 would not require or need support structure 238. If support structure 238 is not used, wall 208 of cabinet 202 with which interlock mechanism 212 is to be associated may be adapted (or configured) to provide the same interlocking features (e.g., interlock opening 224, detailed below) that would have been provided by support structure 238. The use of support structure 238 is advantageous in that existing enclosures may be used without much modification.

As illustrated in FIGS. 5A and 5B, support structure 238 is comprise of an interlock opening 224 that includes an interlocking edge 302 that interlocks with interlock mechanism 212. Interlock opening 224 further includes edge 304 with sufficient diameter to enable easy insertion and rotation of interlock mechanism 212.

It should be noted that the configuration or shape of interlock opening 224 need not be as illustrated with a single interlocking edge 302, but may vary. As a non-limiting example, interlock-opening 224 may comprise of two or three spaced apart interlock edges 302 (the flat edge as shown) instead of the one illustrated that would interlock with a commensurate set of corresponding complementary recesses or cavities (detailed below) of interlock mechanism 212.

As further illustrated in FIGS. 5A and 5B, support structure 238 further includes a set of securing apertures 306, 308, and 310 that enable mounting of a hasp onto cabinet 202, which, in turn, further secure support structure 238 with hasp and wall 208 of cabinet 202. Securing apertures 306, 308, and 310 are aligned with attachment openings 250a on wall 208 of cabinet 202 to receive fasteners 254 (best shown in FIG. 4B). Holes 312 may also be used to mount support structure 238 onto wall 208 and further, may be used to mount various components of keyless lock system 100 onto support structure 238 as has been illustrated in FIGS. 2A to 2K, including cover 210, power and control modules 110/116, latching solenoid 112, etc.

Figure 6A:
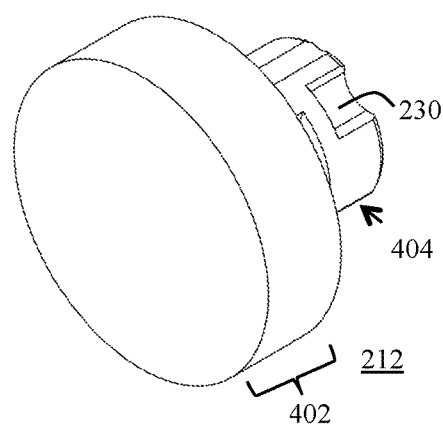
Figure 6B:
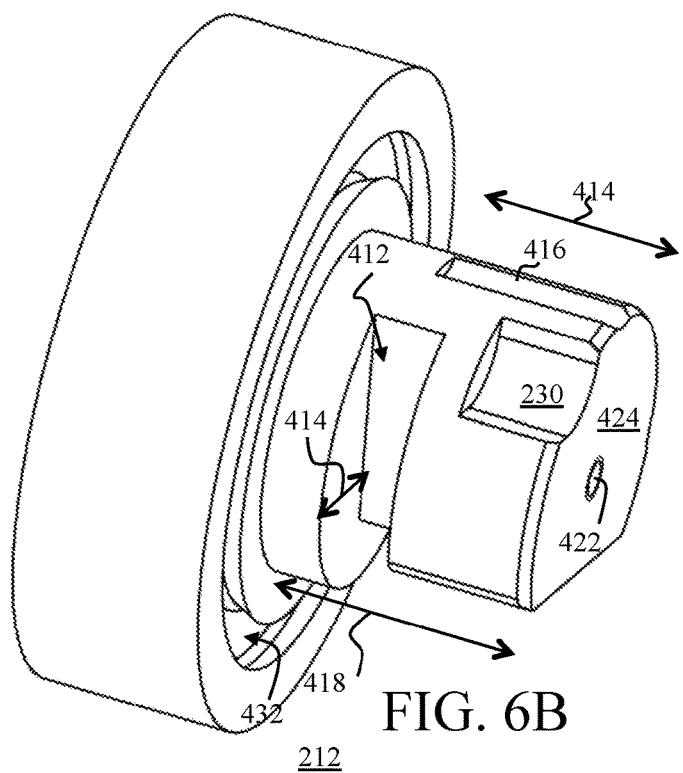
Figure 6C:
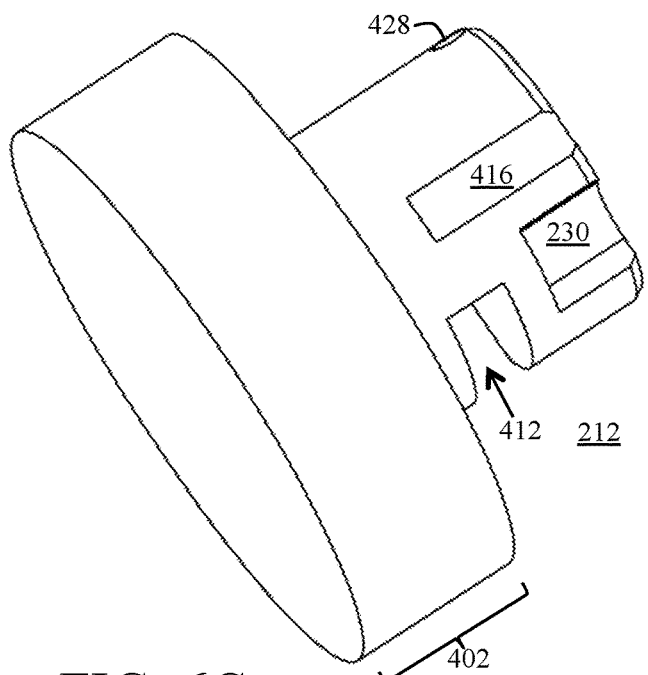
Figure 6D:
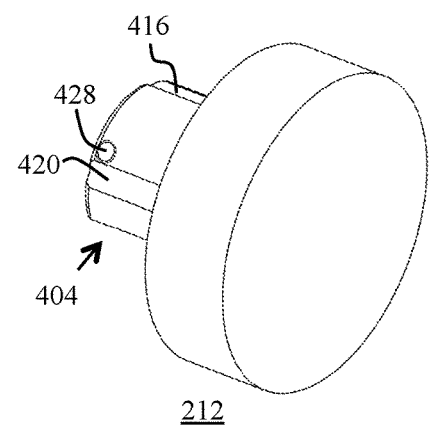
Figures 6E, 6F:
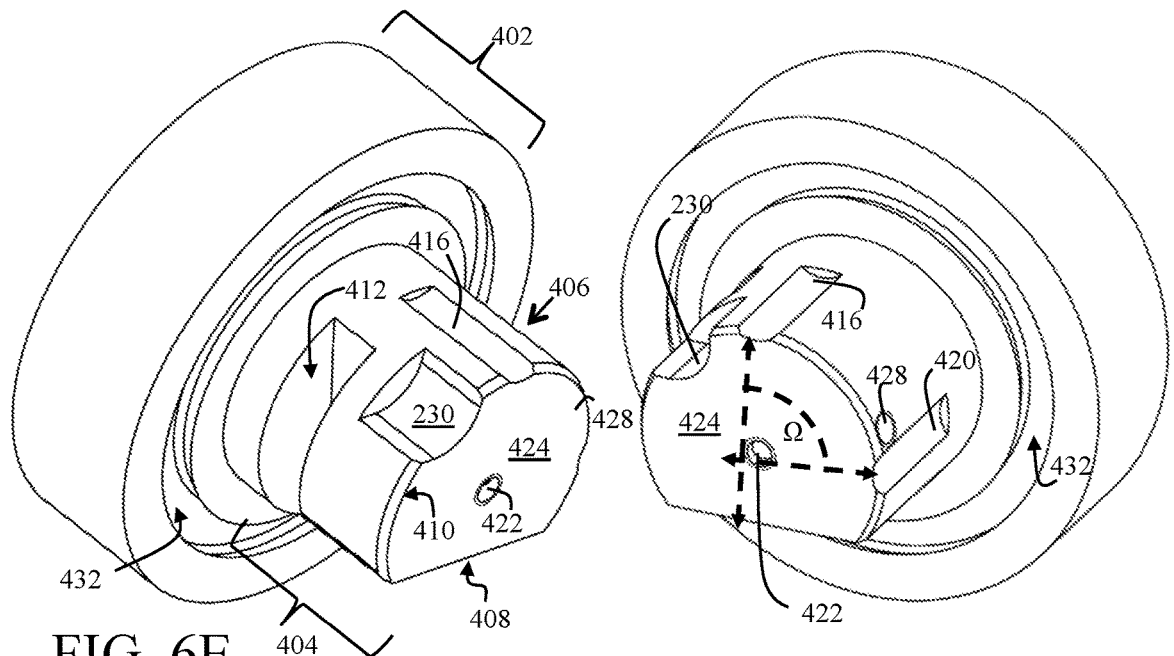
Figures 6G, 6H:
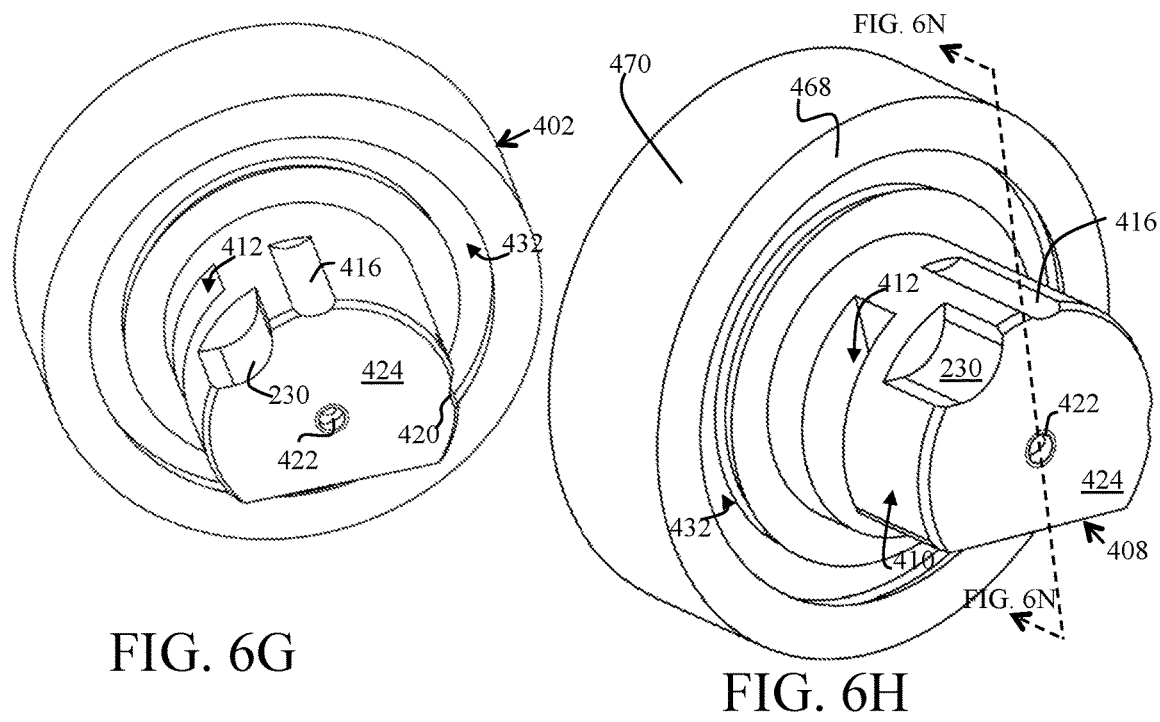
Figure 6I:
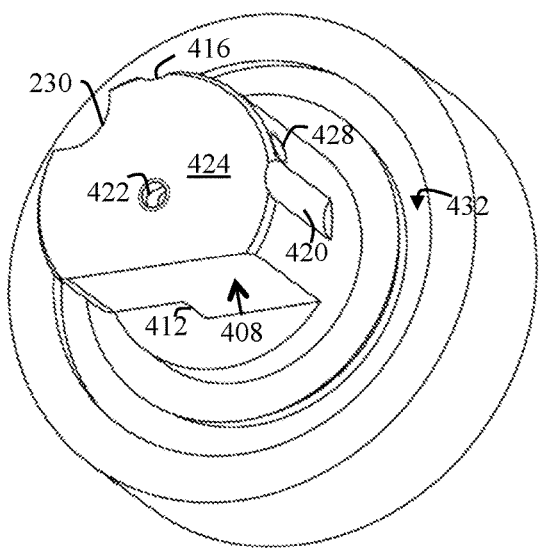
Figure 6J:
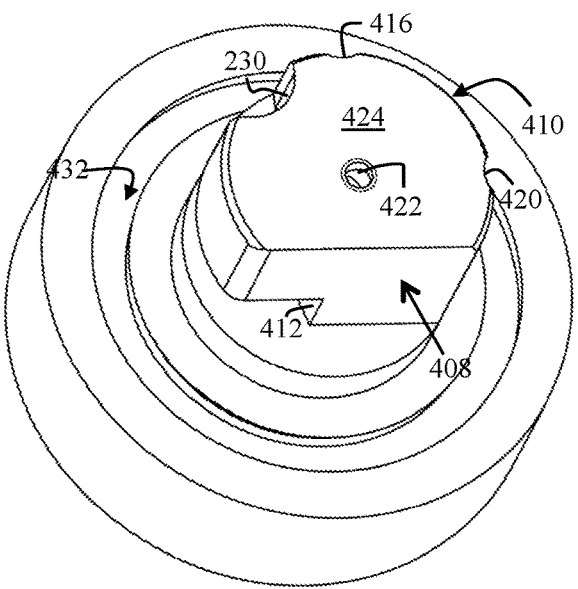
Figure 6K:
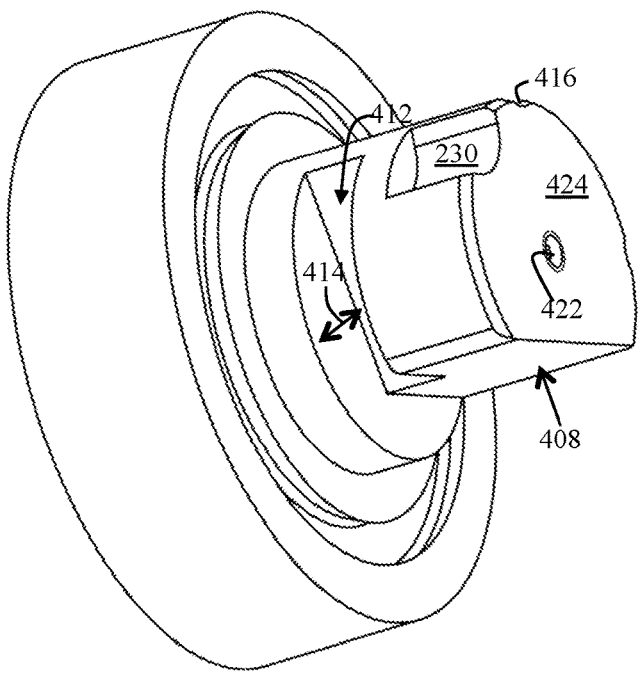
Figure 6L:
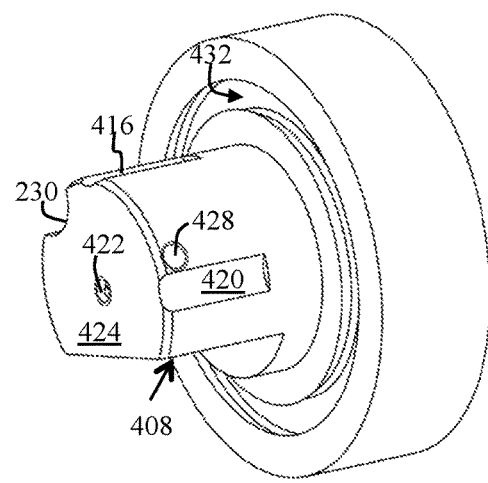
Figure 6M:
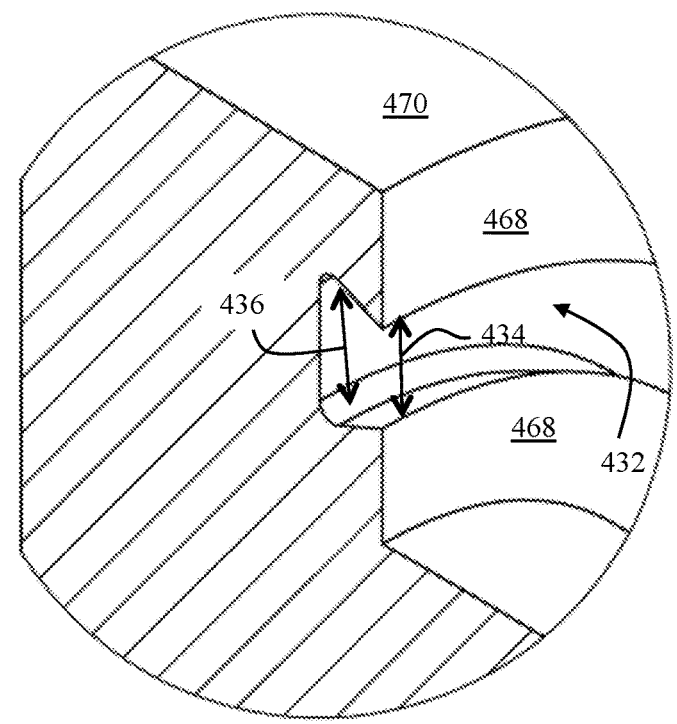
Figure 6N:
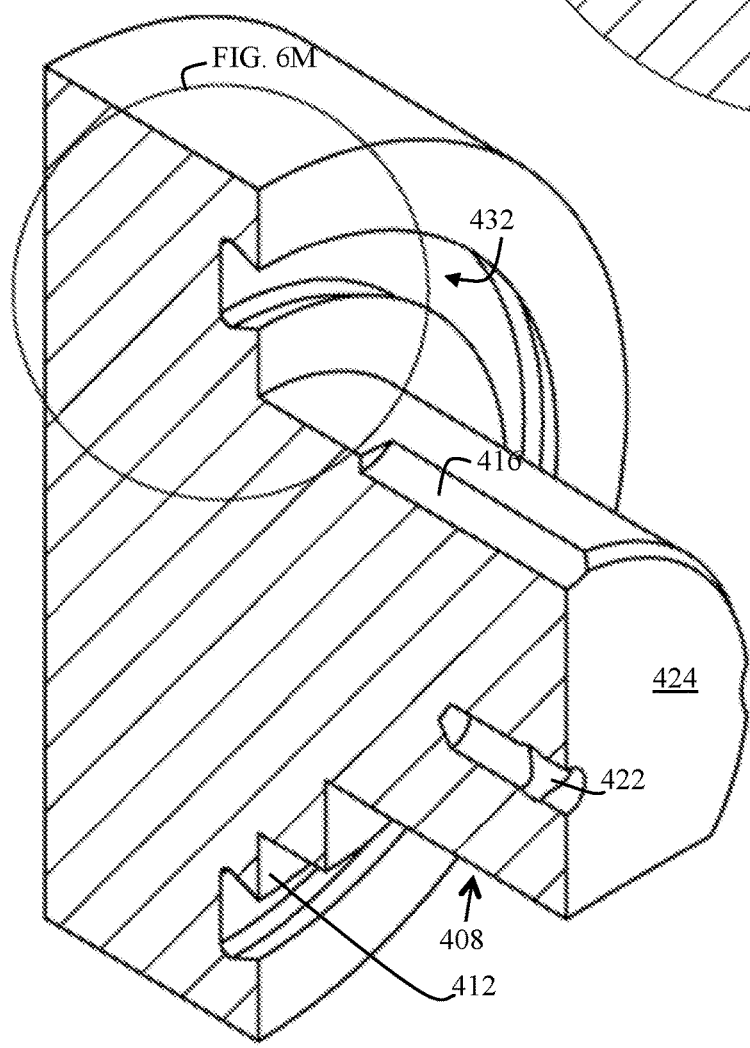
Figures 6O, 6P:
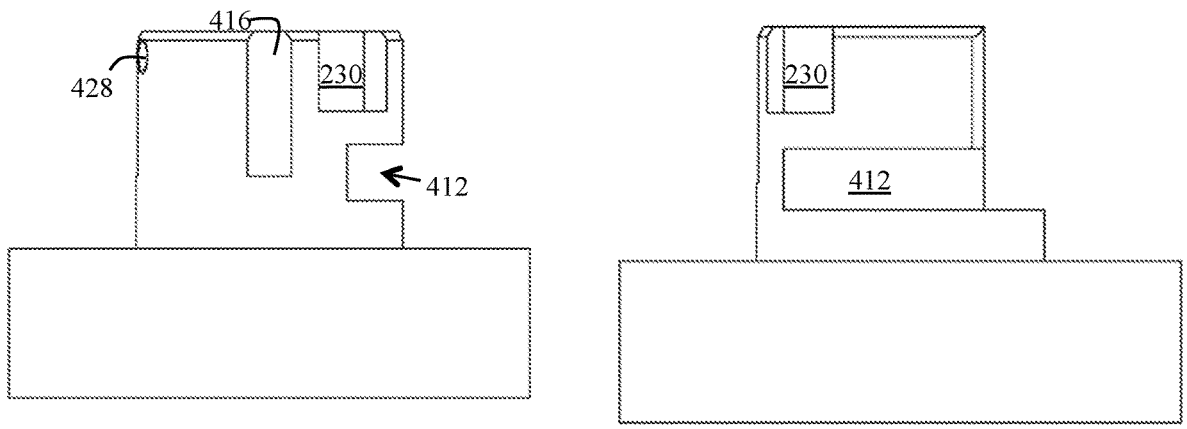
Figures 6Q, 6R:
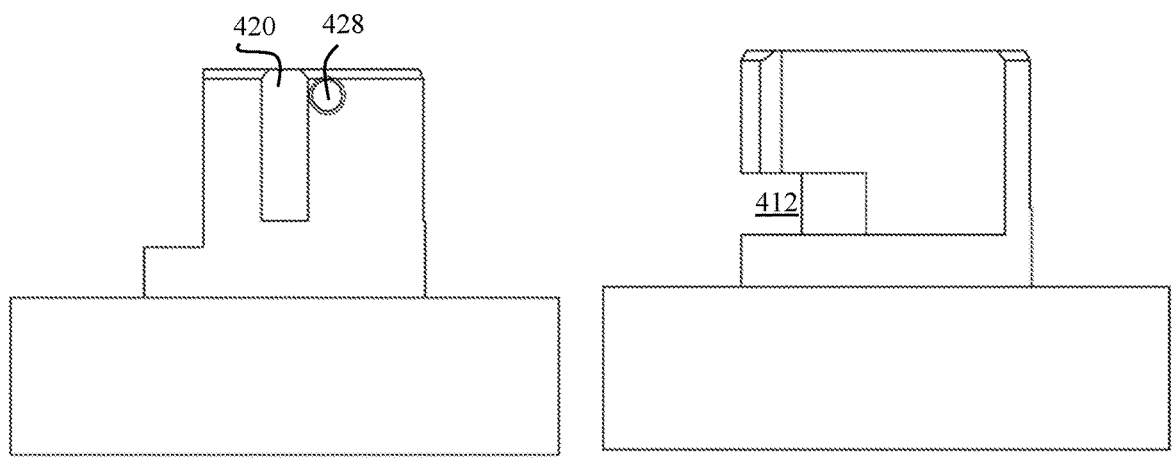
Figure 6S:
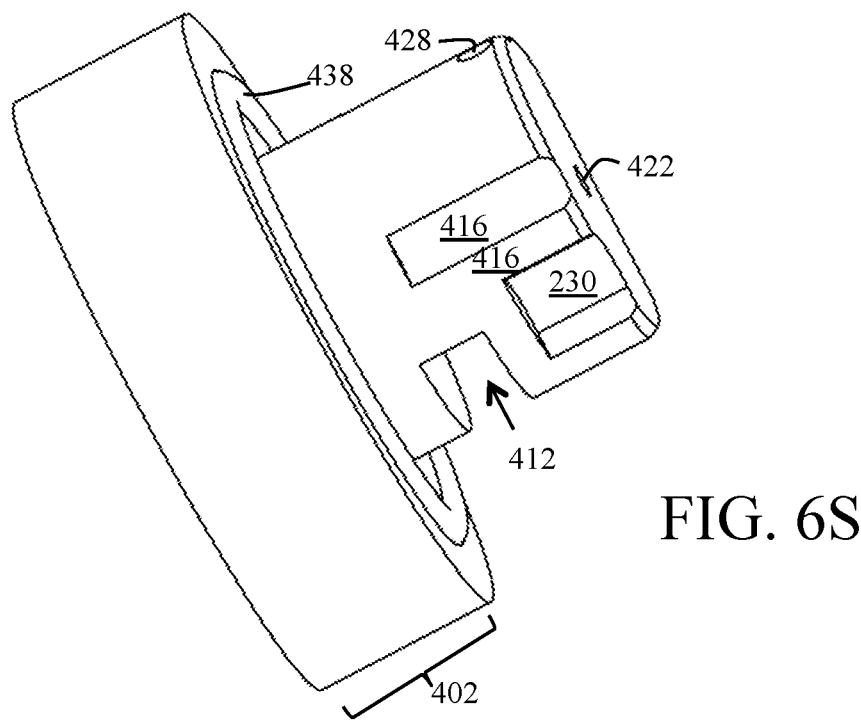
Figure 6T:
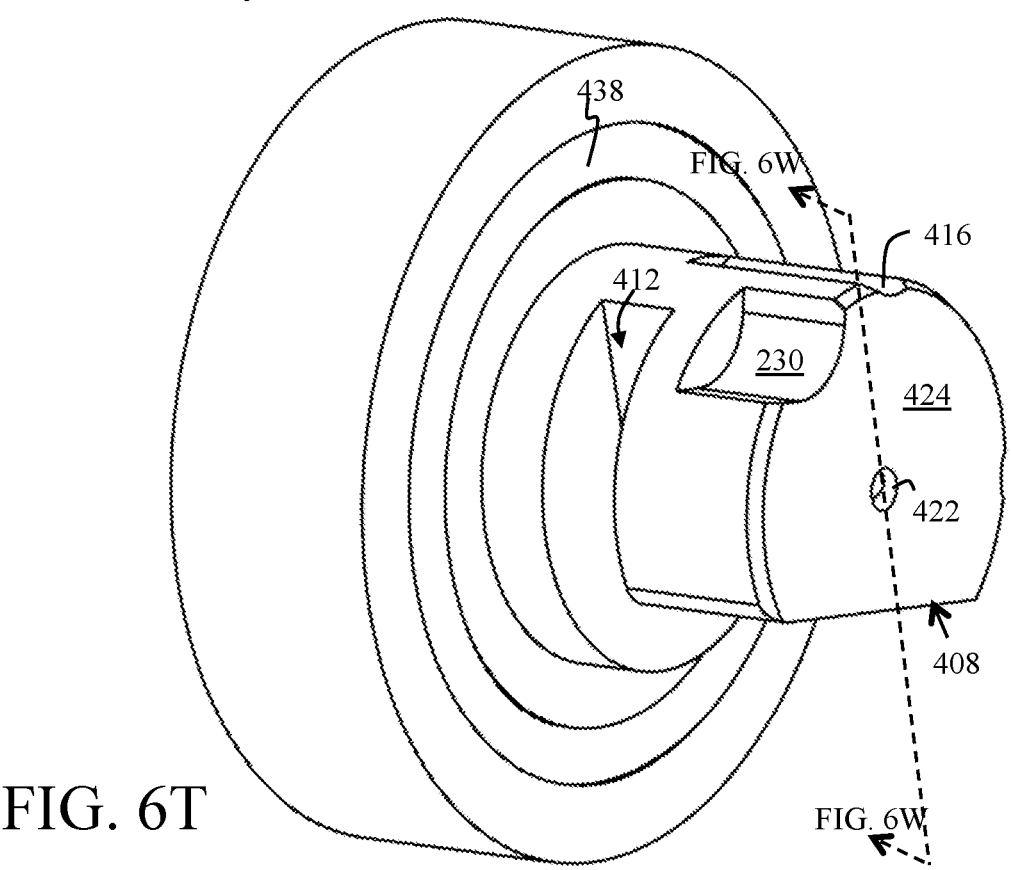
Figure 6U:
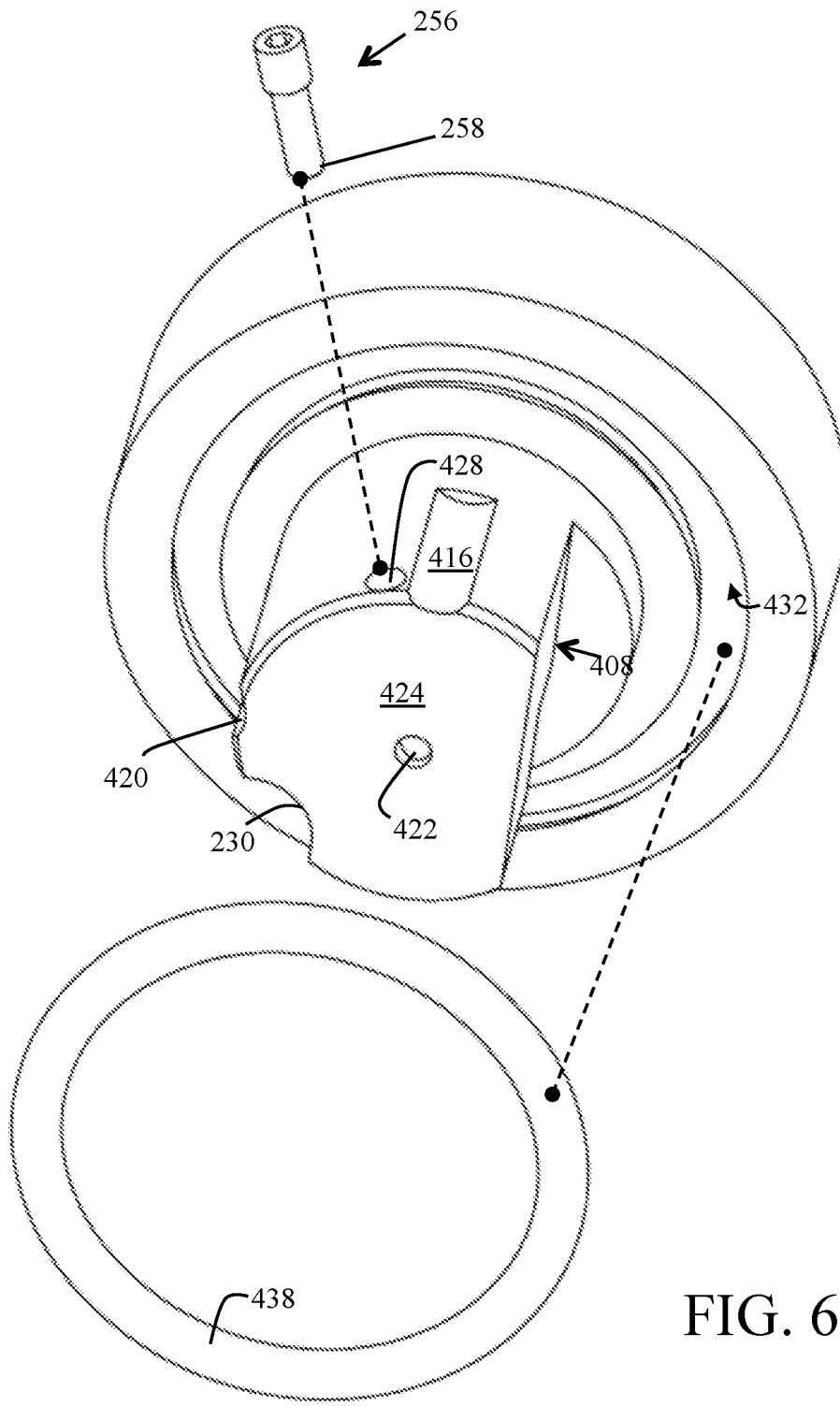
Figures 6V, 6W:
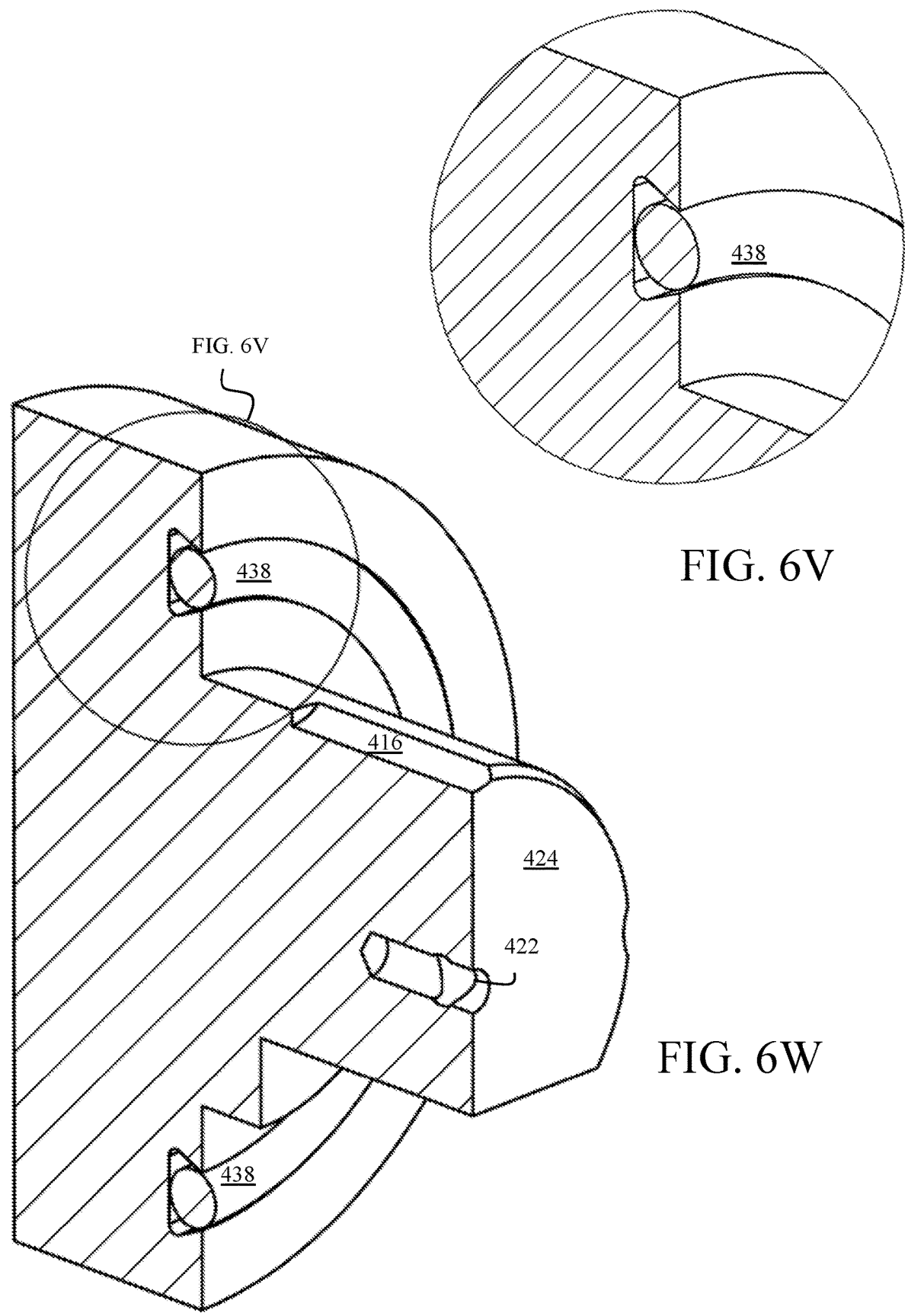
Figure 6X:
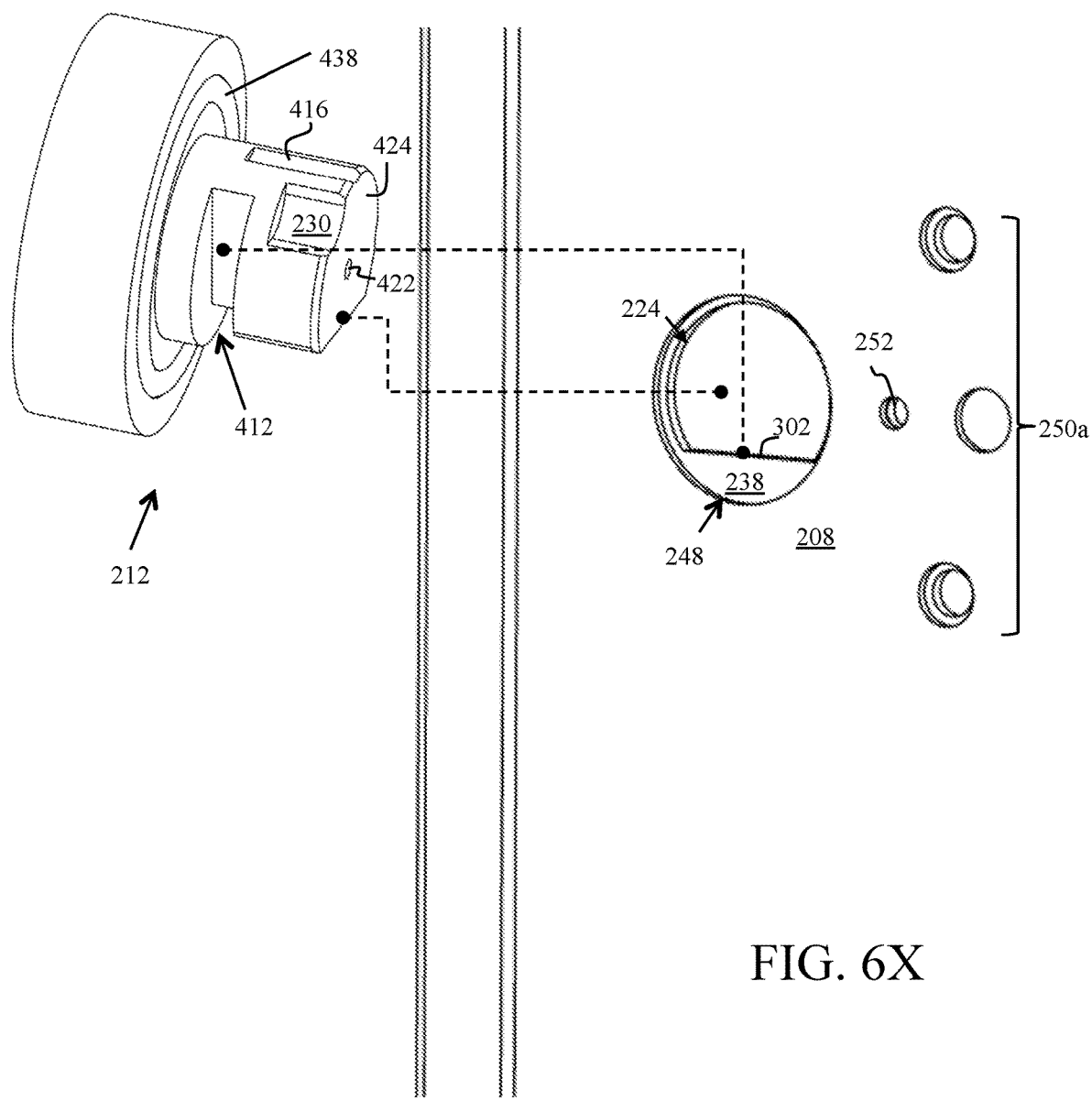

FIGS. 6A to 6X are non-limiting, exemplary perspective view illustrations of an interlock mechanism in accordance with one or more embodiments of the present invention, with FIG. 6X detailing cooperative relationship between interlock mechanism 212, main opening 248 of wall 208 of cabinet 202, and interlock opening 224 of support structure 238. As illustrated in FIGS. 6A to 6X and indicated above, interlock mechanism 212 (as part of keyless lock assembly 114) may be thought of as a lock-cap in a non-limiting, exemplary form of a slug—typically a rounded piece or metal with specific interlocking surfaces that provides the primary locking strength of keyless lock system 100 while capping interlock opening 224 and main opening 248.

Interlock mechanism 212 interlocks with one of a wall 208 of cabinet 202 and support structure 238, or just wall 208 of cabinet 202 (if no support structure 238 is used), which prevents a translational motion of interlock mechanism 202 and hence, removal thereof from interlock opening 224 and main opening 248. That is, prying out or pulling interlock mechanism 212 would be at the very least, very difficult if not impossible.

Another benefit of interlock mechanism 212 is that the interlocking structural aspects of interlock mechanism 212 with interlock opening 224 and main opening 248 enables latching solenoid 112 to simply latch interlock mechanism 212 in a lock position to prevent rotational motion of interlock mechanism 212, which, in turn, prevents the translational motion of interlock mechanism 212. This way, latching solenoid 112 (the secondary locking strength of keyless lock system 100) is not responsible for preventing a translational motion of interlock mechanism 212, which may be a strong pry attack.

As illustrated in FIGS. 6A to 6X, interlock mechanism 212 is a single piece module comprised of a cap portion 402 and lock portion 404 that protrudes from cap portion 402. Lock portion 404 is generally configured commensurate main opening 248 and interlock opening 224 of respective wall 208 of cabinet 202 and support structure 238 for insertion and removal of lock portion 404 of interlock mechanism 212.

Lock portion 404 has a generally cylindrical body 406 with a flat side 408 and curved side 410 that match the configuration of interlock opening 224. It should be noted that other configurations are contemplated, for example, cylindrical body 406 of lock portion 404 may include two or more flat sides 408 commensurate with a complementary set of corresponding number of interlocking edges 302 of interlock opening 224.

Lock portion 404 is further comprised of one or more locking surfaces, including an interlock recess or groove 412 that engages interlocking edge 302 (e.g., a projection) of one or both of wall 208 of cabinet 202 and or support structure 238, which prevents a translational motion of interlock mechanism 212.

Interlock recess (or groove, cavity, etc.) 412 is oriented transverse (parallel circular cross section) of lock portion 404, near a top of lock portion 404 and has sufficient depth 414 (FIG. 6B and 6K) for a stronger interlocking grip or hold with interlock edge 302 of interlock opening 224. It should be noted that the number and position of the interlock recess or cavity 412 may be varied commensurate with number and position of interlock edge 302 of support structure 238 (or that of an opening 248 of wall 208 if support structure 238 is not used). That is, for example, cylindrical body 406 of lock portion 404 may include two or more interlock recesses (or grooves) 412 instead of the illustrated single groove or cavity 412. This way, the configuration of interlock opening 224 may also vary to include two or more interlock edges 302, etc.

Lock portion 404 is further comprised of an optional insertion index 416 that is oriented parallel a longitudinal axis 414 of lock portion 404. Insertion index 416 is comprised of a groove that partially extends a length 418 of lock portion 404 that is carved on curved side 410 of lock portion 404. A ball bearing 242 of a well-known ball bearing spring 240 (best shown in FIG. 2J-2) rides within insertion index 416 (best shown in FIG. 2I-2), which facilitates proper alignment and insertion/extraction of interlock mechanism 212 from interlock opening 224.

Lock portion 404 further includes a lock index 420 comprised of a groove carved at curved side 410 of lock portion 404, and oriented parallel longitudinal axis 414 of lock portion 404, but at approximately Ω° degrees (FIG. 6F) away from insertion index 416 (about 90° degrees). The size of lock index 420 may be identical or different from that of insertion index 416. It should be noted that the angle of separation of Ω° degrees between insertion index 416 and lock index 420 is dictated by the degree that is needed to rotate interlock mechanism 212 from unlock position (at the insertion index 416) to lock position (at the lock index 420), which is dictated by the positioning of interlock recess 412. Accordingly, varying the location, positioning, and or orientation of the various lock features (e.g., insertion index 416, lock index 420, interlock recess 412, etc.) of lock portion 404 may vary separation angles between the various locking features as desired.

The ball bearing 242 of ball bearing spring 240 (best shown in FIG. 2G-5) rides within lock index 420, which facilitates proper alignment and hold in position of interlock mechanism 212 when at lock position. The combination of ball bearing spring 240 and groove of lock index 420 enables users to hear a "click" or snap sound and "feel" interlock mechanism 212 resting in proper lock position so that interlock mechanism 212 is not over exerted (or over rotated) against latch 232. Further, even if over exerted (or over rotated), lock index 420 configuration enables interlock mechanism 212 to self-correct to a proper lock position and slide back into the smooth groove channel that defines lock index 420 due to the exerted force from ball baring spring 240, which moves back the over-rotated interlock mechanism 212 back to a proper lock position with latch 232 in a generally mid portion of relief 230—not contacting interlock mechanism 212. Ball bearing spring 240 is biased to push ball bearing 242 out of its housing and into a rest position within lock index 420, slightly forces the movement of interlock mechanism 212 to self-correct to proper lock position. If over rotated, the frictional engagement between latch 232 and the contacting surfaces of relief 230 may be of such strength that it may counter any pulling force from solenoid latch 112, preventing withdrawal (or extraction) of latch 232 from relief 230. Lock index 420 ensures that latch 232 is always free to move in and out of relief 230. It should be noted that optionally, relief 230 itself may include a protrusion that would operate as a lock "index" or indication and hence, there would not be any need for a ball bearing spring and associated groove for self-correcting locking position of interlock mechanism 212.

As indicated above, lock portion 404 includes relief 230 in a form of a indentation (a concavity) positioned at curved side 410 of lock portion 404, near insertion index 416 and above a distal end of locking recess 412, with relief 230 receiving latch 232 (best shown in FIG. 2G-5) of the latching solenoid 112 (as is well known, latch 232 is biased out and snaps to extended lock position).

Lock portion 404 further includes a central opening 422 at a bottom surface 424 for receiving a first end of a tether 426, and a lateral opening 428 near bottom surface 424 (generally perpendicular central opening 422), with lateral opening 428 leading into central opening cavity at an angle of about 90° degrees. Lateral opening 428 is used for insertion of a fastener 256 (best shown in FIG. 6U), an end 258 of which reaches and contacts the first end of tether 426 within central opening 422 of interlock mechanism 212 for detachably securing tether 426 to interlock mechanism 212. As best illustrated in FIG. 2G-5, a second end 430 of tether 426 is a loop that is lassoed around a fastener 254 to detachably secure tether 426, with tether 426 preventing loss or misplacement of interlock mechanism 212.

As further illustrated in FIGS. 6A to 6X, interlock mechanism 212 is also comprised of cap portion 402. Cap portion 402 includes an annular tapered grooved 432 where an upper opening 434 that has a shorter span than the actual channel width 436 for receiving and securely housing a sealing member 438 (best shown in FIGS. 6S to 6W).

Sealing member 438 hermetically seals main opening 248 of cabinet 202 when interlock mechanism 212 is in lock position. In other words, sealing member 438 prevents water or debris from entering main opening 248 of cabinet 202. In general, sealing member 438 may comprise of an O-ring gasket (best shown in FIG. 6U) that engages hasp 214/216 (detailed below).

FIG. 6X details the cooperative relationship between interlock mechanism 212, main opening 248 of wall 208 of cabinet 202, and interlock opening 224 of support structure 238. As illustrated, when interlock opening 224 is positioned behind and aligned with main opening 248 at the interior side of wall 208, interlocking edge 302 of interlock opening 224 blocks part of main opening 208 to function as a "projection" when associated with the fully rounded main opening 248 of wall 208. This "projection" (interlock edge 302) is received within interlock groove or recess 412 of interlock mechanism 212. The engagement or interlocking of interlock edge 302 within interlock groove or recess 412 prevents removal of interlock mechanism 212 out of main opening 248 unless interlock mechanism 212 is first rotated. That is, rotating interlock mechanism 212 clears interlock groove or recess 412 away from interlock edge 302, enabling easy removal of interlock mechanism 212 to unlock and open access to cabinet 202.

Figure 7C:
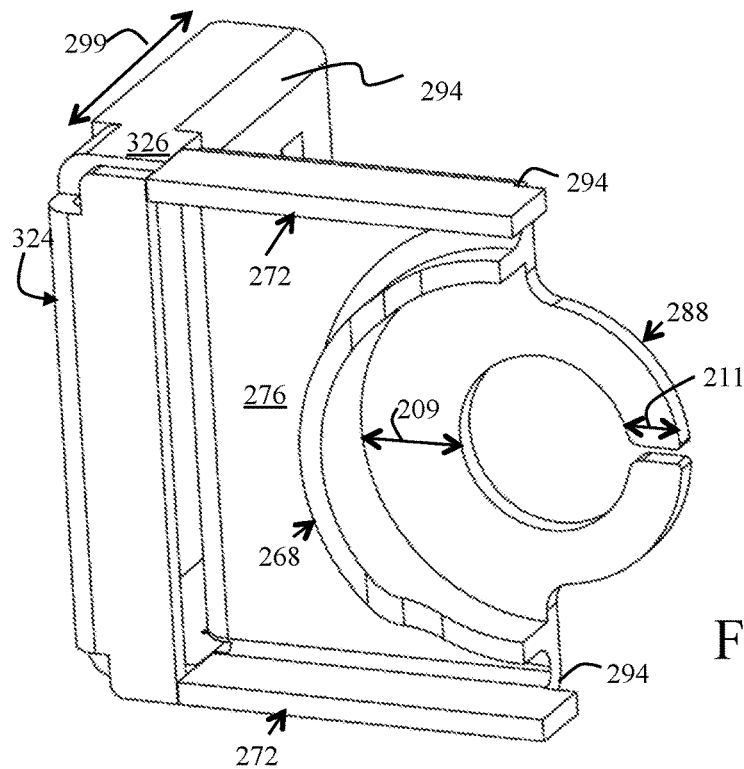
Figure 7D:
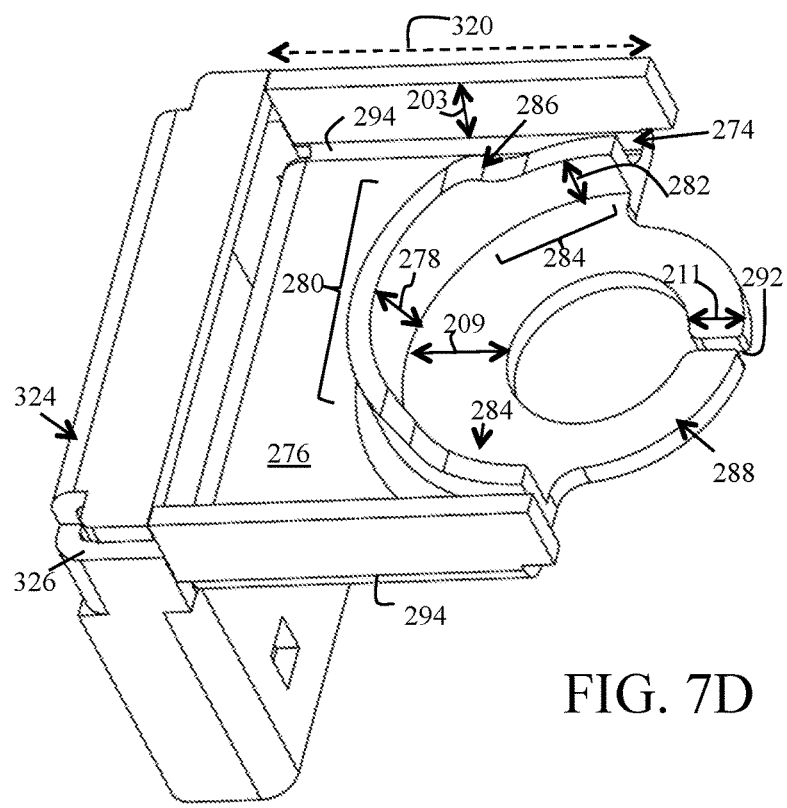
Figure 7G:
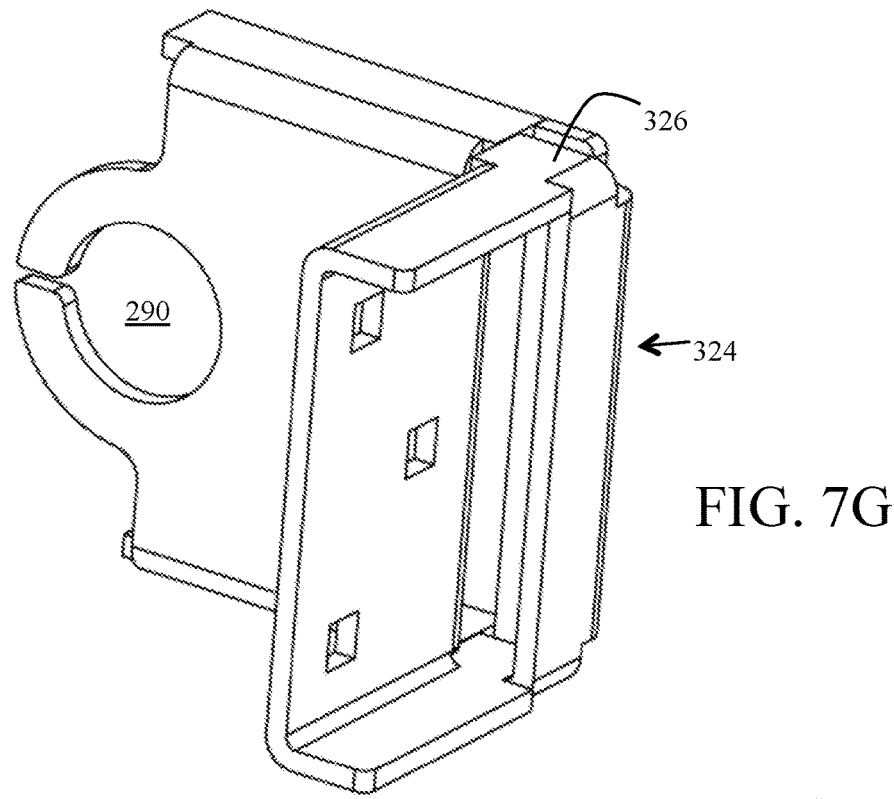
Figure 7H:
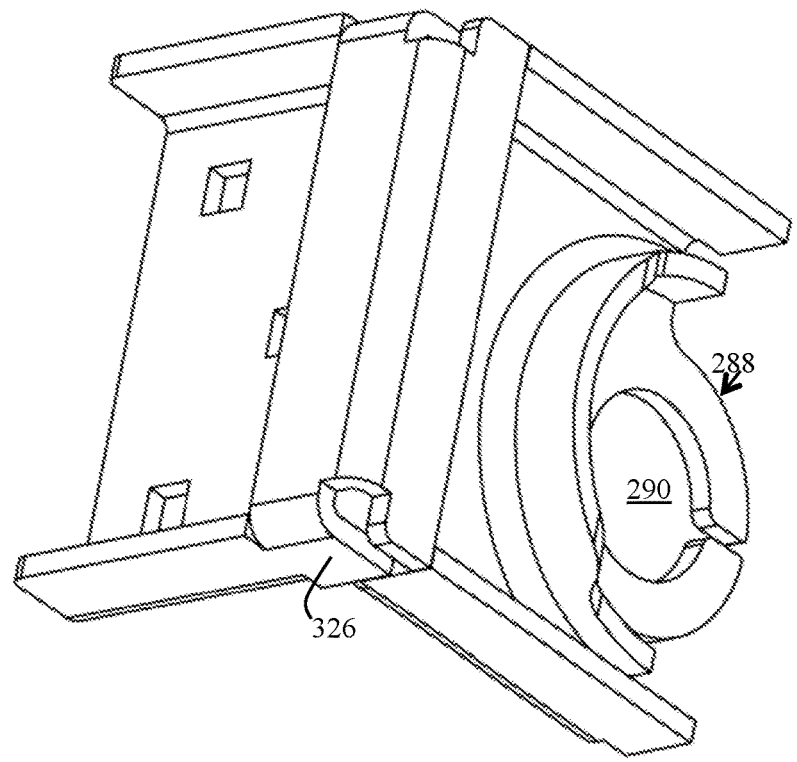
Figure 7I:
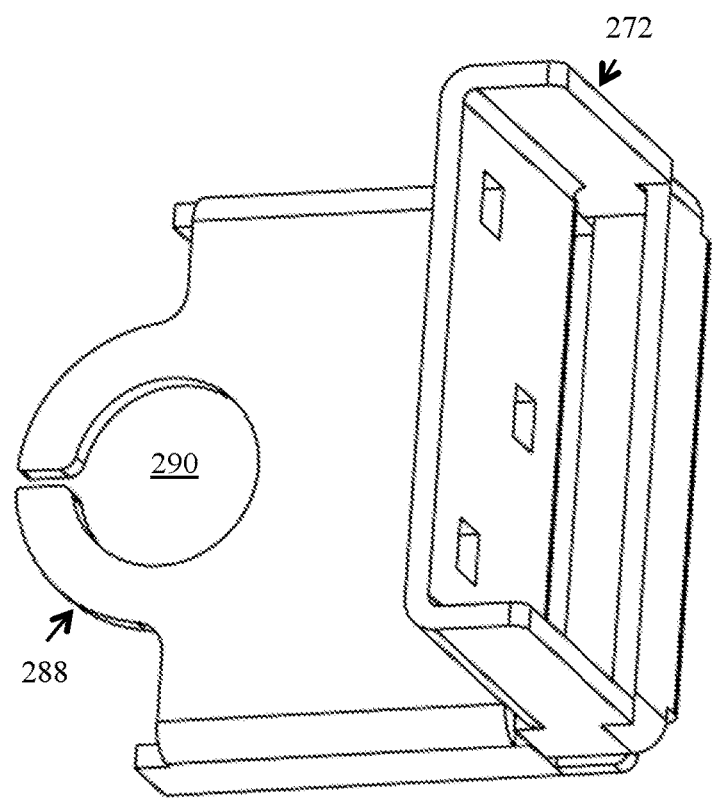
Figure 7J:
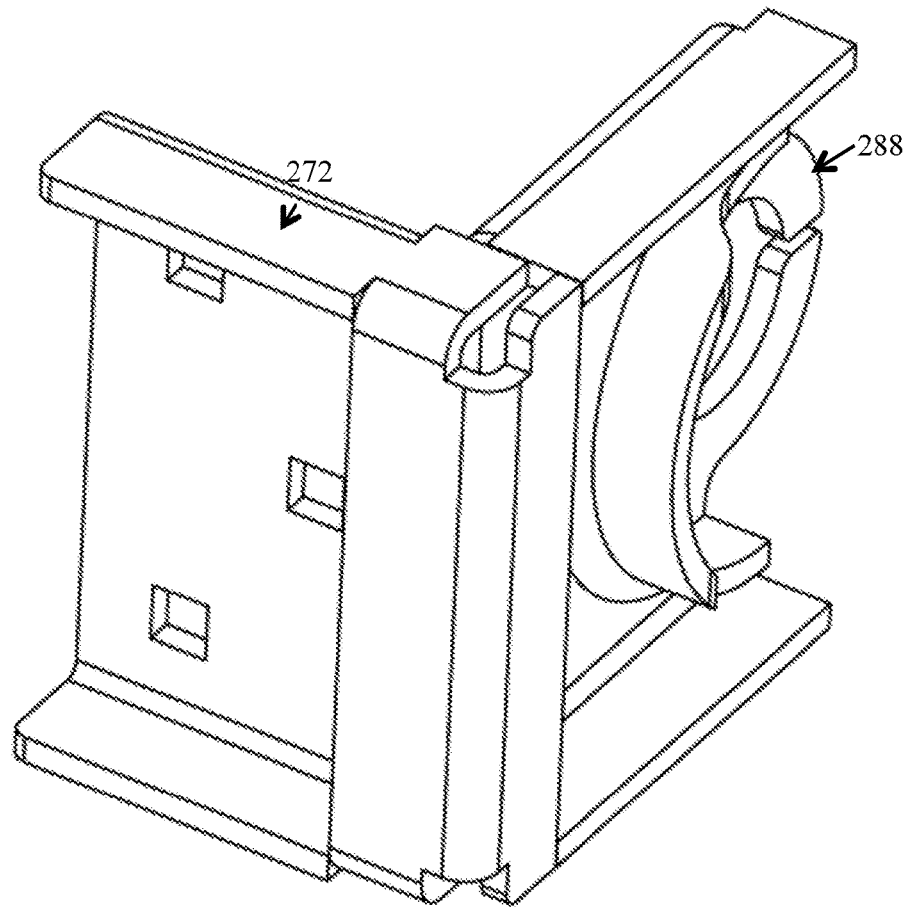
Figure 7K:
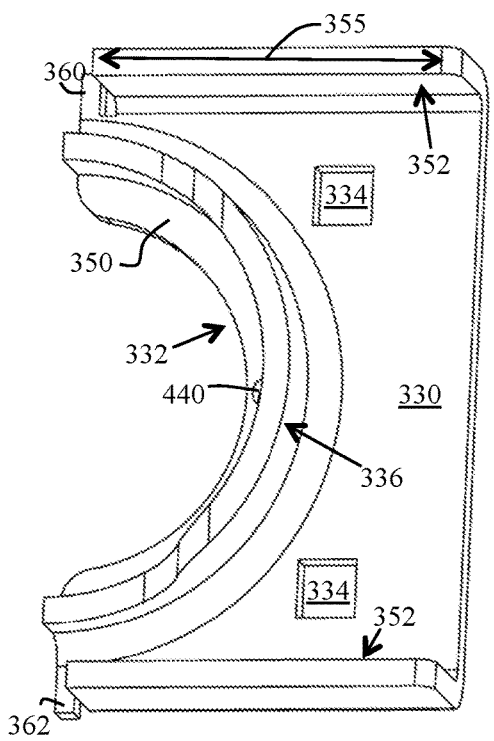
Figure 7L:
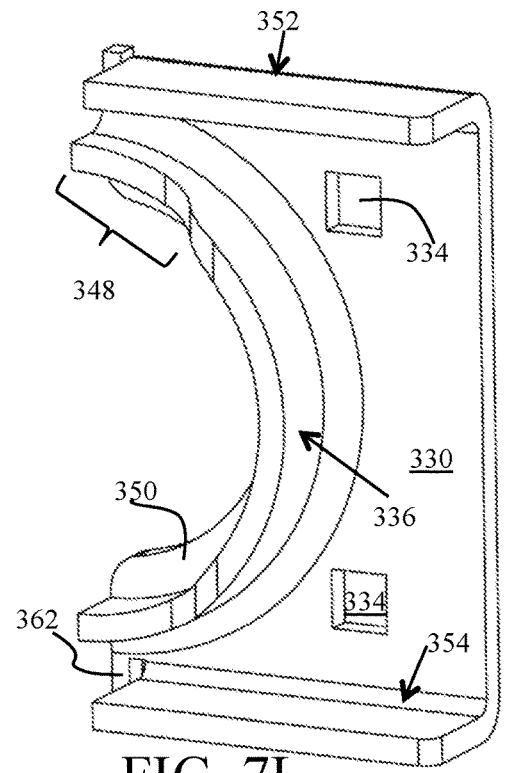
Figure 7M:
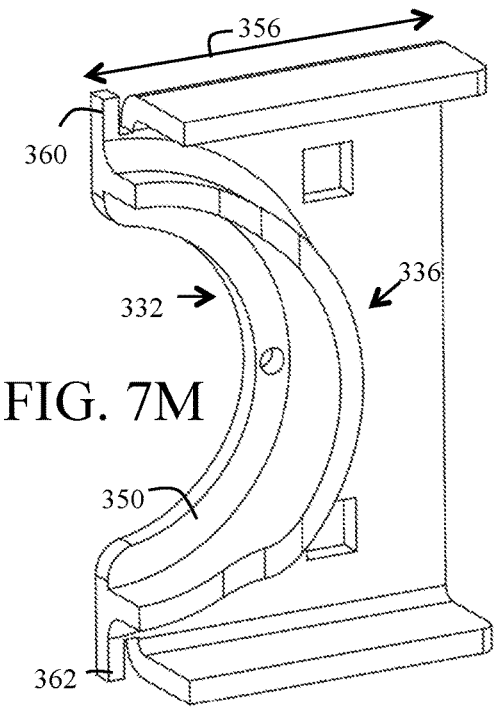
Figure 7N:
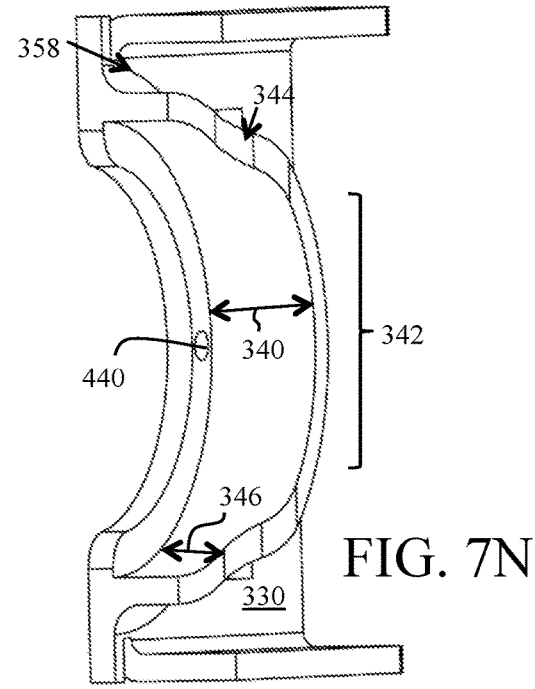
Figure 7O:
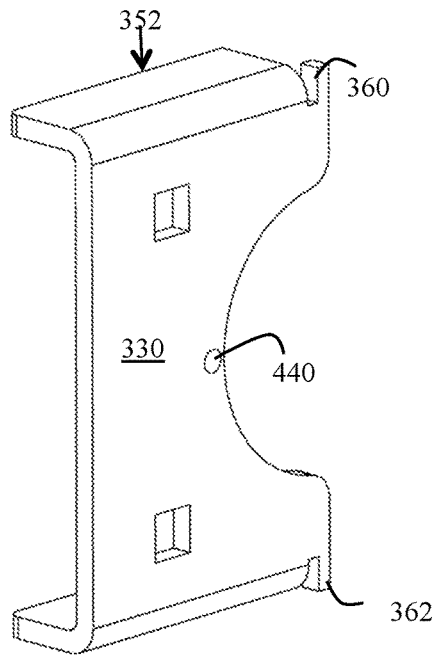
Figure 7P:
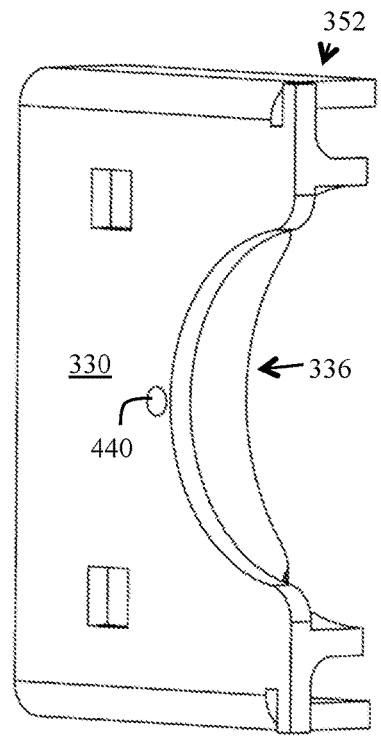
Figure 7Q:
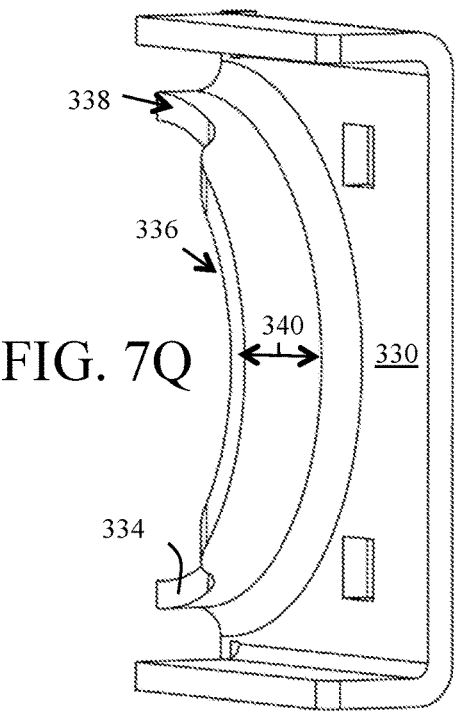
Figure 7R:
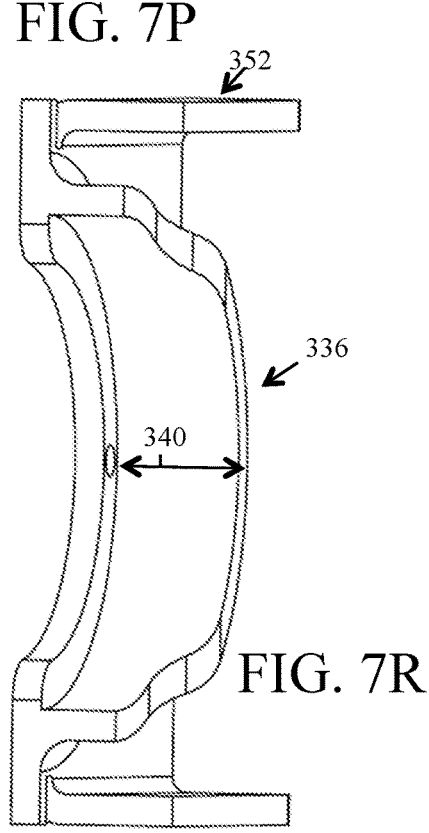

FIGS. 7A to 7R are non-limiting, exemplary perspective view illustrations of a hasp in accordance with one or more embodiments of the present invention. As illustrated in FIGS. 7A to 7R and indicated above, keyless lock assembly 114 includes a hasp 214/216 with a function of maintain door 206 in lock position and protecting interlock mechanism 212 against possible attack (e.g., prying, application of torque, or others). In the non-limiting, exemplary instance in the non-limiting, exemplary embodiment illustrated FIGS. 7A to 7R the hasp is comprised of a first hasp piece 214 (FIGS. 7A to 7J) and second hasp piece 216 (FIGS. 7K to 7R).

As further detailed below, both hasp pieces are comprised of a protective shroud (or guard structures) that limits access to interlock mechanism 212. That is, access is limited to surfaces of interlock mechanism 212 against physical attack by application of levered and or torque force. For example, if a rigid bar is used to apply a levered force, one end of that rigid bar must somehow be mechanically contacted with a surface of the interlock mechanism to provide sufficient force to pry out the interlock mechanism. As another example, if a torque force is applied to rotate the interlock mechanism, then the tool used to apply the torque force must somehow mechanically contact with a surface of the interlock mechanism. The shrouds strategically surround the interlock mechanism, which provide very limited physical access to surfaces that may potentially be used to apply forces, for example levered or torque forces. Of course, the shroud provides sufficient access to the interlock mechanism to allow for mounting and removal of the interlock mechanism without the use of tools. In other words, there is sufficient room for human fingers to grasp onto to maneuver the interlock mechanism to properly mount and lock, and properly unlock and dismount, but with no room to fit or use tools to operate the interlock mechanism.

As illustrated in FIGS. 7A to 7J, first hasp piece 214 includes a first engagement section 260 generally configured commensurate with a cap portion 402 of interlock mechanism 212 configuration associated, and a first connection section 262 with one or more openings for mounting first hasp piece 214 using fasteners 254. First connection section 262 of first hasp piece 214 is oriented at an angle a in relation to first engagement section 260 of first hasp piece 214.

First connection section 262 of first hasp piece 214 may for example, be connected to a lock-side 266 corner (FIGS. 2F and 2A) of hinged door 206 of cabinet 202 that is at an angle (generally, about α≈90° degrees or so) in relation to an adjacent wall 208 of cabinet 202 (adjacent to the lock-side 266 of hinged door 206 when door 206 is at closed position). First engagement section 260 may be free and oriented to align with (parallel the plane of) adjacent wall 208 when door 206 is closed. As detailed below, second hasp piece 216 may than be connected to adjacent wall 208 (adjacent lock-side 266 of the door 206), and also aligned with first engagement section 262 of first hasp piece 214 when door 206 is at closed position in relation to adjacent wall 208.

As detailed below, it should be noted that the first hasp piece need not have an angled connection section if keyless lock assembly 114 is connected to enclosure members that are aligned (inline) or share a common plane (e.g., cargo doors where in closed position, both of the lock-sides of both of the doors of the cargo doors are aligned or when lock-side of a hinged door is aligned with an adjacent wall (rather than at some angle as shown in FIGS. 2A to 4D).

First hasp piece 214 further includes a first inner protective structure (e.g., inner shroud) 268 that partially surrounds cap portion 402 of interlock mechanism 212, leaving a small space 270 to reach an exposed parts (best illustrated in FIGS. 2A, 2B and 2C) of cap portion 402 of interlock mechanism 212 for operation. That is, as best illustrated in FIG. 2C, the exposed parts of cap portion 402 enable a user hand to grab onto cap portion 402 and rotate along path 218.

First hasp piece 214 further includes a first outer protective structures (e.g., outer shroud) 272 that in combination with first inner protective structure 268 further limit access to small space 270 to provide limited physical access to exposed part of cap portion 402 of interlocking mechanism 212 for hand use rather than use of any tools. That is, first outer protective structure 272 provides a small space 274 (best shown in FIG. 7A) between itself and inner protective structure 268, which prevents and blocks insertion of prying tools to force out interlock mechanism 212 from main opening 248 (and hence, being forcefully dislodged from interlock opening 224) using the prying tool.

First inner protective structure 268 is a projection that generally vertically extends or protrudes from an engagement section base 276, and has a first height 278 that has a longer span at a generally middle section 280, which slopes 286 to a first lower height 282 with shorter span at generally distal sections 284, with structure 268 having a longitudinal (or lengthwise) configuration that is commensurate with a portion of cap portion 402 of interlock mechanism 212. In this non-limiting, exemplary instance, first inner protective structure 268 is semi-circular wall that partially encompasses (encircles) part of cap portion 402 of interlock mechanism 212 while providing sufficient spacing 270 for a user hand to reach to and operate interlock mechanism 212 (best shown in FIG. 2C).

First engagement section 260 is further comprised of a first locking base 288 defined by a lock-opening 290 positioned eccentrically at first locking base 288. In other words, span 209 at one side of first locking base 288 is greater than span 211 at the other side. Lock-opening 290 receives a lock portion 404 of interlock mechanism 212, with cap portion 402 resting on first locking base 288. That is, bottom side 468 (FIG. 6M) of cap portion 402 (including seal 438) of interlock mechanism 212 engages first locking base 288, with side-part 470 of cap portion 402 partially encompassed by first inner protective structure 268. It should be noted that optionally, first locking base 288 may comprise of a slit 292 for enabling passage of an optional tether 426 of interlock mechanism 212.

First outer protective structures 272 of first hasp piece 214 are comprised of flanges that generally protrude vertically from first lateral ends 294 of engagement section base 276 of engagement section 260 and connection section base 277 of connection section 262. First outer protective structures 272 have a longitudinal axis 296 and 297 that extend a full length 298 and 299 of engagement section base 276 of engagement section 260 and connection section base 277 of connection section 262.

In general, a length 320 of first outer protective structures 272 extend beyond length 298 of engagement section base 276 of engagement section 260 (as indicated by reference 201 in FIG. 7E). First outer protective structures 272 have a height 203 that is generally uniform. It should be noted that combination of first outer protective structures 272 near distal sections 284 (with shortest height 282) of first inner protective structure 268 (height difference 205 shown in FIG. 7E) allow limit physical access and reach to exposed part of cap portion 402 of interlocking mechanism 212 for a users fingers (as best illustrated in FIG. 2C) by providing a vary small space 274, but prevent use and reach of prying tools to access cap portion 402.

It should be noted that in this non-limiting, exemplary embodiment, an adjoining section (part or corner) 322 of connection section 262 and engagement section 260 of first hasp piece 214 includes adjoining protective structure 324 against prying forces (torque or otherwise). It includes extended tab 326 that are connected with the first outer protective structures 272 of both connection section 262 and engagement section 260. In this non-limiting, exemplary instance, only connection section base 277 at connection section 262 of first hasp piece 214 has connection holes 328 for securely fixing first hasp piece 214 onto an enclosure member (e.g., a door 206 of cabinet 202). There are no connection holes 328 on engagement section base 276 of engagement section 260 of first hasp piece 214.

FIGS. 7K to 7R are non-limiting, exemplary perspective view illustrations of a second hasp piece in accordance with one or more embodiments of the present invention. As illustrated, second hasp piece 216 includes a base 330 that is comprised of a second engagement section 332 that is generally configured commensurate with a second portion (second half) of cap portion 402 of interlock mechanism 212 configuration (best shown in FIGS. 2A to 2F). Base 330 of second hasp piece 216 further includes one or more connection openings 334 on base 330 for securely fixing second hasp piece 216 onto an enclosure member (e.g., door 206, wall 208, etc. of a cabinet 202) using fasteners 254.

Second engagement section 332 includes a second inner protective structure (e.g., an inner shroud) 336 that partially surrounds cap portion 402 of interlock mechanism 212, leaving a small space 338 to access and reach an exposed part (as best illustrated in FIGS. 2A to 2C) of cap portion 402 of interlock mechanism 212 for operation. That is, as best illustrated in FIG. 2C, the exposed parts of cap portion 402 enable a user hand to grab onto cap portion 402 and rotate along path 218.

Second hasp piece further includes a second outer protective structures (e.g., an outer shroud) 352 that in combination with second inner protective structure 336 further limit access to the small space 338 (best shown in FIG. 7Q) to provide limited physical access to exposed part of cap portion 402 of interlocking mechanism 212 for hand use rather than use of any tools. That is, second outer protective structure 352 provides a small space between itself and inner protective structure 336, which prevents and blocks insertion of prying tools to force out interlock mechanism 212 from main opening 248 (and hence, being forcefully dislodged from interlock opening 224) using the prying tool.

Second inner protective structure 336 is a projection that generally vertically extends or protrudes from base 330, and has a second height 340 that has a longer span at a generally middle section 342, which slopes 344 to a second lower height 346 with shorter span at generally distal sections 348, with structure 336 having a longitudinal (or lengthwise) configuration that is commensurate with part of cap portion 402 of interlock mechanism 212. In this non-limiting, exemplary instance, second inner protective structure 268 is semi-circular wall with varying height that partially encompasses (encircles) part of cap portion 402 of interlock mechanism 212 while providing sufficient spacing 338 for a user hand to reach to and operate interlock mechanism 212 (best shown in FIG. 2C).

Second engagement section 332 is further comprised of a second locking base 350, with part of the bottom side of cap portion 402 resting on second locking base 350. As further illustrated, second locking base 350 includes one or more hidden (inconspicuous) openings 440 that may be used to further secure hap 216 onto a structure, with the openings 440 covered over by bottom side of cap portion 402 of interlock mechanism 212. As illustrated, second inner protective structure 336 partially surrounds openings 440 on second locking base 350. The auxiliary hidden opening 440 provides added protection and maintains keyless lock assembly 114 securely fixed onto a structure in the case where exposed fasteners 254 on hasp pieces 214 and 216 are grinded and pulled out.

Second outer protective structures 352 of second hasp piece 216 are comprised of flanges that generally protrude vertically from second lateral end 354 of base 330. Second outer protective structures 352 have a longitudinal axis that partially extend to near distal sections 348 of second inner protective structure 336 with shortest projection height 346, which further limit physical access to exposed part of interlocking mechanism 112. In general, a length 355 of second outer protective structures 352 is shorter than a length 356 of lateral ends 354 of base 330. It should be noted that combination of second outer protective structures 352 near distal sections 344 (with shortest height 346) of second inner protective structure 336 allow limit physical access and reach to exposed part of cap portion 402 of interlocking mechanism 212 for a users fingers (as best illustrated in FIG. 2C) by providing a vary small space 358, but prevent use and reach of prying tools to access cap portion 402. As further illustrated, base 330 further includes first and second extensions 360 and 362 positioned at lateral ends 354, at second engagement section, which operate as "filler" to fill in the void space due to the height or elevated position of the first hasp piece 214. In other words, first and second extensions 360 and 362 are positioned under sections 201 and 205 (FIG. 7E) when hasp pieces 214/216 are locked, which closes the underneath space (due to the elevated first piece 214), blocking insertion of prying tools.

FIGS. 8A to 13D are non-limiting, exemplary illustrations of a keyless lock system in accordance with another embodiment of the present invention. Keyless lock system 100a illustrated in FIGS. 8A to 13D includes similar corresponding or equivalent components, interconnections, functional, operational, and or cooperative relationships as keyless lock system 100 that is shown in FIGS. 1 to 7R, and described above. Therefore, for the sake of brevity, clarity, convenience, and to avoid duplication, the general description of FIGS. 8A to 13D will not repeat every corresponding or equivalent component, interconnections, functional, operational, and or cooperative relationships that has already been described above in relation to keyless lock system 100 that is shown in FIGS. 1 to 7R.

Figure 8A:
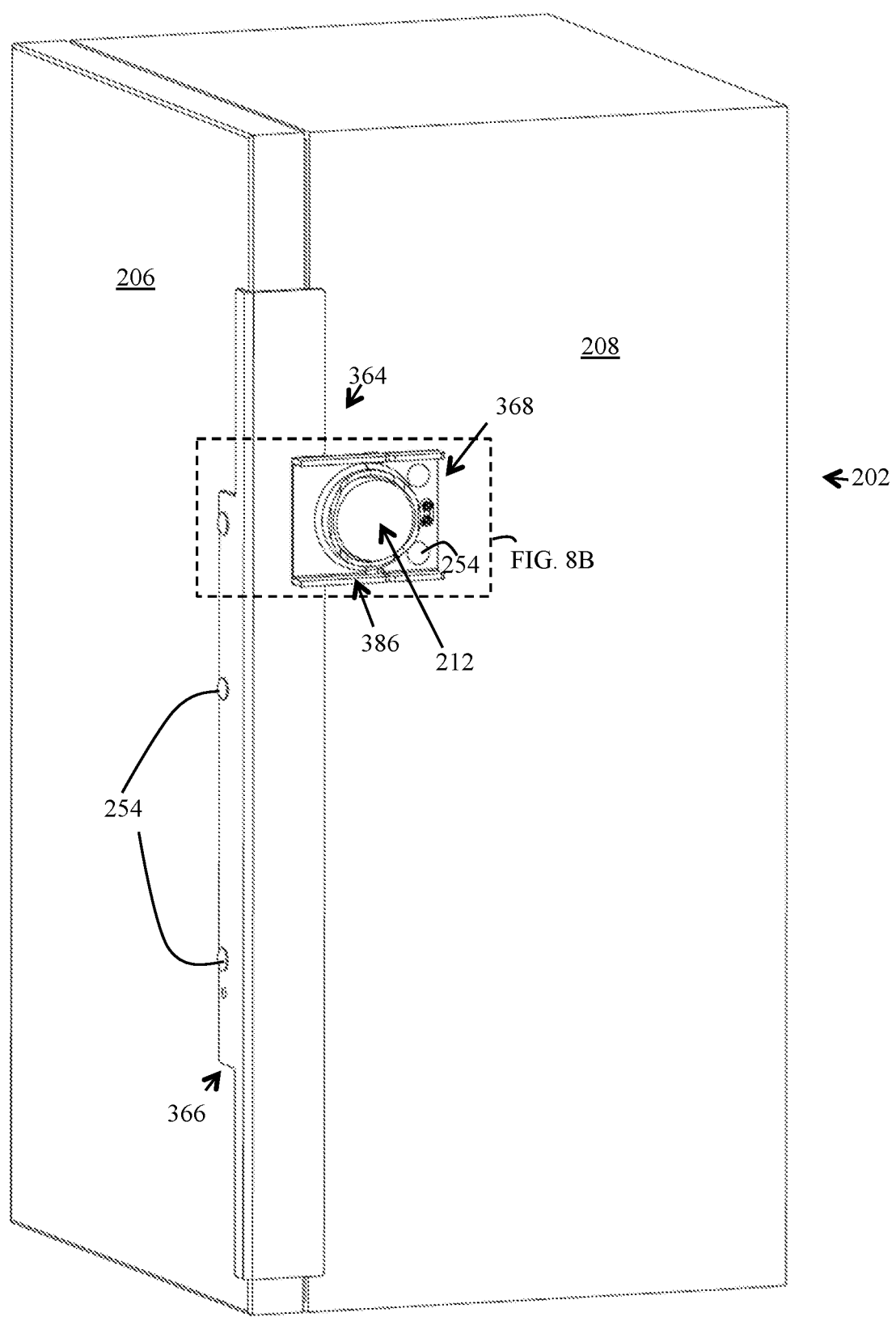
FIGS. 8A to 13D are non-limiting, exemplary illustrations of another keyless lock system in accordance with one or more embodiments of the present invention.
Figure 8B:
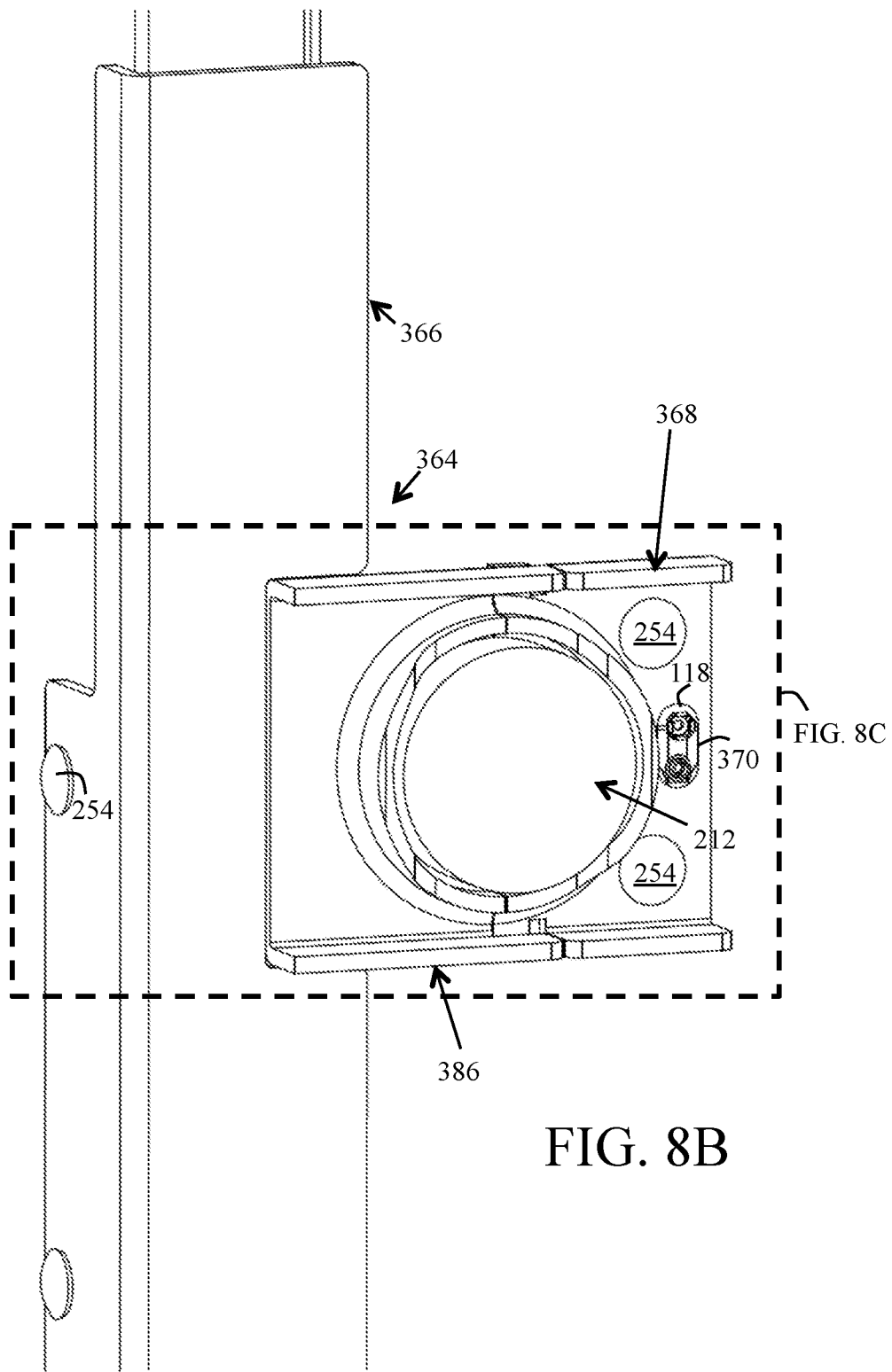
Figure 8C:
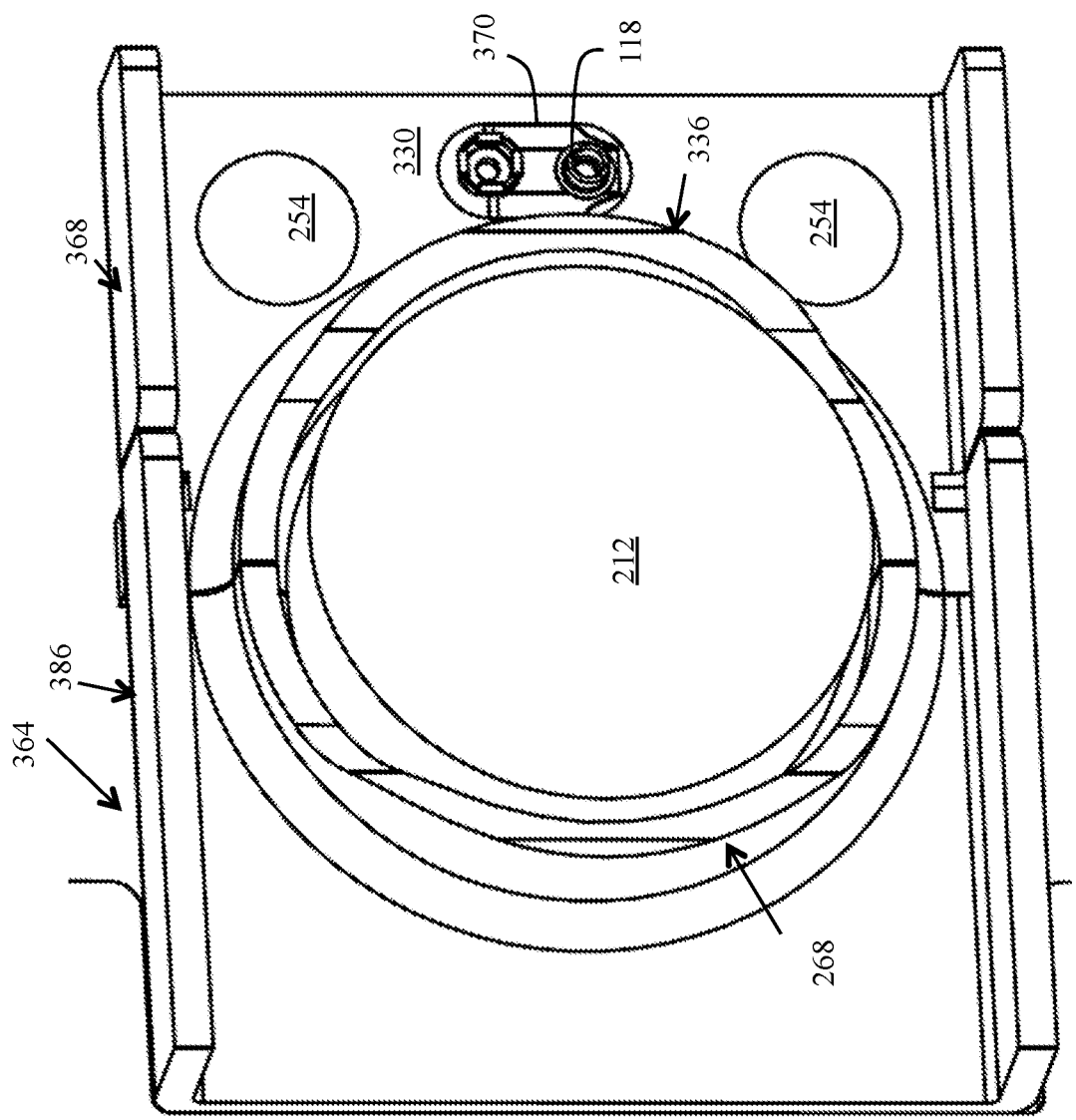
Figure 8C:
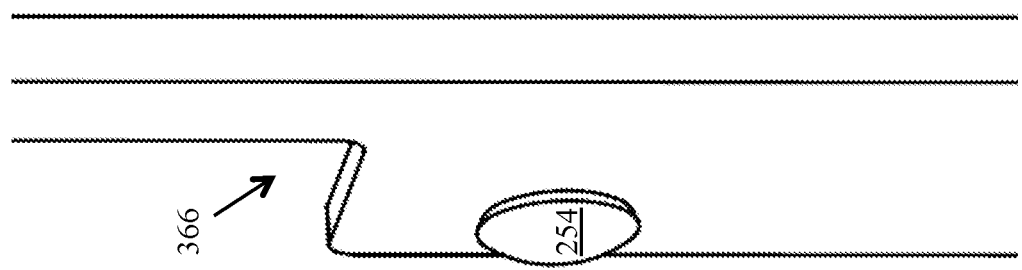
Figure 8D:
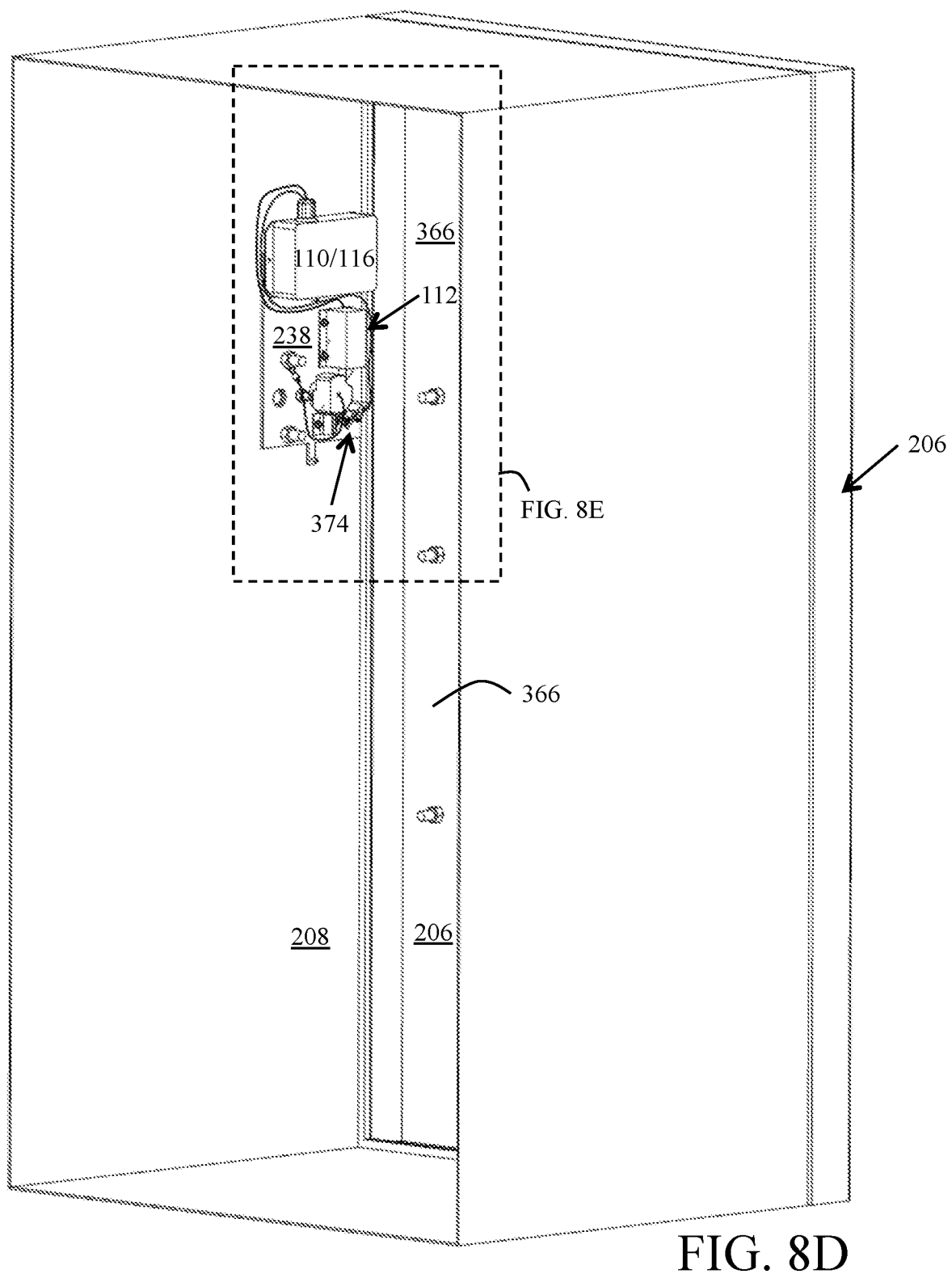
Figure 8E:
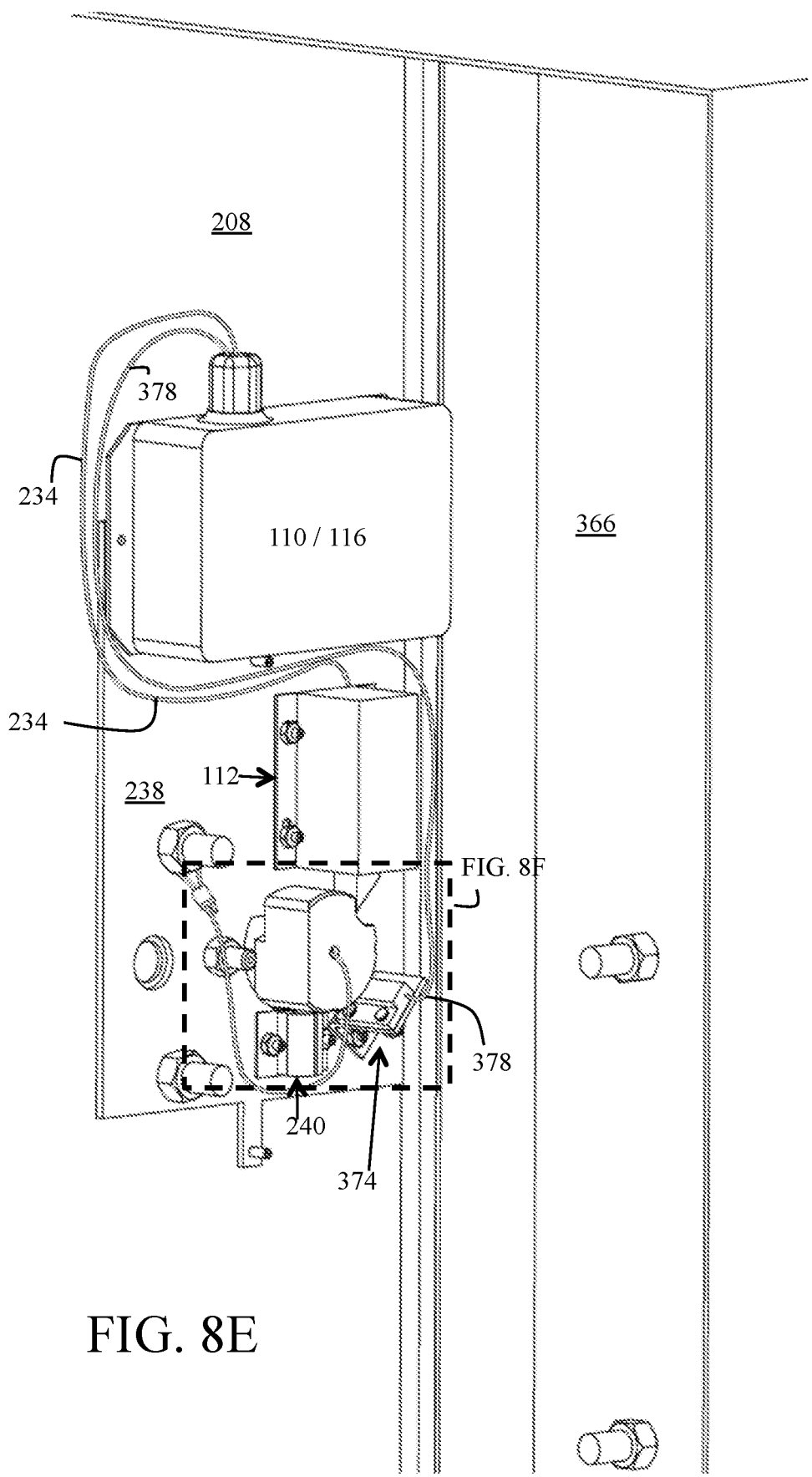
Figure 8F:
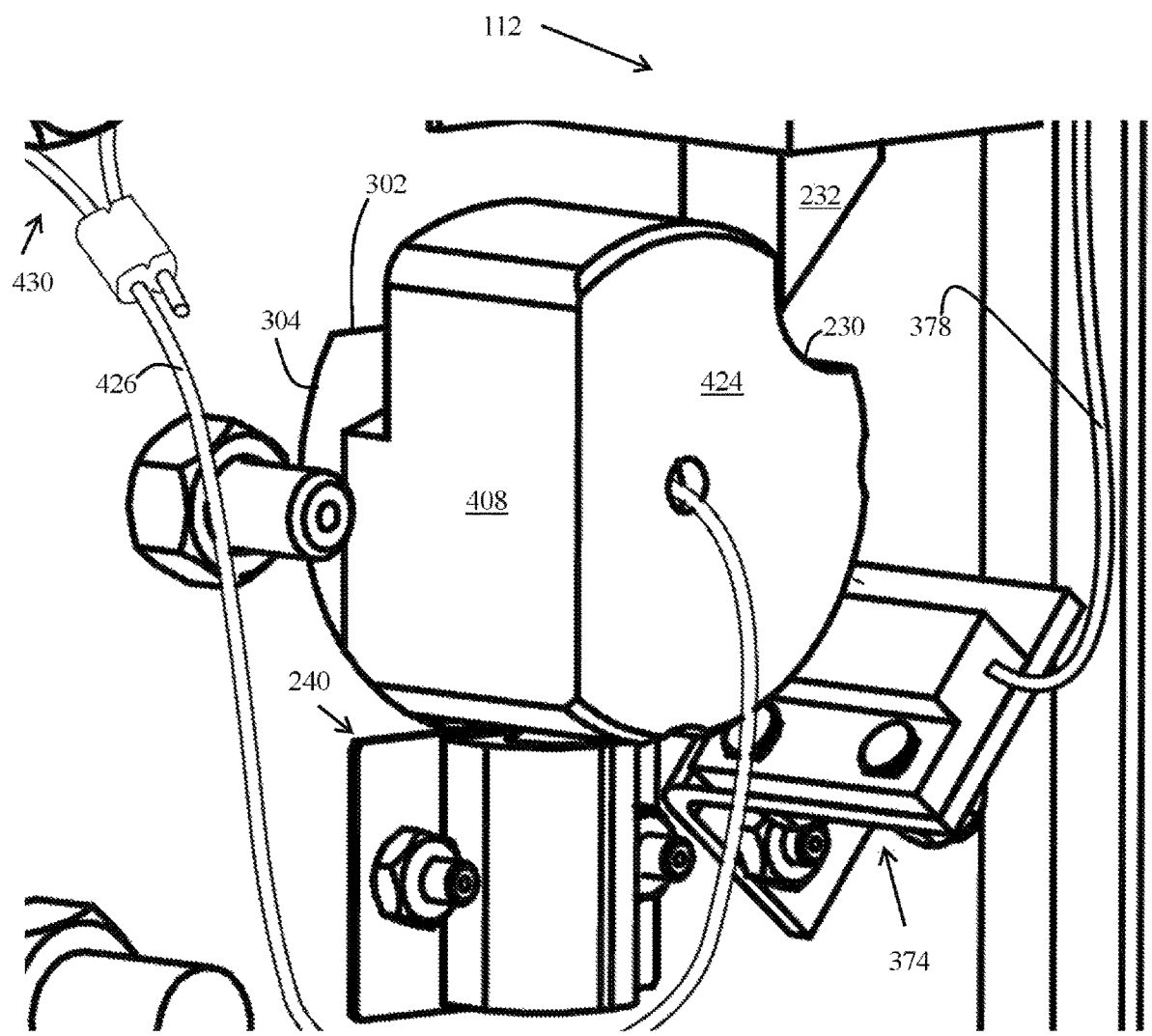

FIGS. 8A to 8C are non-limiting, exemplary exterior view illustrations of a keyless lock system 100a mounted onto a non-limiting, exemplary cabinet 202 in accordance with one or more embodiments of the present invention, and FIGS. 8D to 8F are non-limiting, exemplary interior view illustrations. As illustrated in FIGS. 8A to 8F, in this non-limiting, exemplary embodiment of keyless lock system 100a, first hasp piece 364 of keyless lock assembly 114 is comprised of an elongated first connection section 366, while second hasp piece 368 includes a terminal openings 370 at base 330 for housing outlet receptacle 118 electrically coupled (e.g., wire connected) with control module 110.

Control module 110 powers latching solenoid 112 based on received control signals. Control module 110 may supply power to latching solenoid 112 by an electrical wire connection or wireless. The outlet receptacles 118 may accept terminals of a power supply such as a 9-volt battery or others for example, which would directly power ON control module 110 through well known electrical wire connection in case of power failure to enable control module 110 to receive/transmit control signals. It should be noted that powering ON control module 110 via terminal 118 using a battery would not activate latching solenoid 112, but would simply power ON control module 110 for proper operation (e.g., to send and receive control signals—for example, send out a beacon if control module 110 is a Wi-Fi, Bluetooth, NFC, GPS (or other location based systems), etc.). Latching solenoid 112 will only be activated if lock/unlock control signal for latching solenoid 112 is received by control module 110.

As further illustrated in FIGS. 8A to 8F, in this non-limiting exemplary embodiment of keyless lock system 100a, keyless lock assembly 114 includes a well known magnetic sensor 374 that may be used to detect the lock position of interlock mechanism 212. As detailed below, interlock mechanism 212 may include a magnet 376 that may be detected by magnetic sensor 374, which, in turn, would communicate a "lock-detected" signal to control module 110 via wire connection 378. Control module 110 in turn, may communicate the lock-detected signal to either a computing device 102 or a server computing device 106 via internet/network 104 for further processing in well known manner. It should be noted that other positioning sensors may also be used such as optical sensors, etc. and hence, the embodiments of the present invention should not be limited to magnetic or electromagnetic systems to detect lock position of interlock mechanism 212.

As also illustrated in FIGS. 8A to 8F, in this non-limiting exemplary embodiment of keyless lock system 100a, keyless lock assembly 114 also includes similar components such as for example latching solenoid 112 and ball bearing spring 240 however, in this embodiment, the position and orientation of latching solenoid 112 and ball bearing spring 240 is reversed. That is, latch 232 of latching solenoid 112 is oriented downward and ball bearing 242 of ball bearing spring 240 is oriented upward, which are the opposite of orientation disclosed above in relation of keyless lock system 100 (FIGS. 1A to 7R).

This way, latching solenoid 112 (which is more costly than ball bearing spring 240) is protected from falling debris, dust, or possible or potential leakage of water into cabinet 202. It should be noted that since the orientation and position of latching solenoid 112 and ball bearing spring 240 are varied, locking position of interlock mechanism 212 may also be varied commensurately (detailed below). For example, lock position of interlock mechanism is varied so that relief 230 may receive latch 232 of latching solenoid 112 as detailed above.

Figure 9A:
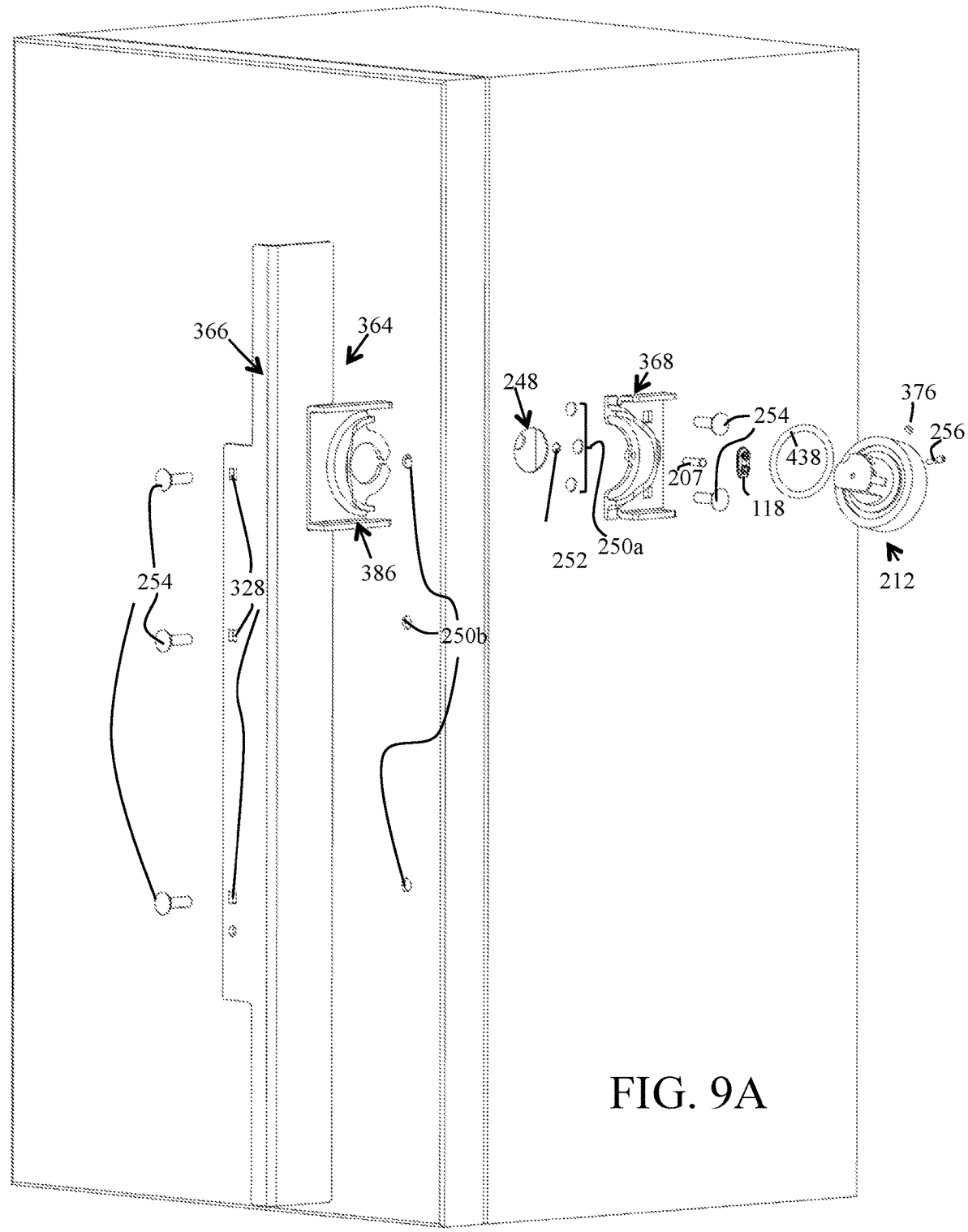
Figure 9B:
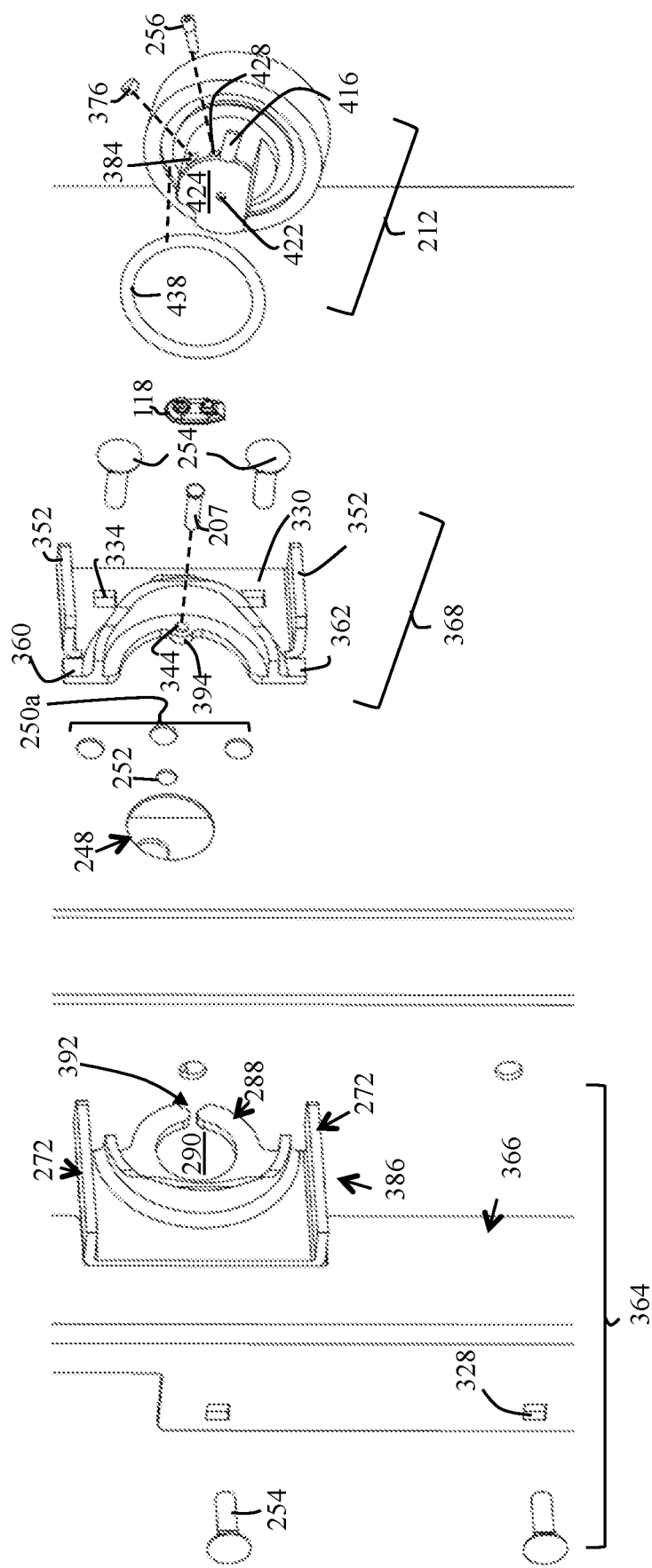
Figure 9C:
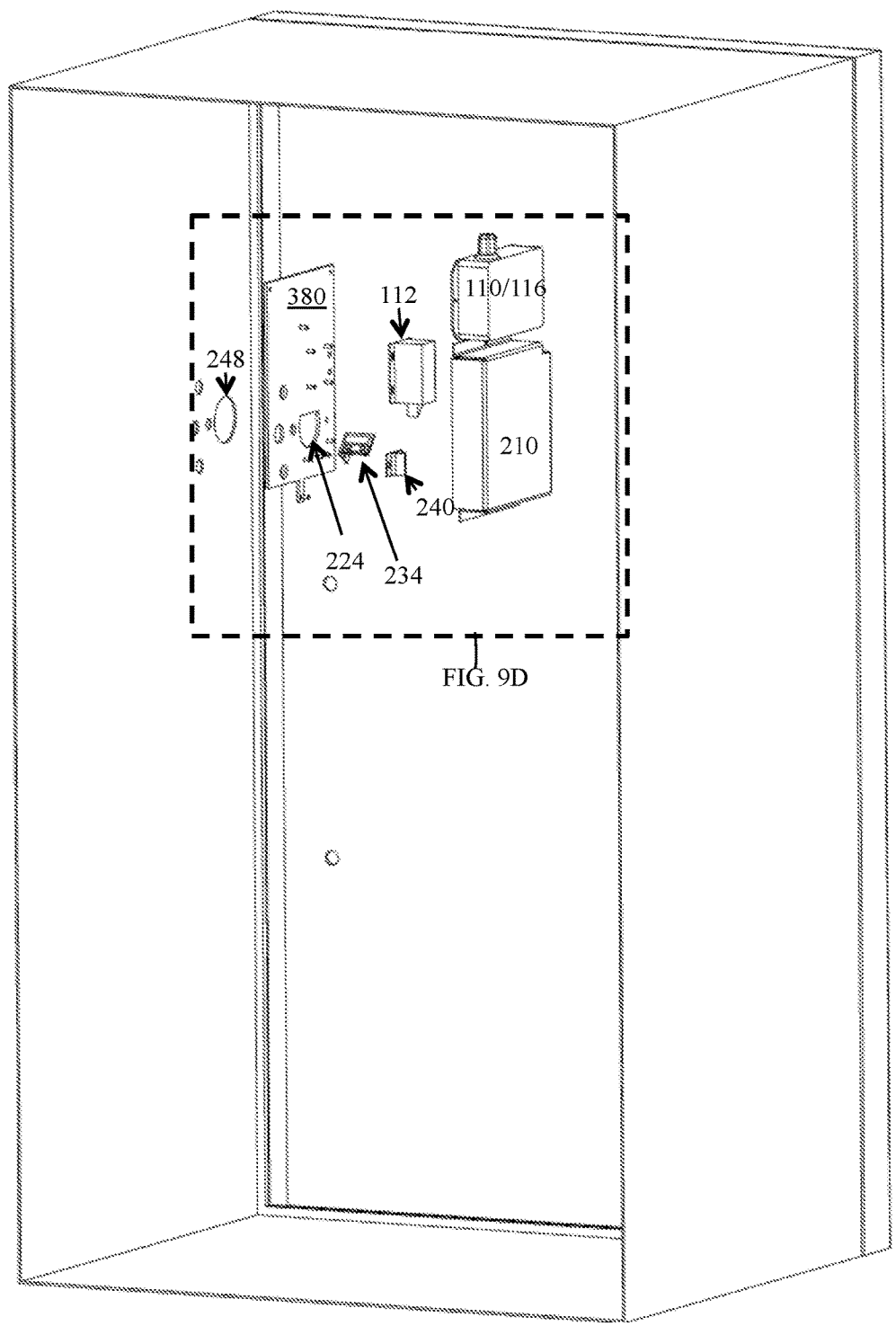
Figure 9D:
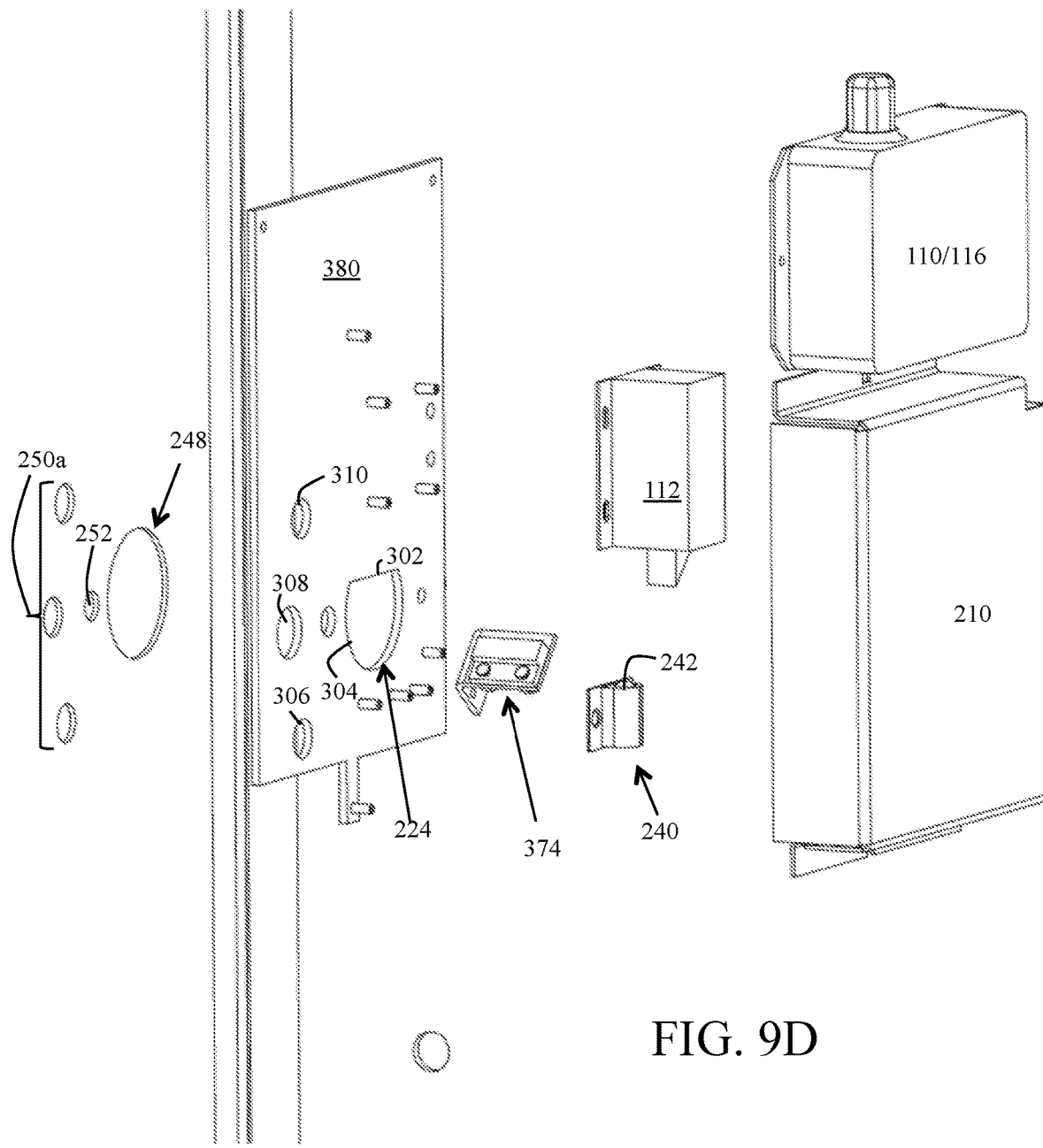

FIGS. 9A to 9D are non-limiting exemplary exploded view illustrations of the various components of the keyless lock system in accordance with one or more embodiments of the present invention, with FIGS. 9A and 9B illustrating an exploded view in relation to the exterior of cabinet and FIGS. 9C and 9D illustrating an exploded view in relation to the interior of cabinet. Exploded views shown in FIGS. 9A to 9D illustrate disassembled, separated components that show the cooperative working relationship, orientation, positioning, and manner of assembly of the various components of keyless lock system 100a in accordance with one or more embodiments of the present invention, with some of the components detailed below.

Figures 10A, 10B:
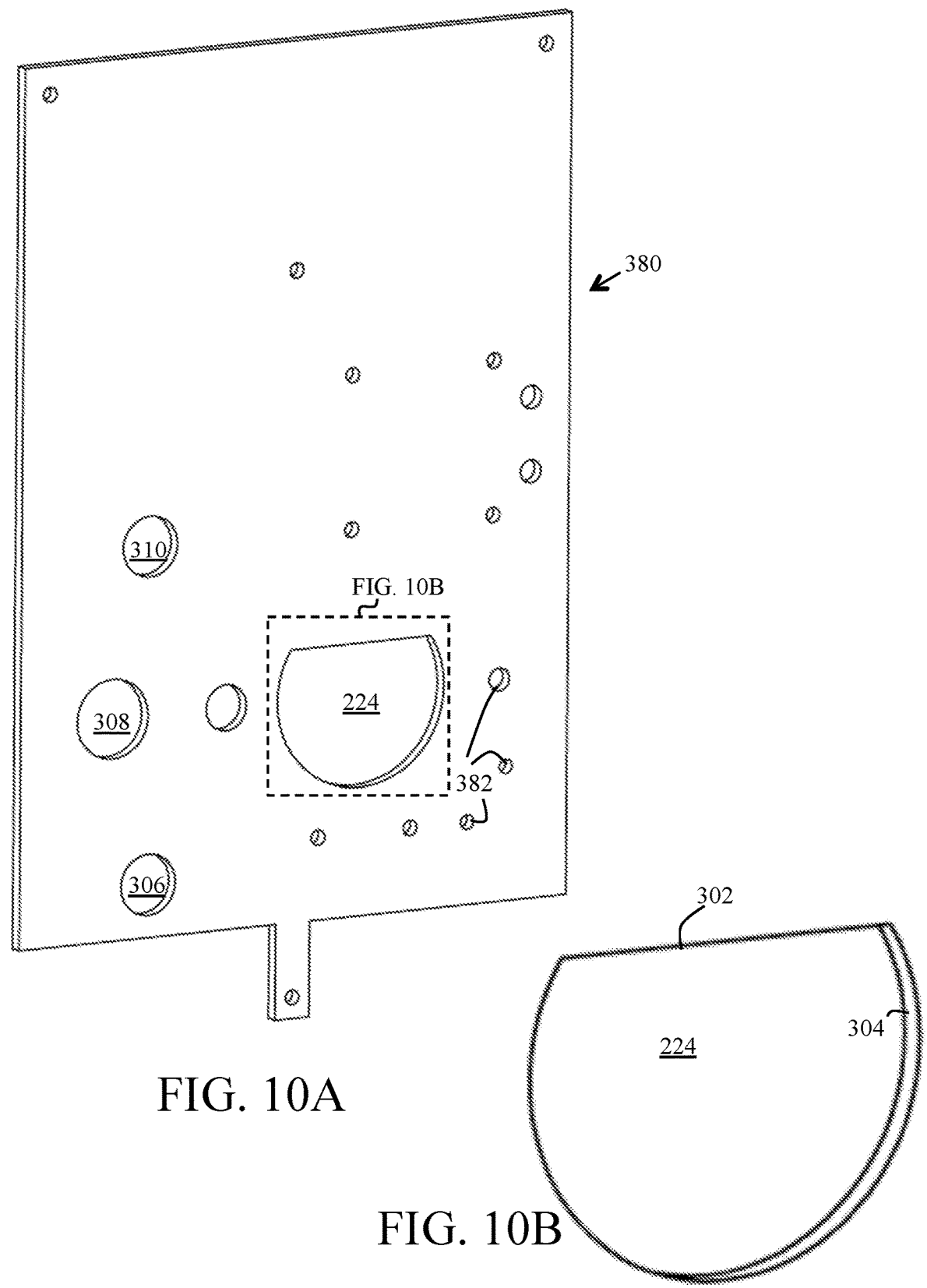

FIGS. 10A and 10B are non-limiting exemplary illustrations of a support structure in accordance with another embodiments of the present invention. In this non-limiting, exemplary instance, interlocking edge 302 and edge 304 of support structure 380 are reversed in orientation (compared to support structure 238 in FIGS. 5A and 5B) to accommodate a reversed orientation and positioning of latching solenoid 112 and ball bearing spring 240 (as detailed above). In this non-limiting exemplary embodiment, support structure 380 further includes at least one opening 382 for securely mounting magnetic (or electromagnetic) sensor 374.

Figure 11A:
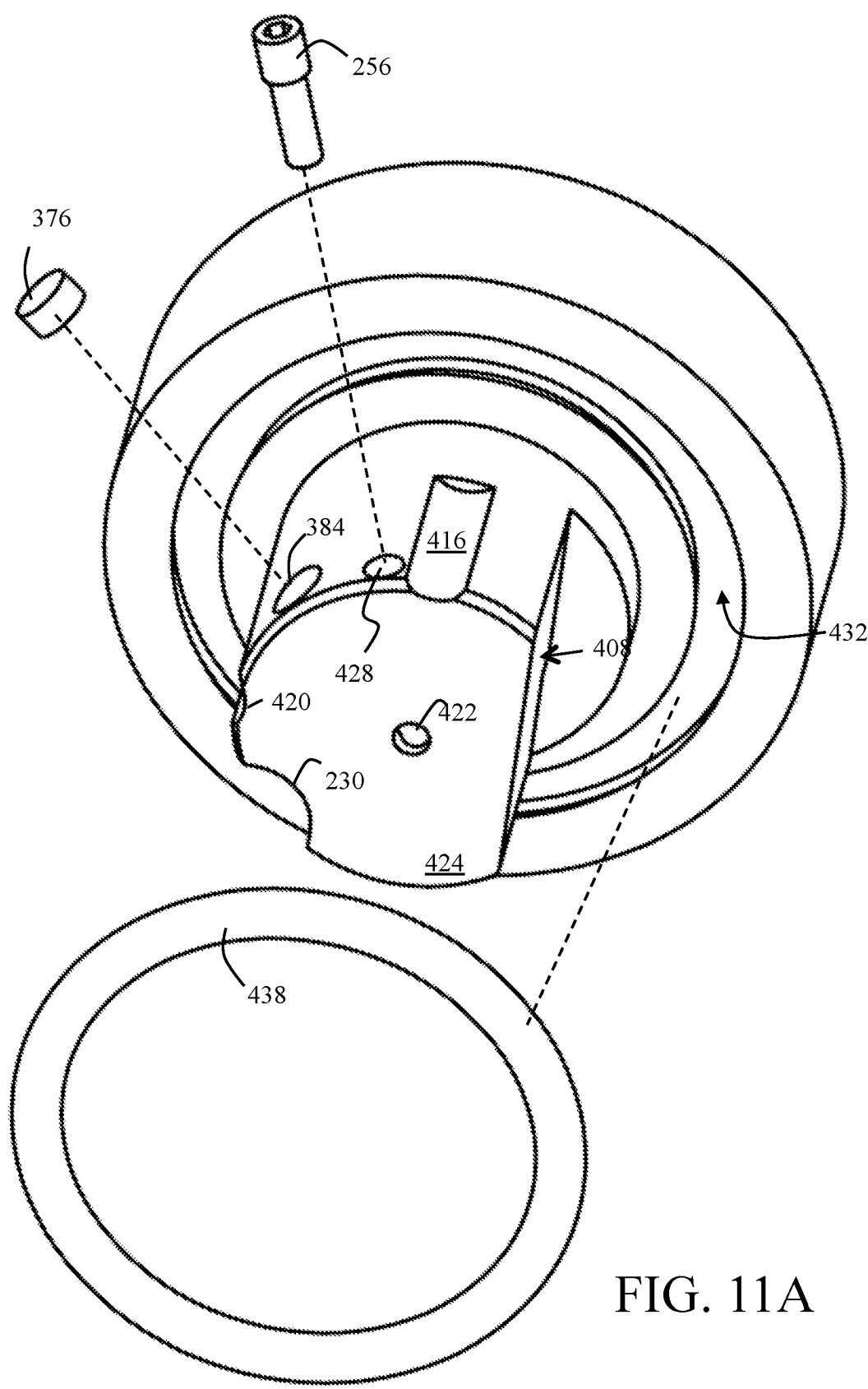
Figure 11B:
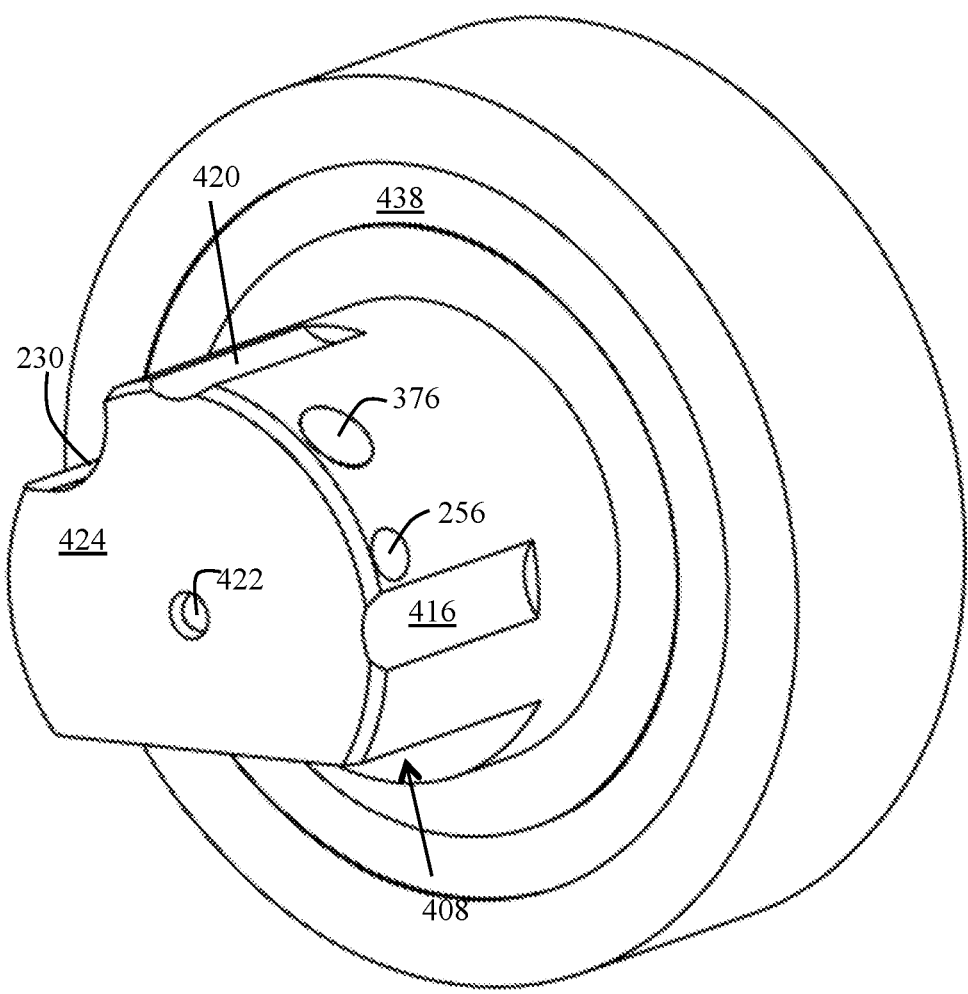
Figure 12C:
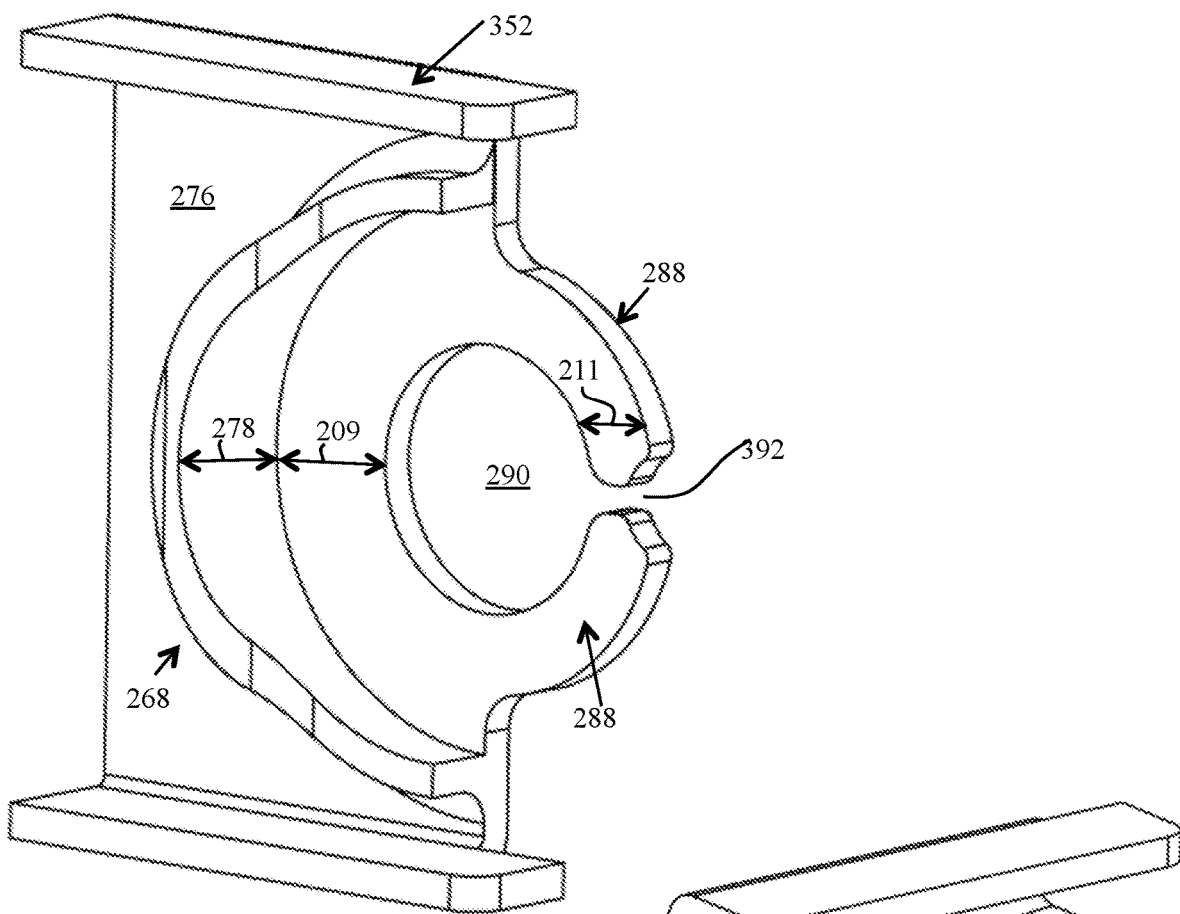
Figure 12D:
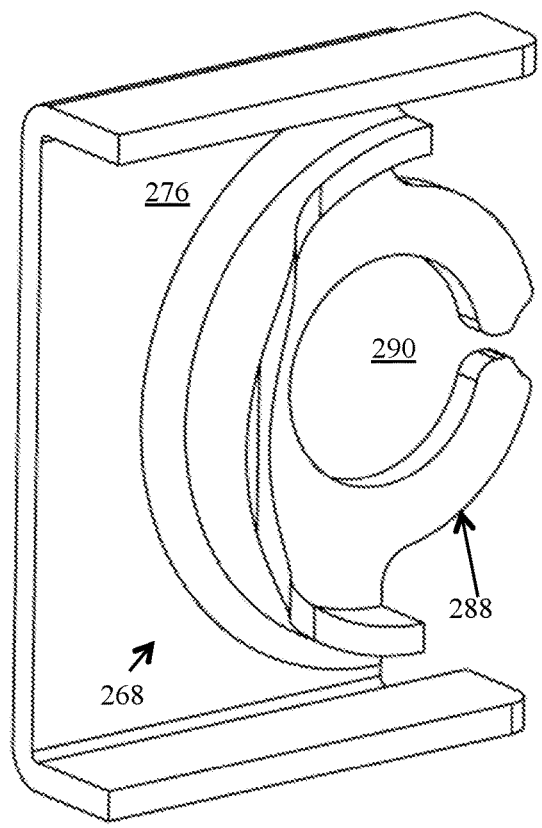
Figure 12E:
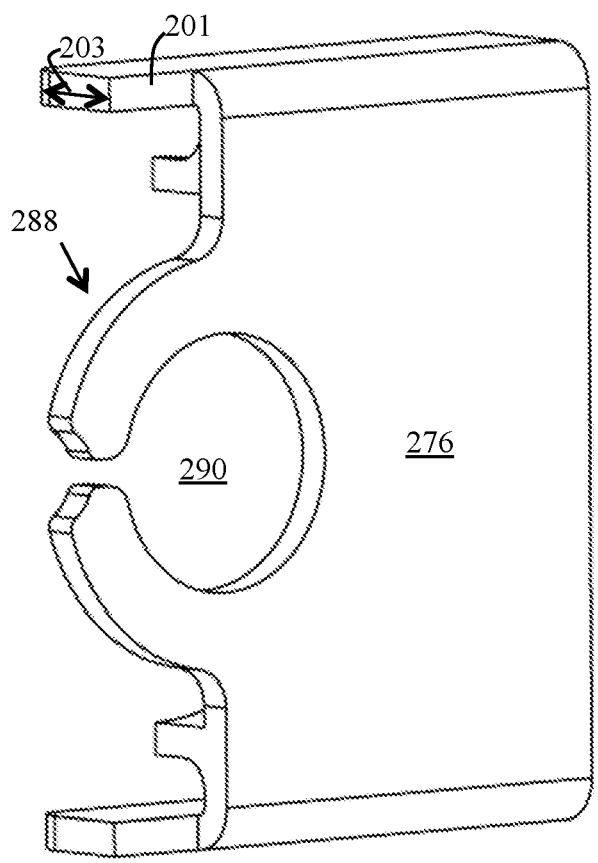
Figure 12F:
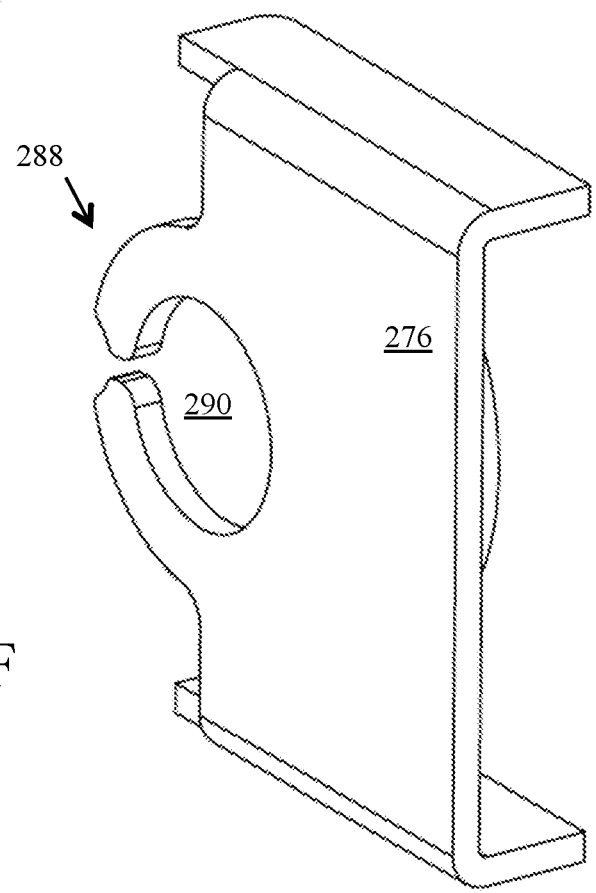
Figure 13A:
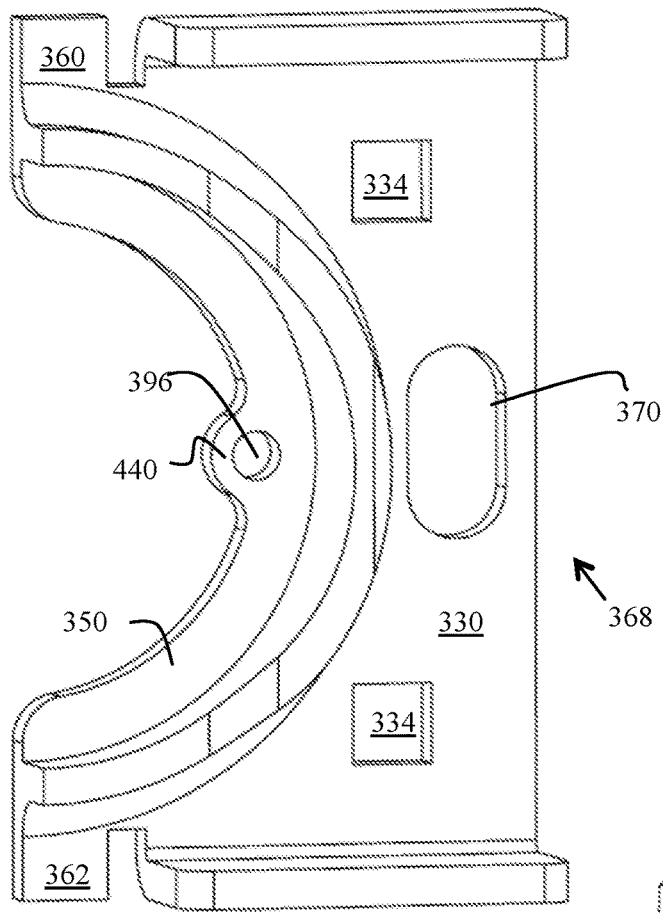
Figure 13B:
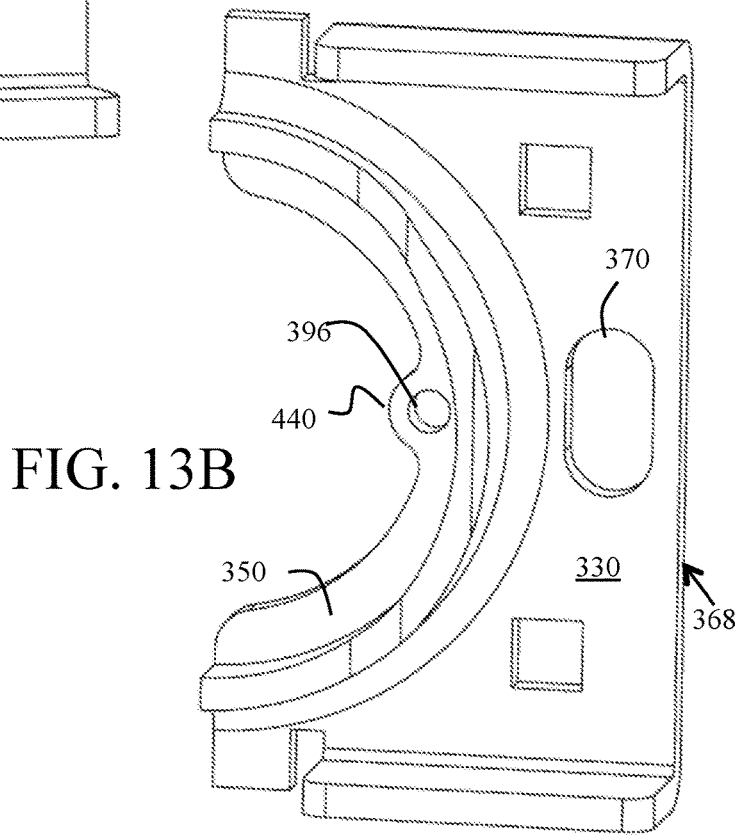
Figure 13C:
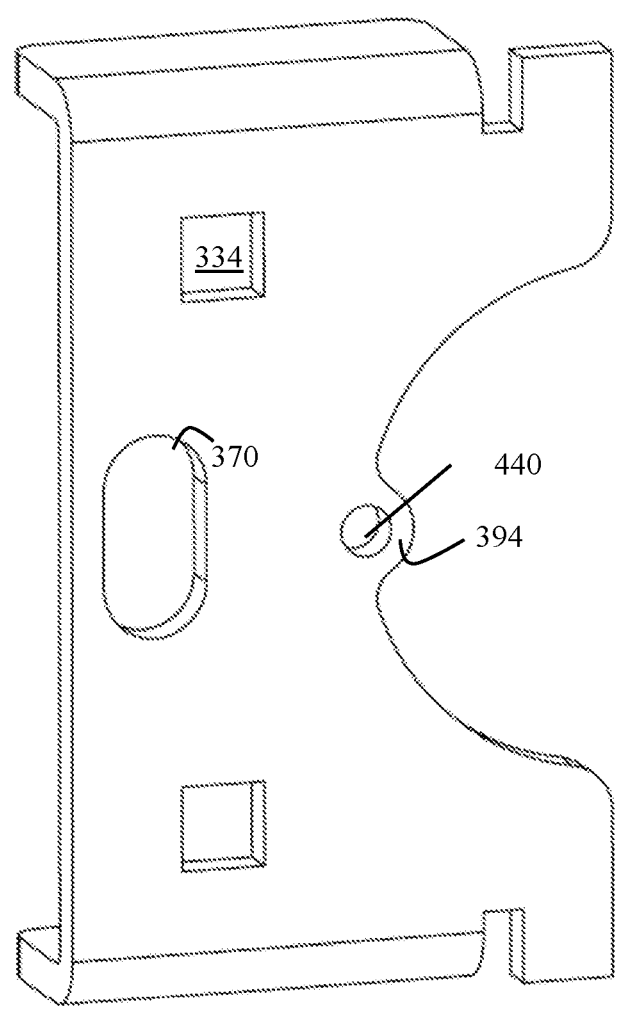
Figure 13D:
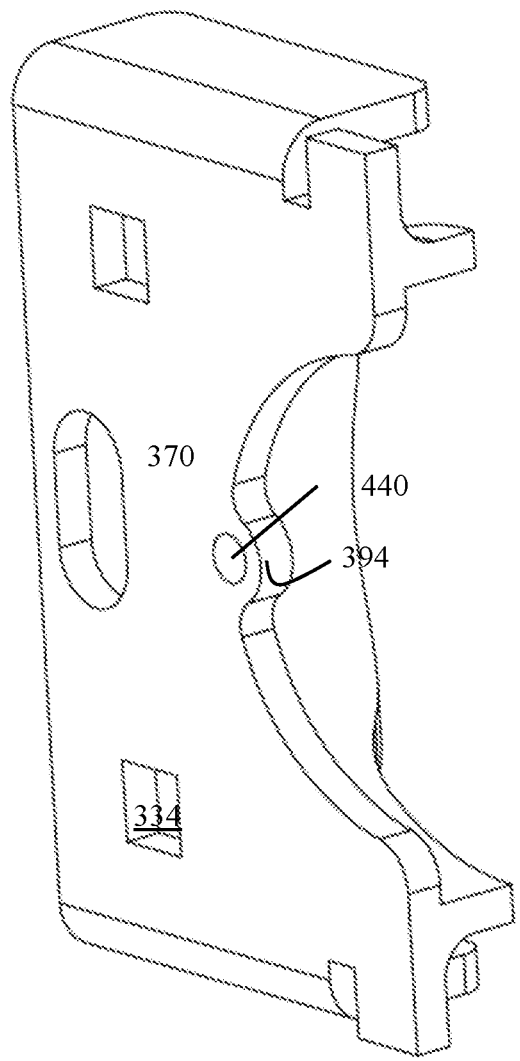
Figure 14A:
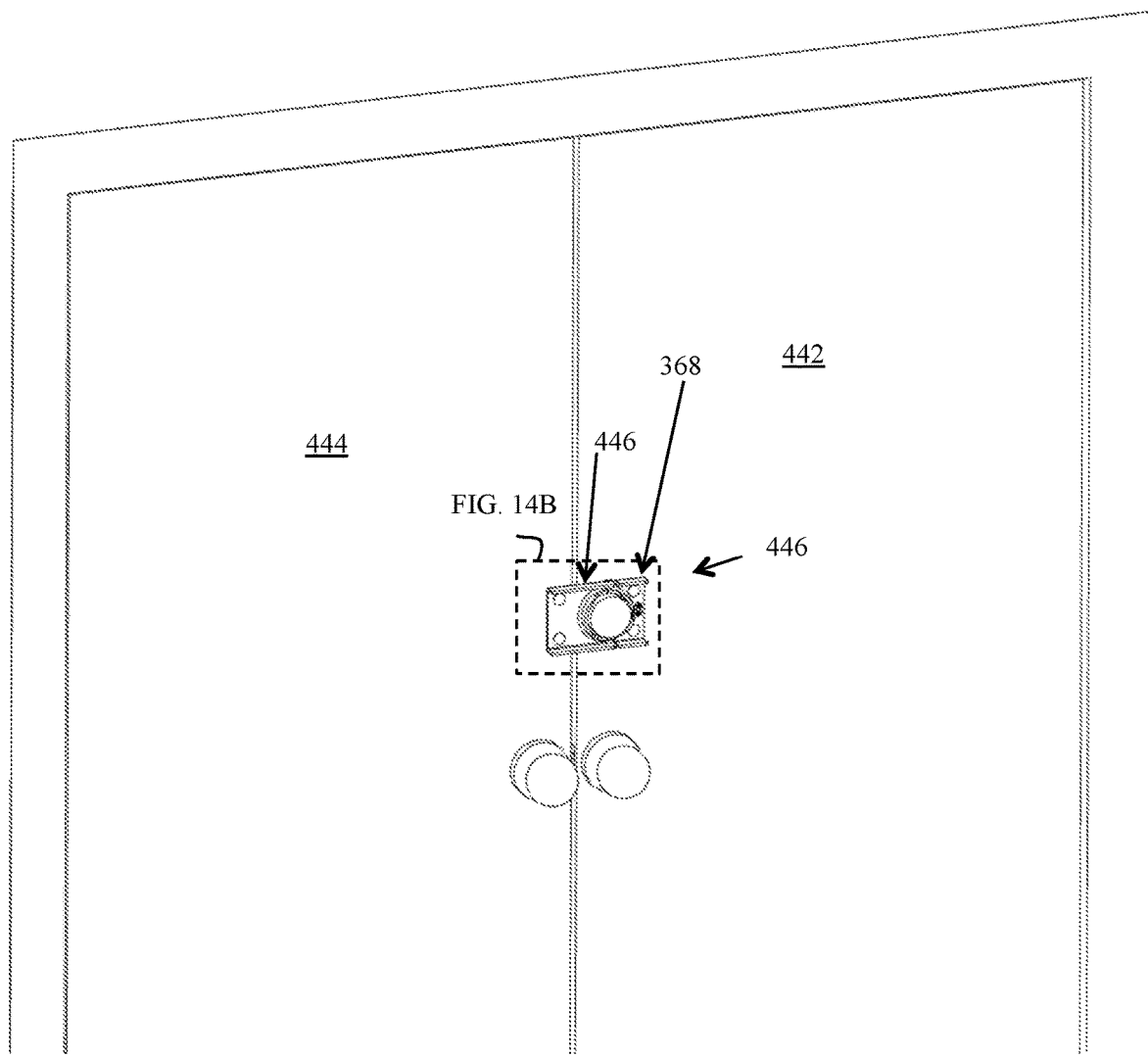
FIGS. 14A to 17C are non-limiting, exemplary illustrations of yet another keyless lock system in accordance with one or more embodiments of the present invention.
Figure 14B:
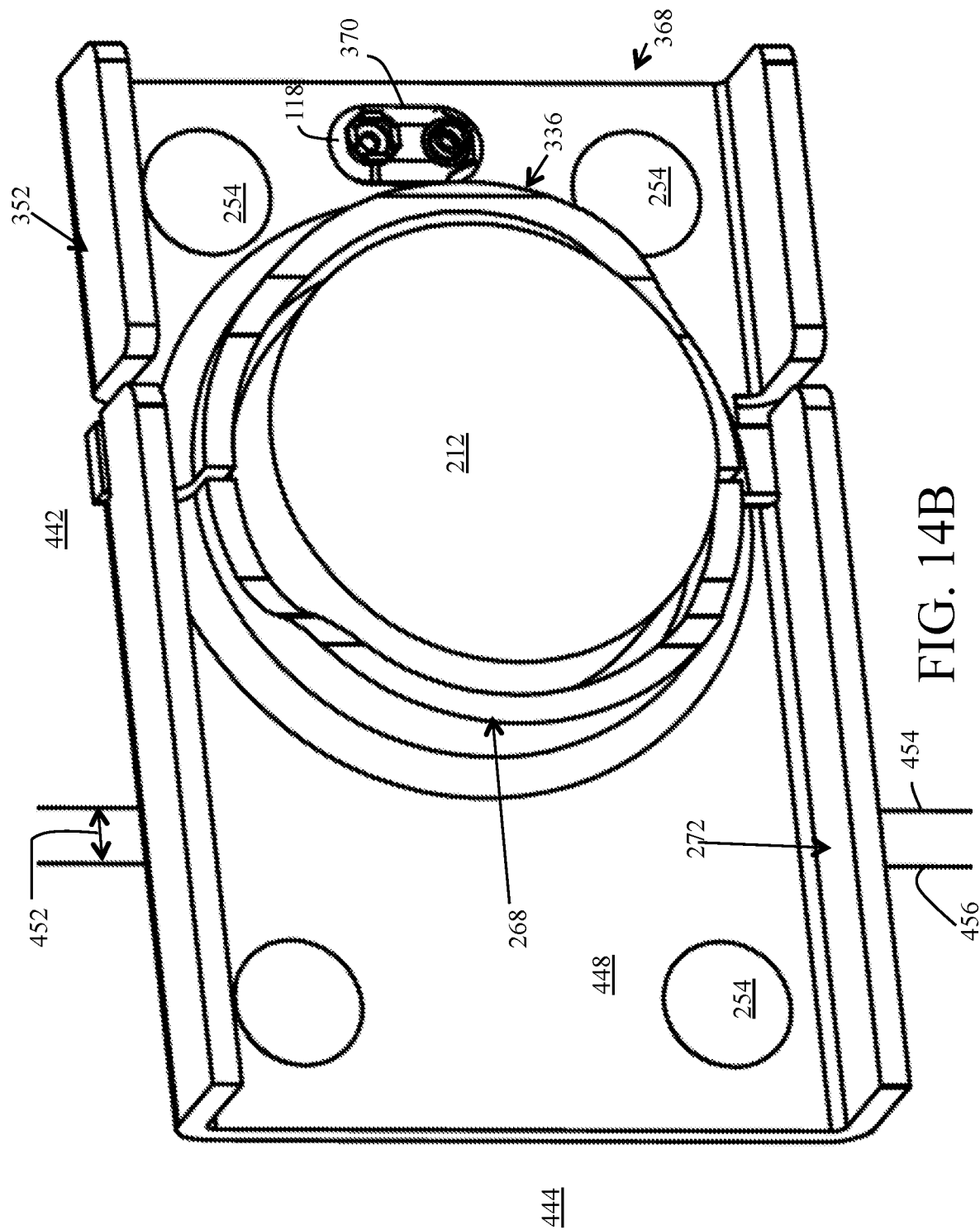
Figure 14C:
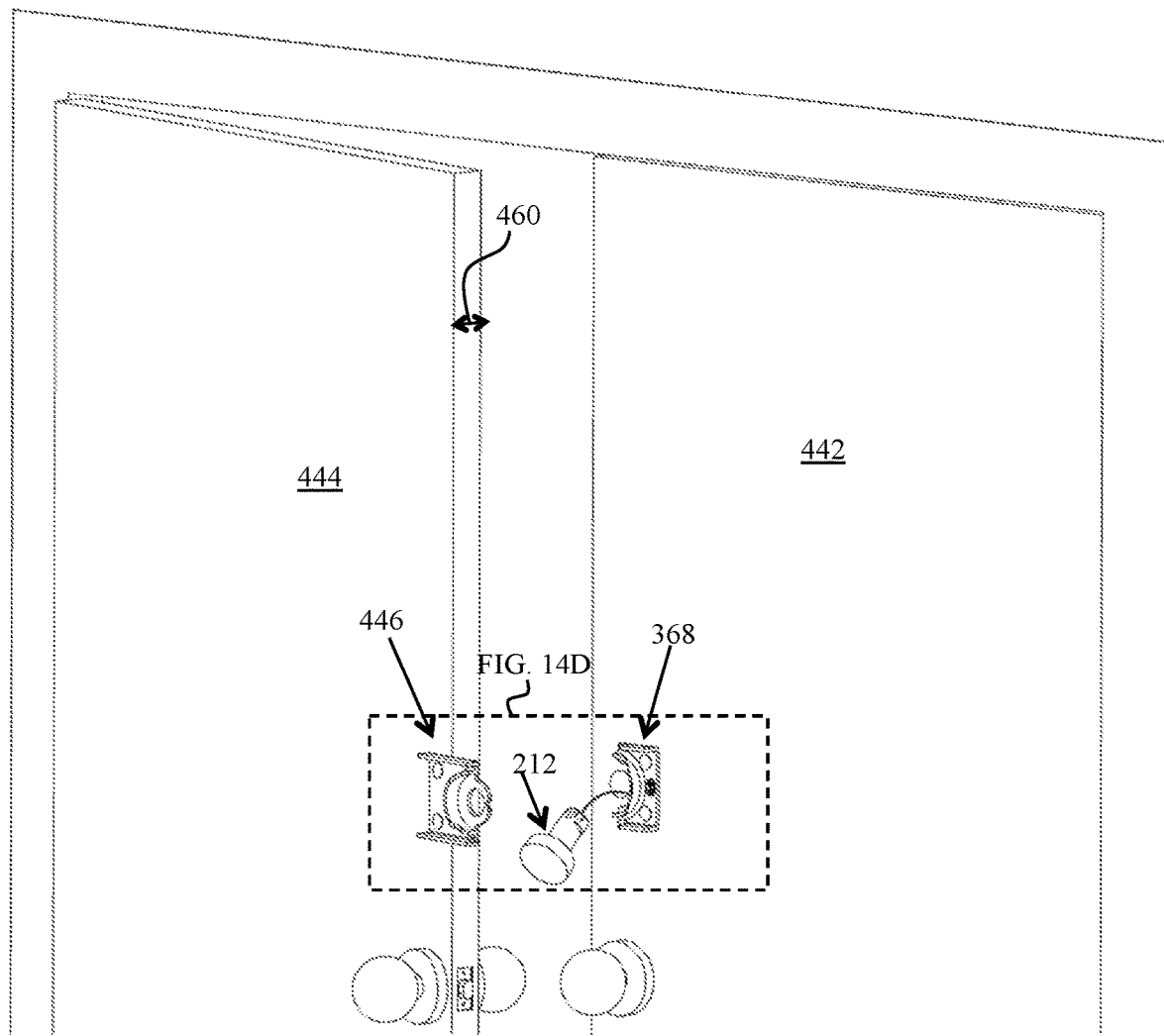
Figure 14D:
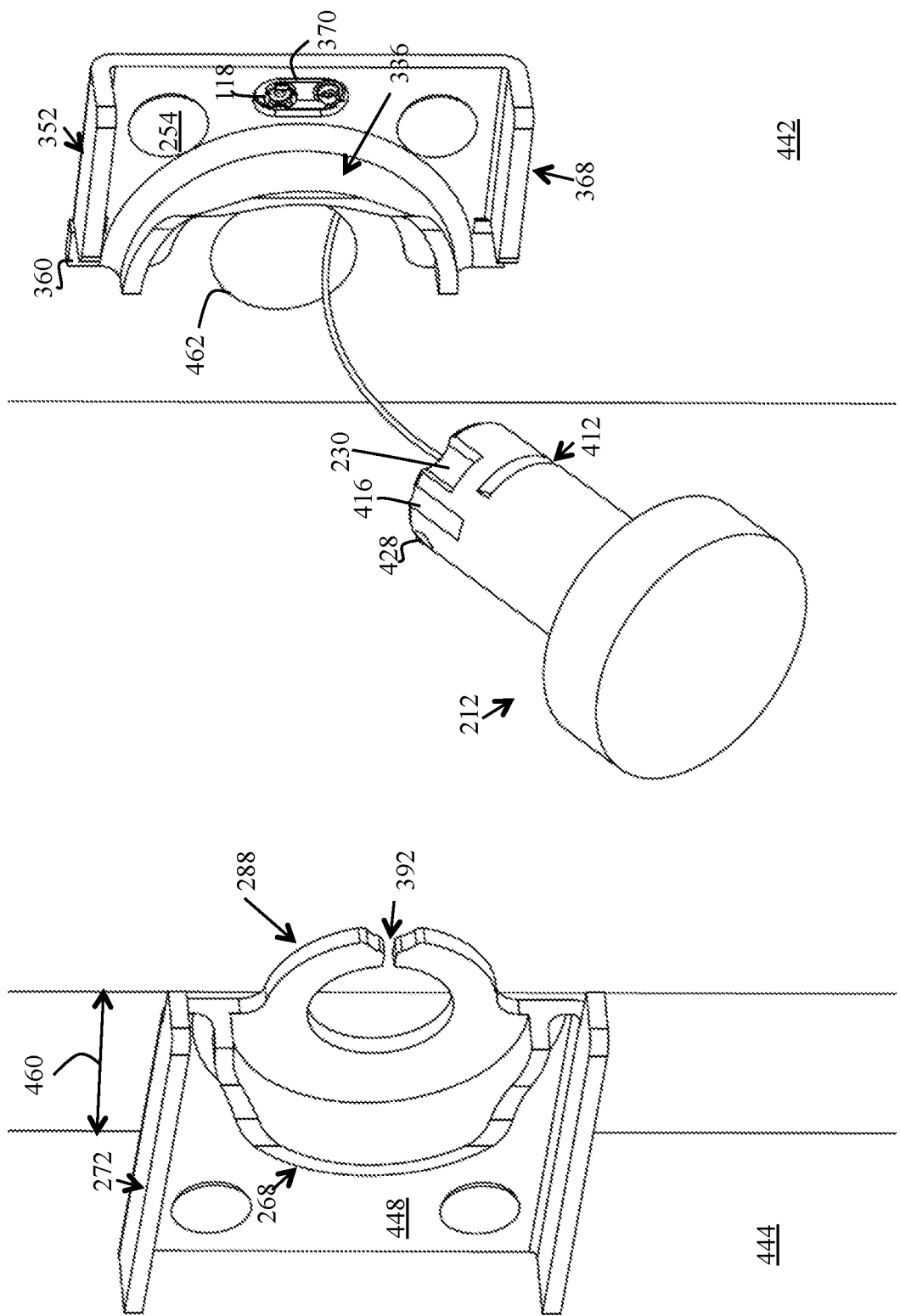
Figure 14E:
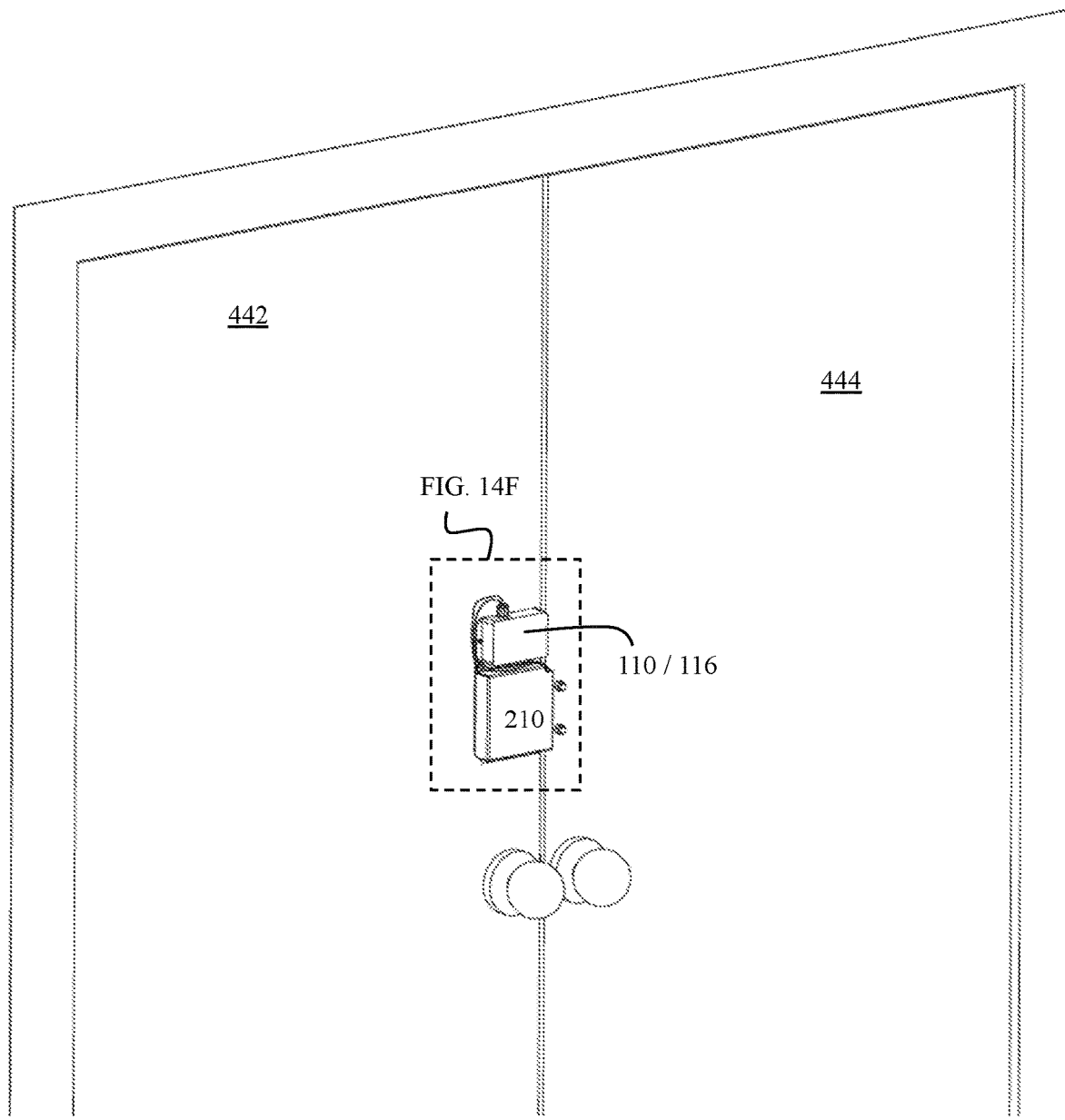
Figure 14F:
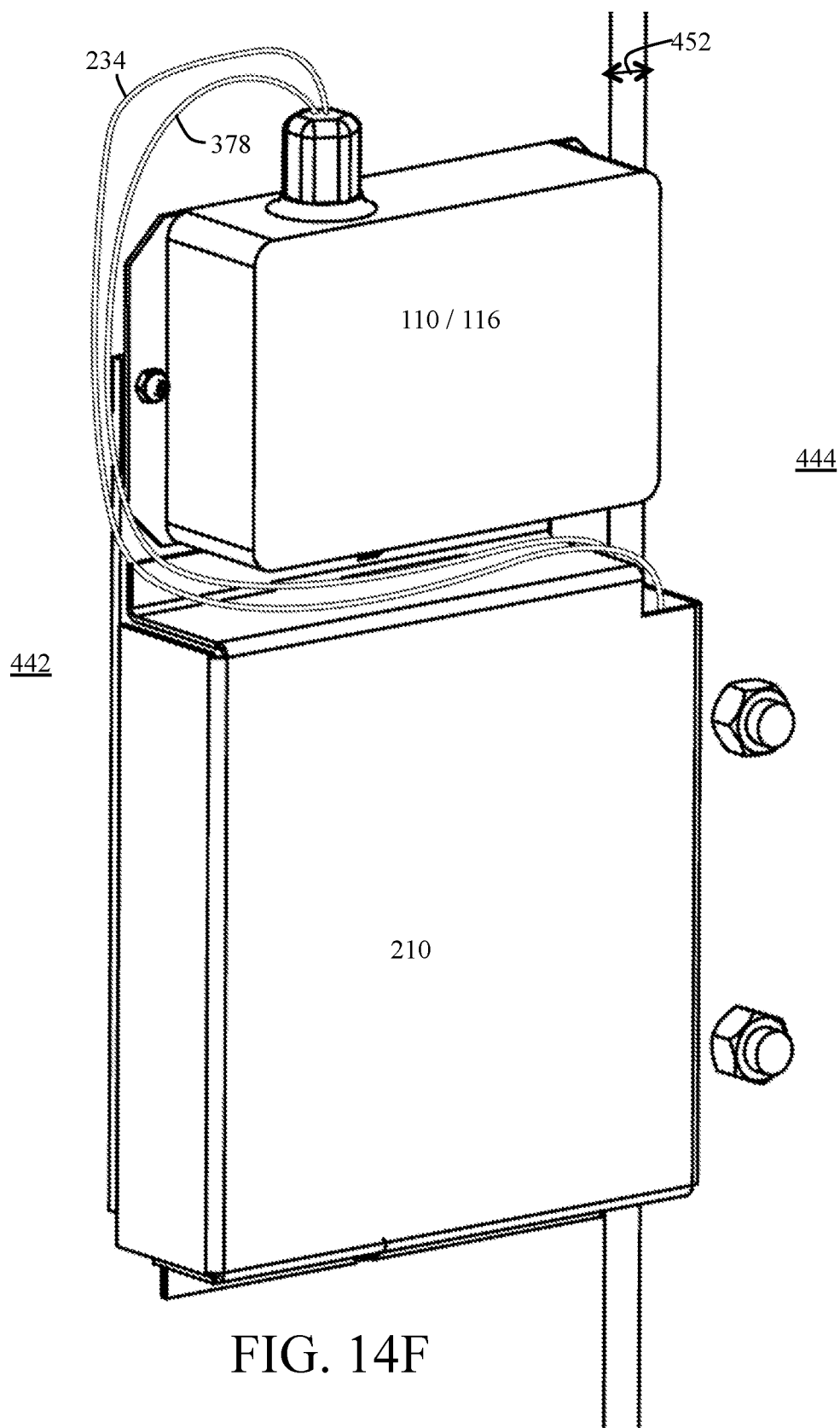
Figure 14G:
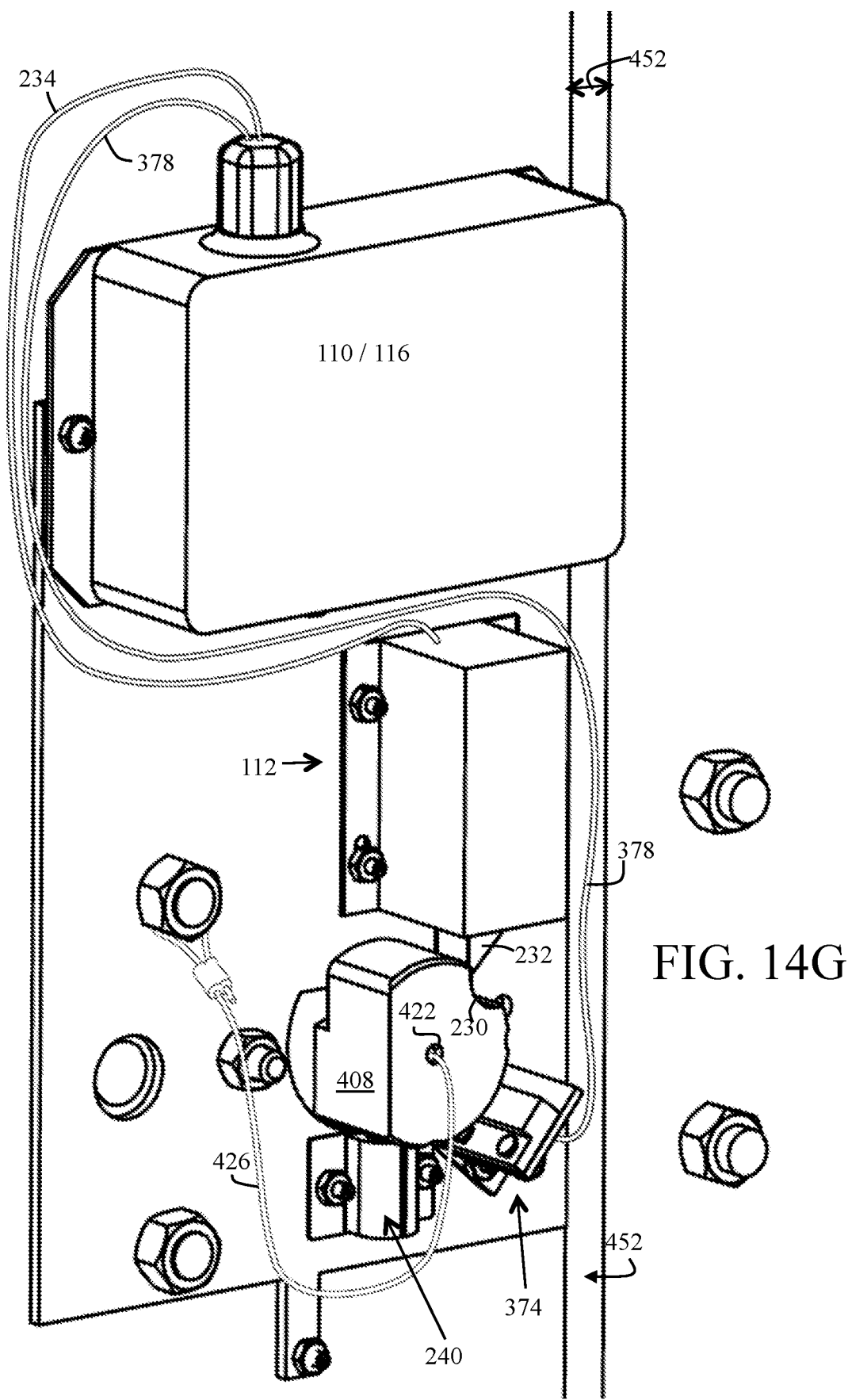
Figure 15A:
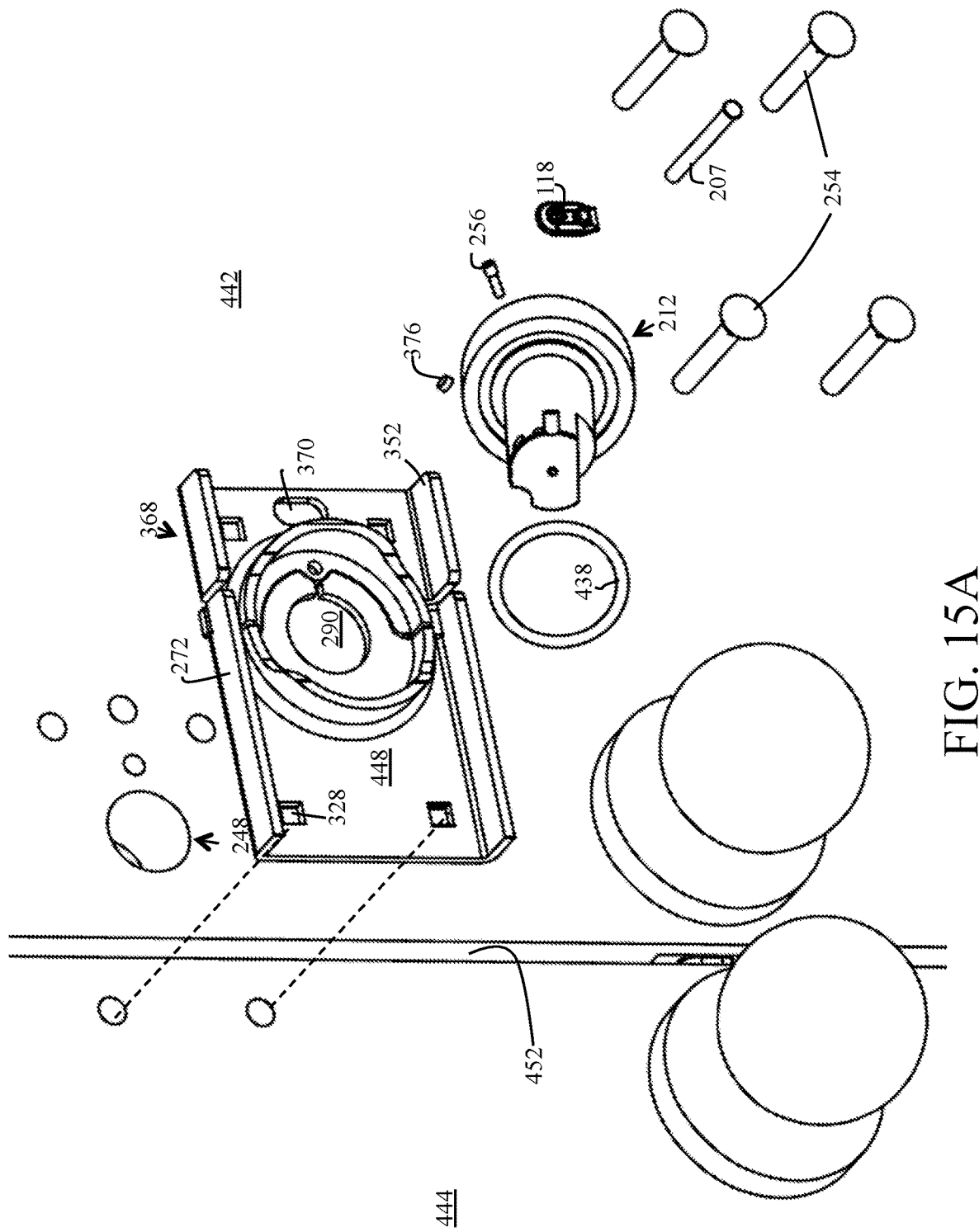
Figure 15B:
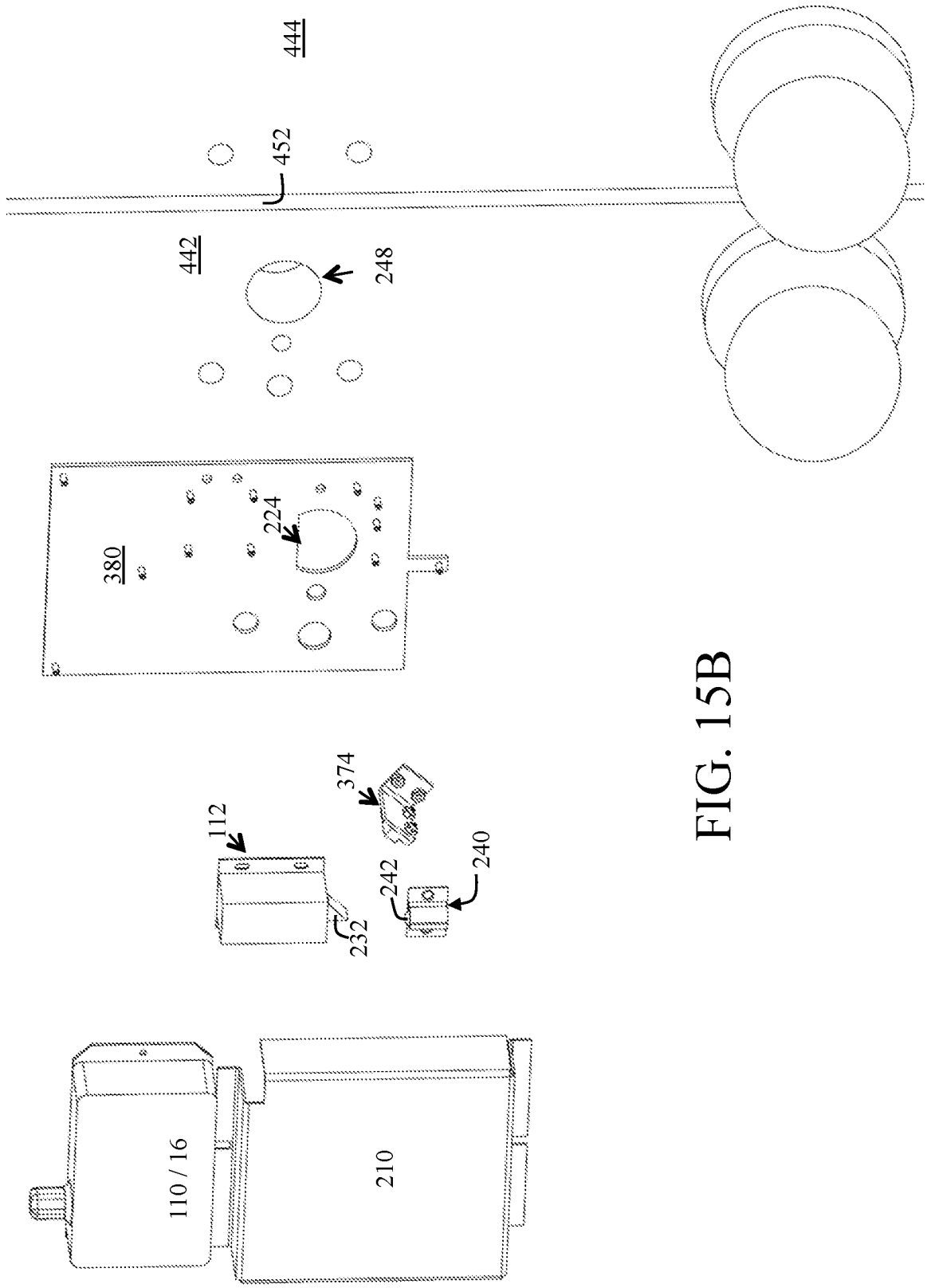

FIGS. 11A and 11B are non-limiting, exemplary perspective view illustrations of an interlock mechanism in accordance with another embodiments of the present invention. In this non-limiting, exemplary embodiment, lock portion 404 of interlock mechanism 212 includes a secondary lateral opening 384 near lateral opening 428, which receives magnet 376.

FIGS. 12A to 13D are non-limiting, exemplary perspective view illustrations of a hasp in accordance with another embodiments of the present invention, with FIGS. 12A to 12F illustrating the various views of the first hasp piece and FIGS. 13A to 13D illustrating the various views of the second hasp piece. As illustrated in FIGS. 12A to 12F, first hasp piece 364 is fixed (e.g., welded) to first connection section 366. First hasp piece 364 includes a first engagement section 386 generally configured commensurate with cap portion 402 of interlock mechanism 212 configuration associated, and first connection section 366 with one or more openings 328 for mounting first hasp piece 364 using fasteners.

First connection section 366 of first hasp piece 364 is comprised of fastening portion 388 that is used to mount first hasp piece 364 onto door 206 of cabinet 202 using fasteners and openings 328. Fastening portion 388 is oriented at an angle α in relation to a support portion 390 that is used to mount (e.g., weld) first engagement section 386 of the first hasp piece 364. First connection section 366 of first hasp piece 364 may for example, be connected to a lock-side 266 (FIGS. 2F and 2A) of hinged door 206 of cabinet 202 that is at an angle (generally, about α≈90° degrees or so) in relation to an adjacent wall 208 of cabinet 202 (adjacent to the lock-side 266 of hinged door 206 when door 206 is at closed position). First engagement section 260 may be free and oriented to align with (parallel the plane of) adjacent wall 208 when door 206 is closed. As detailed below, second hasp piece 368 may than be connected to adjacent wall 208 (adjacent lock-side 266 of the door 206), and also aligned with first engagement section 386 of first hasp piece 364 when door 206 is at closed position in relation to adjacent wall 208.

As detailed below, it should be noted that the first hasp piece 364 need not have an angled connection section 366 if keyless lock assembly 114 is connected to enclosure members that are aligned (inline) or share a common plane (e.g., cargo doors where in closed position, both of the lock-sides of both of the doors of the cargo doors are aligned or when lock-side of a hinged door is aligned with an adjacent wall).

As best illustrated in FIGS. 12C to 12F, first hasp piece 364 further includes a first locking base 288 which may optionally include a slit 392 for enabling passage of an optional tether 426 of interlock mechanism 212. In this non-limiting, exemplary instance, slit 392 is configured to receive a protruded or extended section 394 of second locking base 350 that accommodates a hidden (inconspicuous) opening 440 of second hasp piece 368 (detailed below).

FIGS. 13A to 13D are non-limiting, exemplary perspective view illustrations of a second hasp piece in accordance with one or more embodiments of the present invention. As illustrated, second hasp piece 368 includes base 330 that includes terminal opening 370 on base 330 for accommodating terminal 118. Further included is a protruded or extended section 394 of second locking base 350 that accommodates a hidden (inconspicuous) opening 440 of second hasp piece 368.

FIGS. 14A to 17C are non-limiting, exemplary illustrations of a keyless lock system in accordance with another embodiment of the present invention. Keyless lock system 100b illustrated in FIGS. 14A to 17B includes similar corresponding or equivalent components, interconnections, functional, operational, and or cooperative relationships as keyless lock systems 100 and 100a that are shown in FIGS. 1 to 13D, and described above. Therefore, for the sake of brevity, clarity, convenience, and to avoid duplication, the general description of FIGS. 14A to 17B will not repeat every corresponding or equivalent component, interconnections, functional, operational, and or cooperative relationships that has already been described above in relation to keyless lock system 100 and 100a that are shown in FIGS. 1 to 13D.

As illustrated in FIGS. 14A to 17B, in the previously disclosed embodiments shown in FIGS. 1 to 13D, connection section of first hasp piece is at some angle in relation to engagement section to accommodate lock-side corner of hinged door of cabinet that is at an angle (conventionally, about 90° degrees or so) in relation to the adjacent wall of the cabinet. However, as indicated above and illustrated in FIGS. 14A to 17B, first hasp piece need not have an angled connection section if the hasp is connected to enclosure members (e.g., doors) 442 and 444 that are aligned (inline) or share a common plane (e.g., doors where in closed position, both of the lock-sides of the doors 442 and 444 are aligned (e.g., are within a common plane) or when lock-side of a hinged door is aligned with an adjacent wall (rather than at some angle). Accordingly, in this embodiment, first hasp piece 446 has a connection section (or "base") 448 that is generally straight (flat) in relation to engagement section 260, with the connection section 448 having connection openings 328.

Figure 16A:
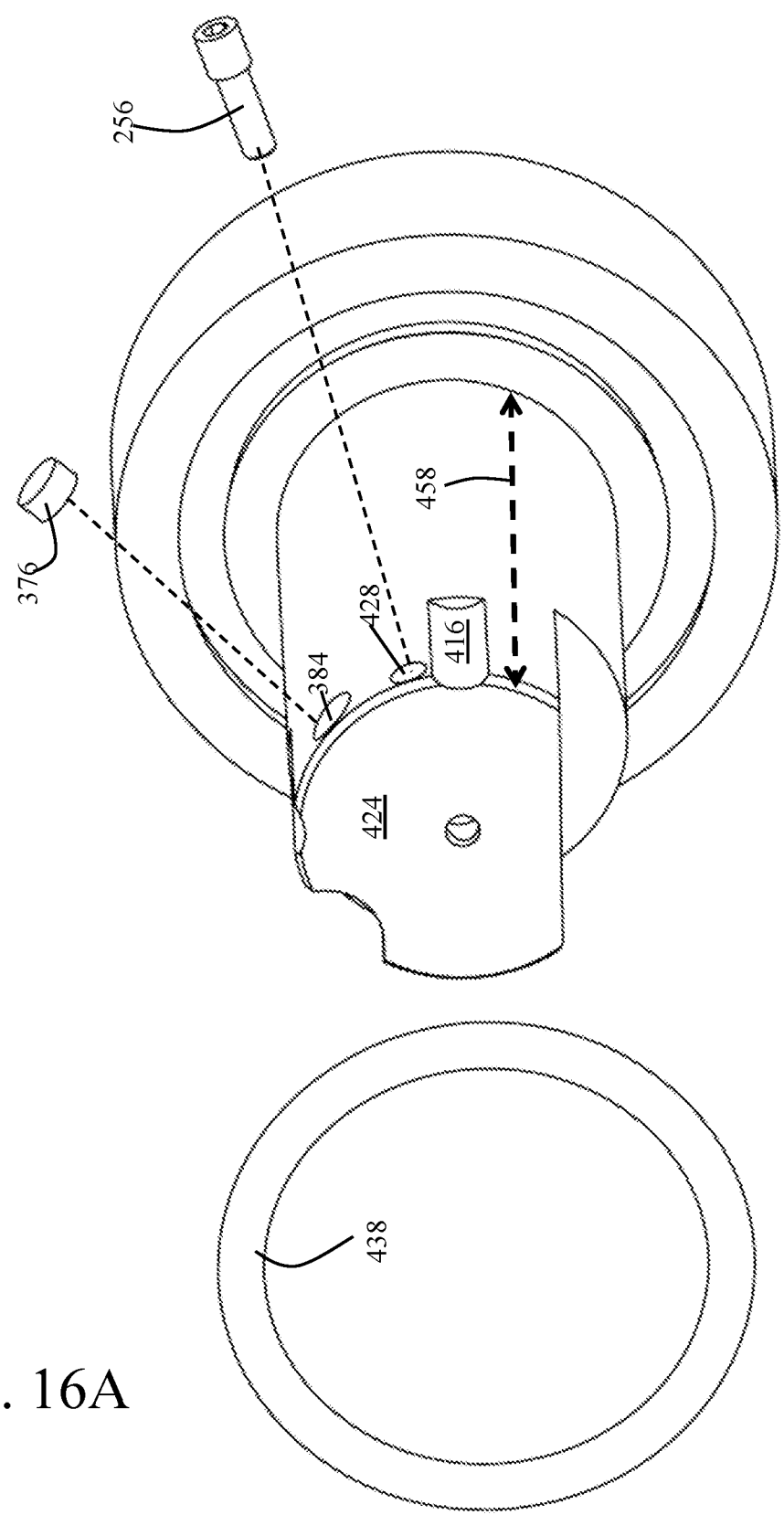
Figure 16B:
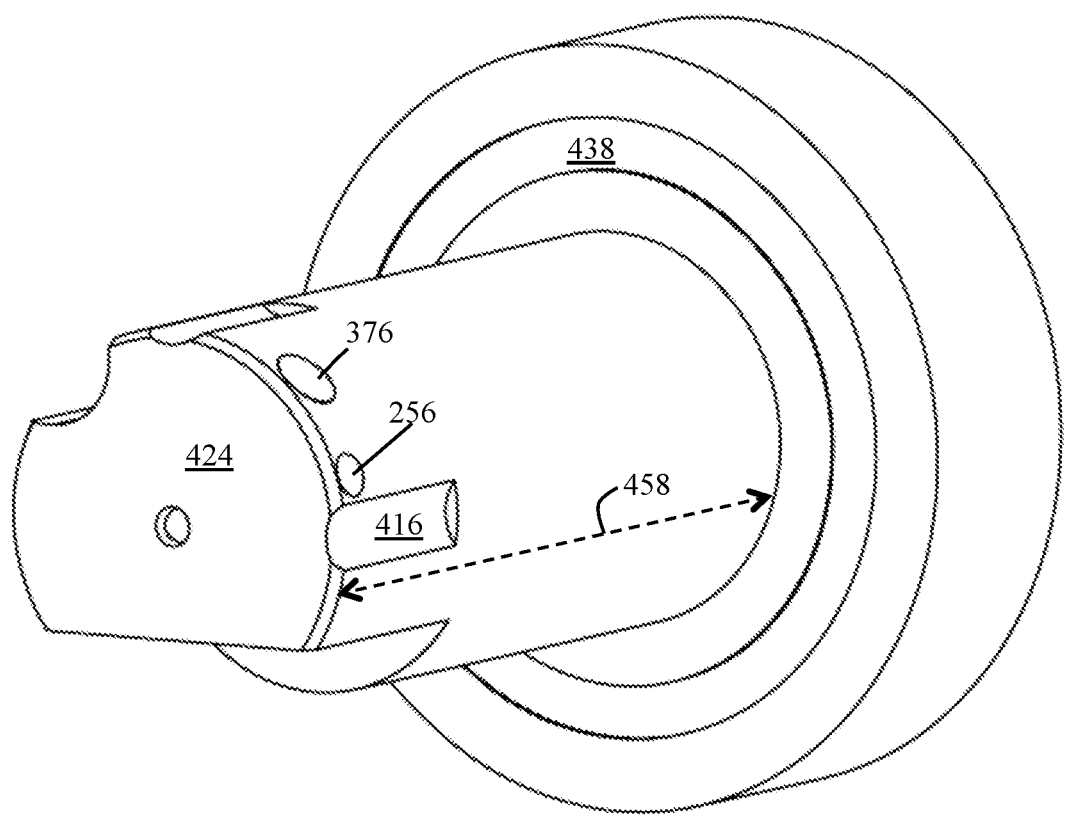
Figure 17A:
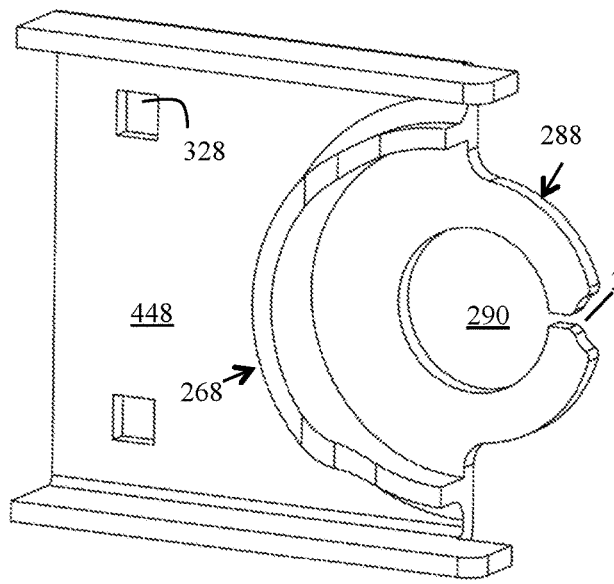
Figure 17B:
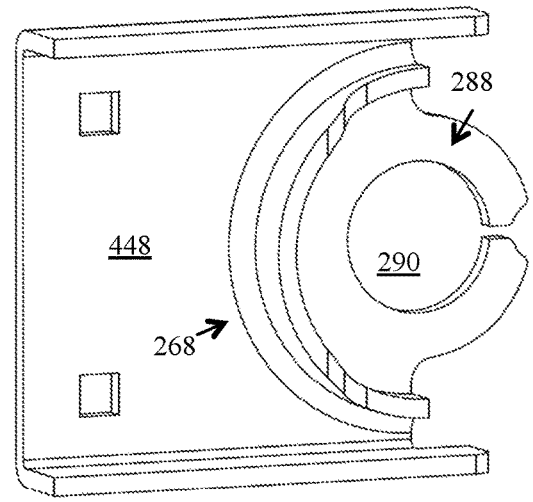
Figure 17C:
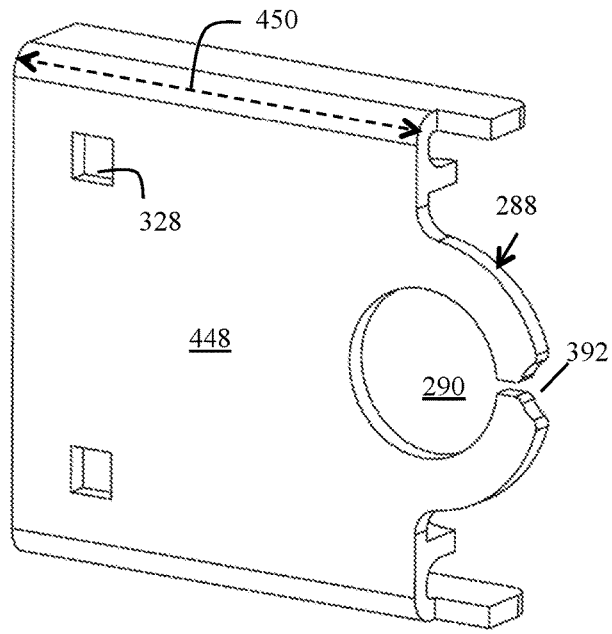
Figure 18A:
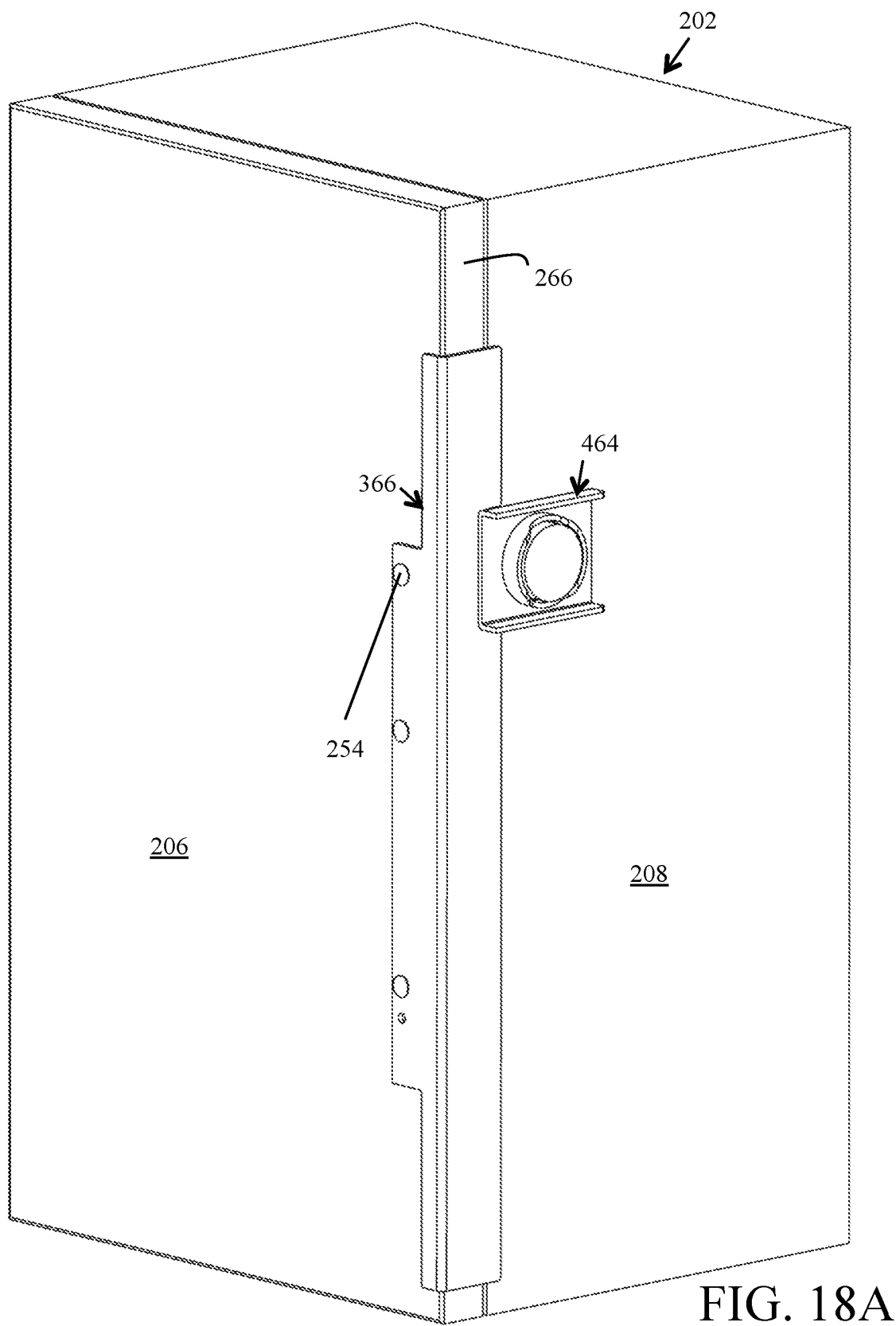
FIGS. 18A to 19D are non-limiting, exemplary illustrations of another keyless lock system in accordance with one or more embodiments of the present invention.
Figure 18B:
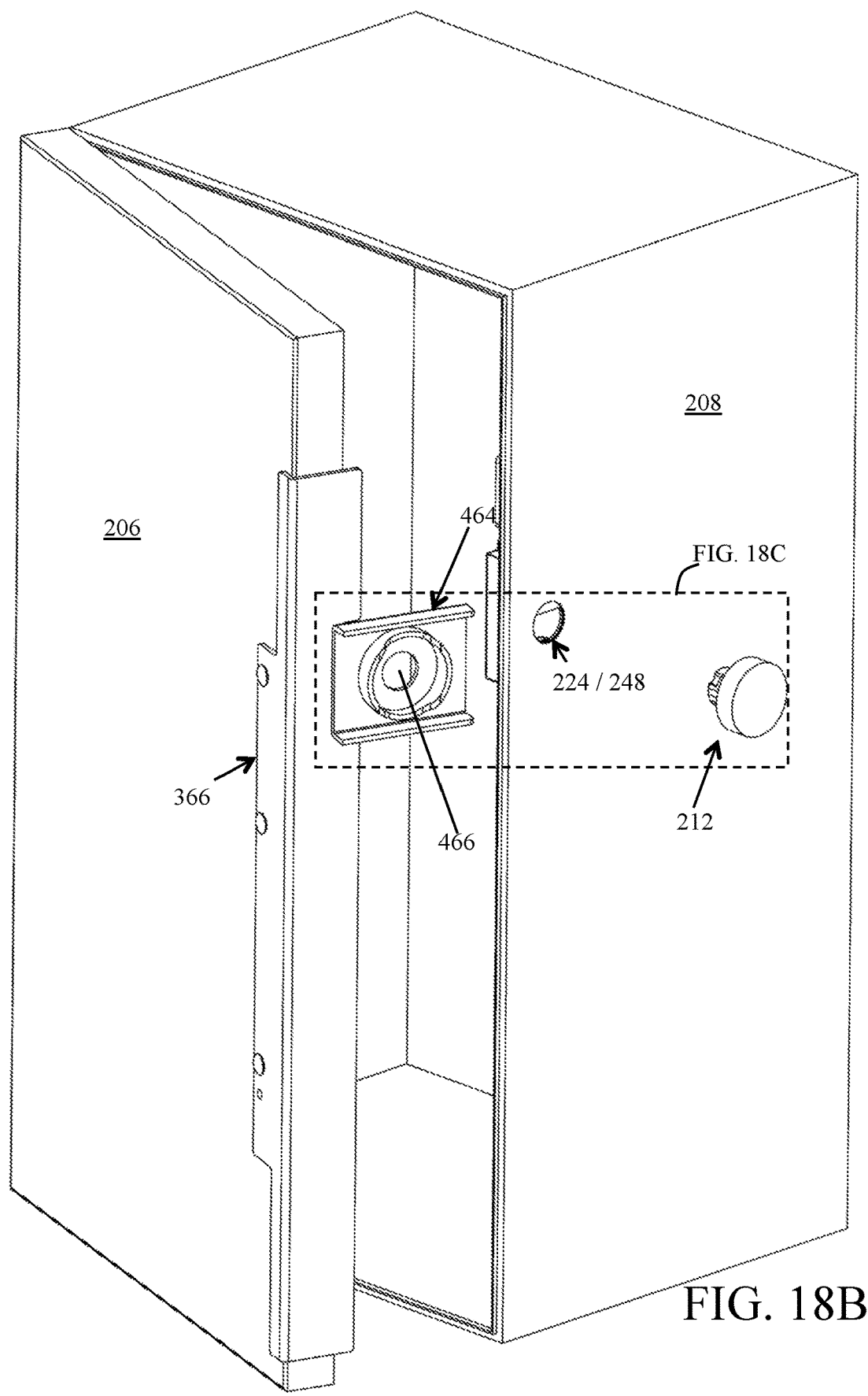
Figure 18C:
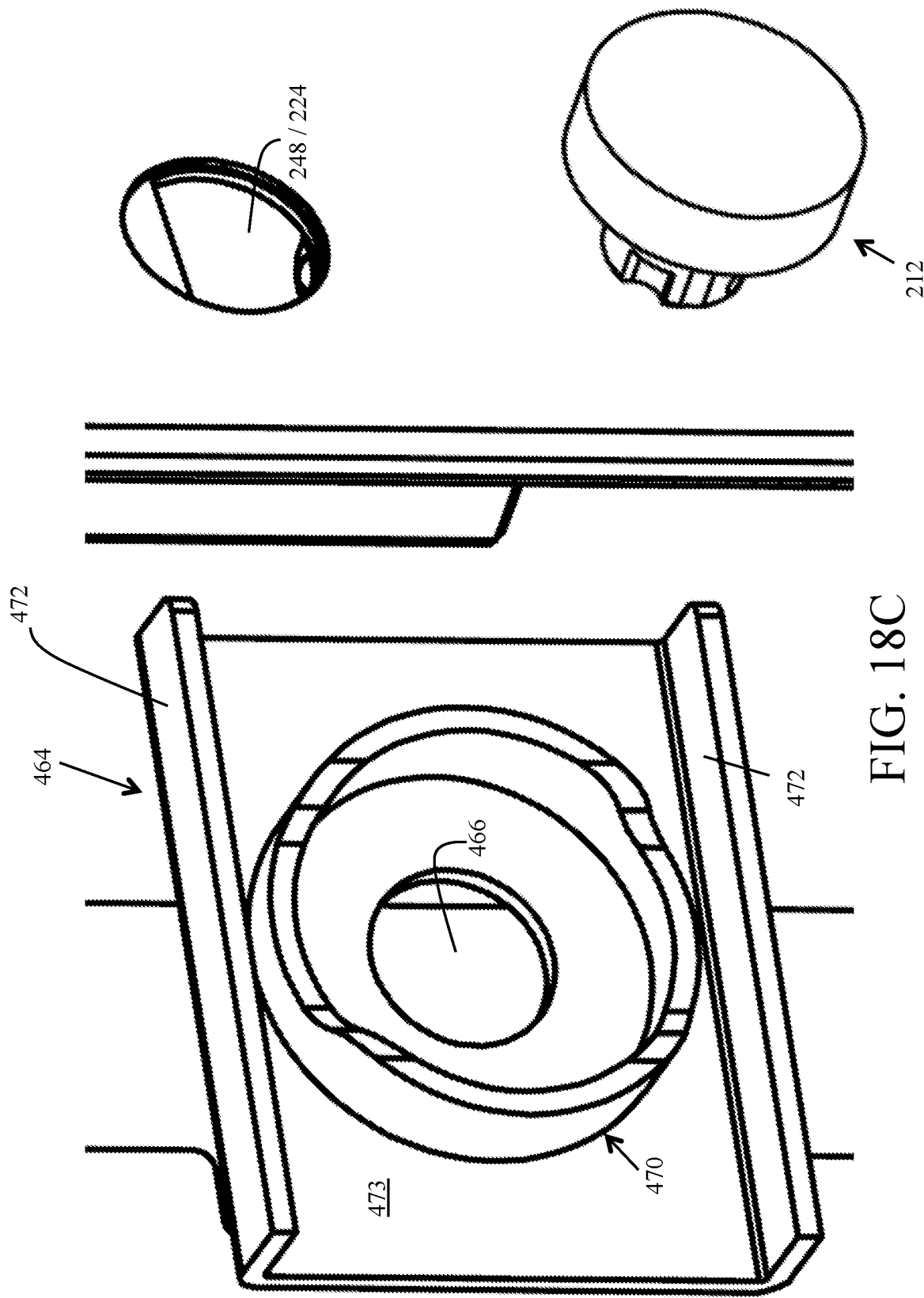
Figure 19A:
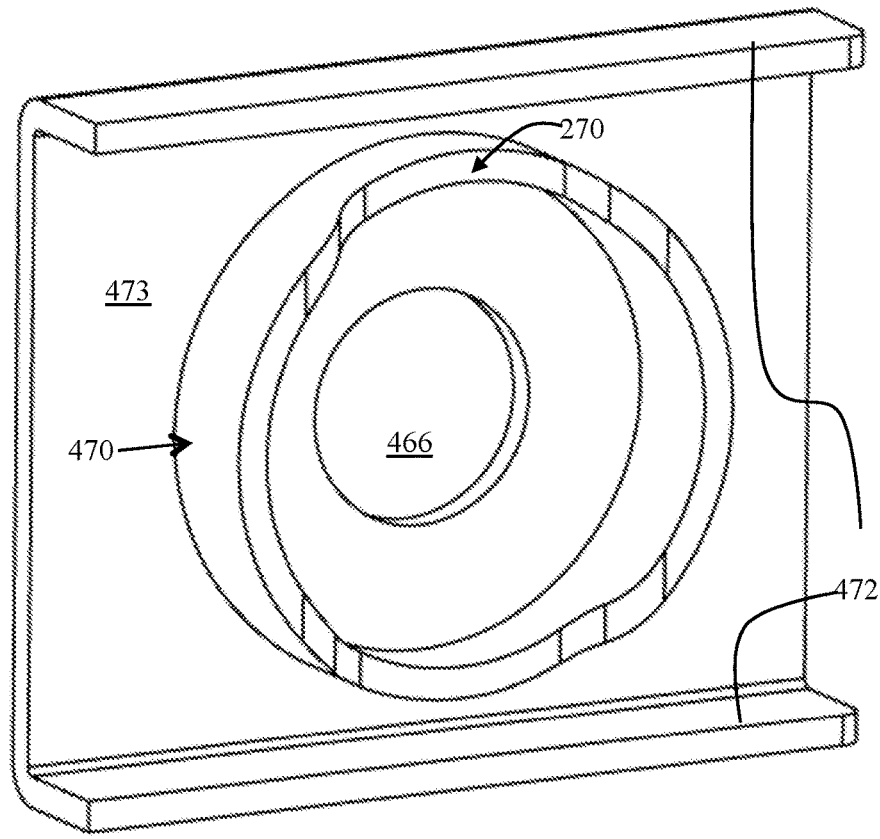
Figure 19B:
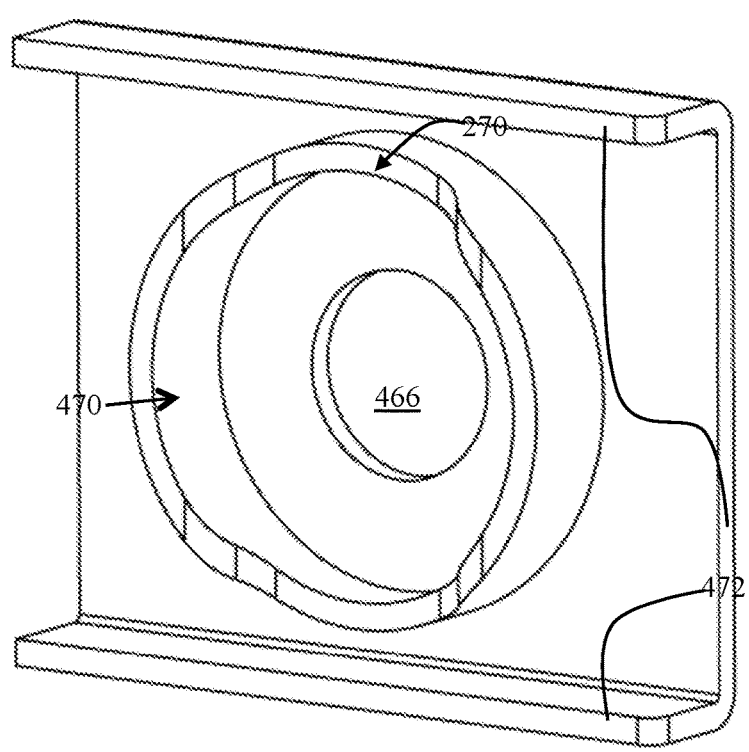
Figure 19C:
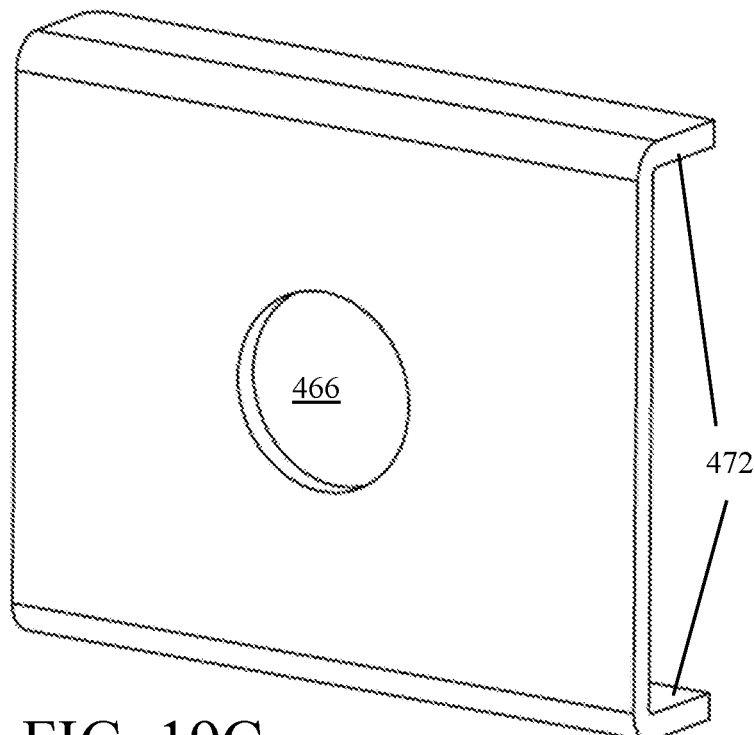
Figure 19D:
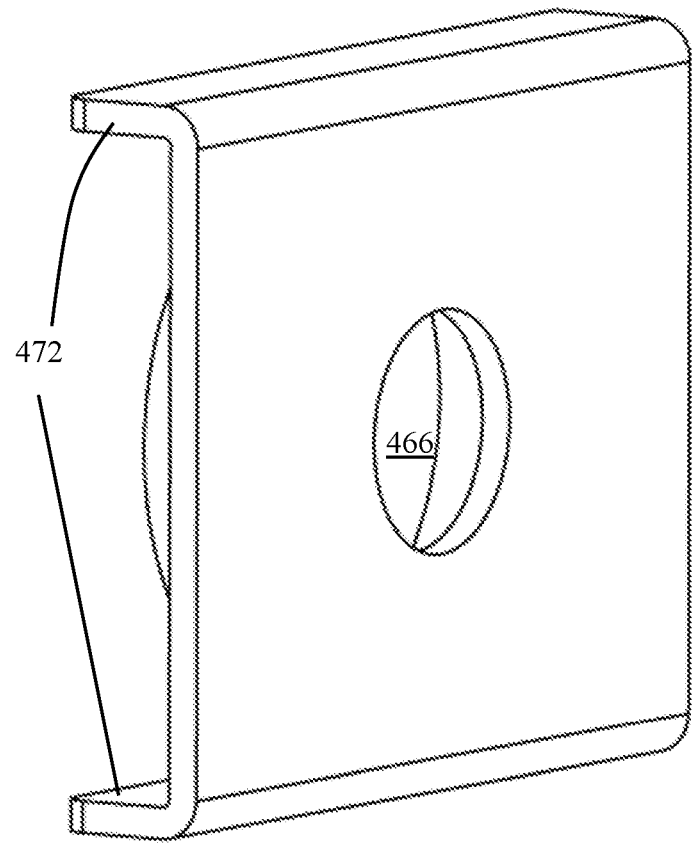

As best illustrated in FIGS. 17A to 17C, it should be noted that in this embodiment, first hasp piece 446 has a base length 450 that has a longer span than length 298 of base 276 of first hasp pieces of the previous embodiments to accommodate or bridge gap 452 between locking sides 454 and 456 of doors 442 and 444. As to interlock mechanism 212, as best illustrated in FIGS. 16A and 16B, lock portion 404 of interlock mechanism 212 disclosed for this embodiment has a length 458 that has a longer span than length 418 of lock potion 404 of previous embodiments to be able to pass through thickness 460 of opening 462 of door 442 (which is thicker (has more depth)). Accordingly, length 458 may be varied to accommodate most structures with different depths (thicknesses).

FIGS. 18A to 19D are non-limiting, exemplary illustrations of a keyless lock system in accordance with another embodiment of the present invention. Keyless lock system 100c illustrated in FIGS. 18A to 19D includes similar corresponding or equivalent components, interconnections, functional, operational, and or cooperative relationships as keyless lock systems 100, 100a, and 110b that are shown in FIGS. 1 to 17B, and described above. Therefore, for the sake of brevity, clarity, convenience, and to avoid duplication, the general description of FIGS. 18A to 19D will not repeat every corresponding or equivalent component, interconnections, functional, operational, and or cooperative relationships that has already been described above in relation to keyless lock system 100, 100a, and 100b that are shown in FIGS. 1 to 17B.

As illustrated in FIGS. 18A to 19D, in this non-limiting, exemplary embodiment, keyless lock system 100c includes lock assembly 114 that has a single hasp piece 464 rather than two piece hasp as disclosed in previous embodiments. In this non-limiting, exemplary embodiment, hasp 464 includes a connection section 366 because it is shown as connected to lock-side corner 266 of door 206. Hasp 464 may also be used without connection side 266 with the addition of connection holes 328 to be connected to one of the aligned doors 442 or 444 instead. Since in this non-limiting, exemplary embodiment hasp 464 is a single piece hasp, interlock mechanism 212 would not be tethered because hasp interlock opening 466 has no slit 292/392.

Single piece hasp 464 is connected to a first member 206 of a structure 202. Hasp 464 has hasp interlock opening 466 that is aligned with a structure main opening 248 of second member 208 of structure 202 and back plate interlock opening 224. Interlock mechanism 212 is inserted into hasp interlock opening 466 and structure and back plate openings 248/224 for locking first member 206 of structure 202 with second member 208 of structure 202.

It should be noted that in this non-limiting, exemplary instance, the single inner shroud 470 is topographically analogous to the combined inner shrouds 268/336 of the two hasp pieces of the previous embodiments when the two hasp pieces are at lock position. Further, in this non-limiting, exemplary instance, the two outer shrouds 472 are topographically analogous to the combined outer shrouds 272/352 of the two hasp pieces of the previous embodiments when the two hasp pieces are at lock position. It should be noted that with this embodiment, locking base 473 is also analogous to the combined first and second locking bases 288 and 350 of the two hasp pieces of the previous embodiments when the two hasp pieces are at lock position.

FIGS. 20A to 23N are non-limiting, exemplary illustrations of a keyless lock system in accordance with another embodiment of the present invention. Keyless lock system 100d illustrated in FIGS. 20A to 23N includes similar corresponding or equivalent components, interconnections, functional, operational, and or cooperative relationships as keyless lock systems 100, 100a, 100b, and 100c that are shown in FIGS. 1 to 19D, and described above. Therefore, for the sake of brevity, clarity, convenience, and to avoid duplication, the general description of FIGS. 20A to 23N will not repeat every corresponding or equivalent component, interconnections, functional, operational, and or cooperative relationships that has already been described above in relation to keyless lock system 100, 100a, 100b, and 100c that are shown in FIGS. 1 to 19D As illustrated in FIGS. 20A to 23D, in this non-limiting, exemplary embodiment, keyless lock system 100d includes a keyless lock assembly 500 that is mounted onto a well-known sliding door 504 of a vehicle 502 in a well-known manner. keyless lock assembly 500 includes a housing 508 (e.g., a turret like structure) that houses latching solenoid 112, power source 116, auxiliary power terminal 118, etc. Control module 110, latching solenoid (or unit) 112, power source 116, auxiliary power terminal 118 (and optionally, solar panel 516) may in aggregate be referred to as a latching system.

Figure 20A:
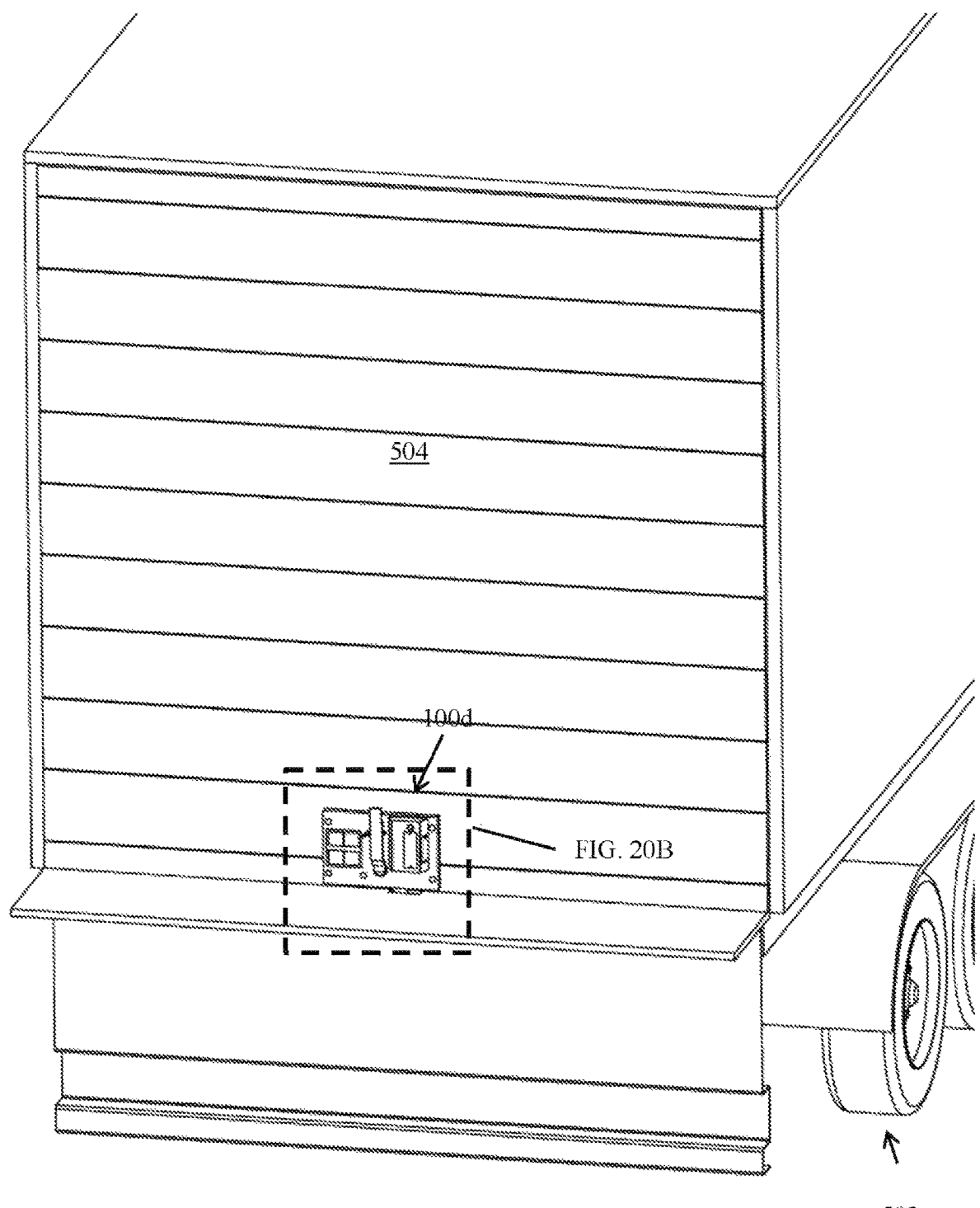
FIGS. 20A to 23N are non-limiting, exemplary illustrations of yet another keyless lock system in accordance with one or more embodiments of the present invention.
Figure 20B:
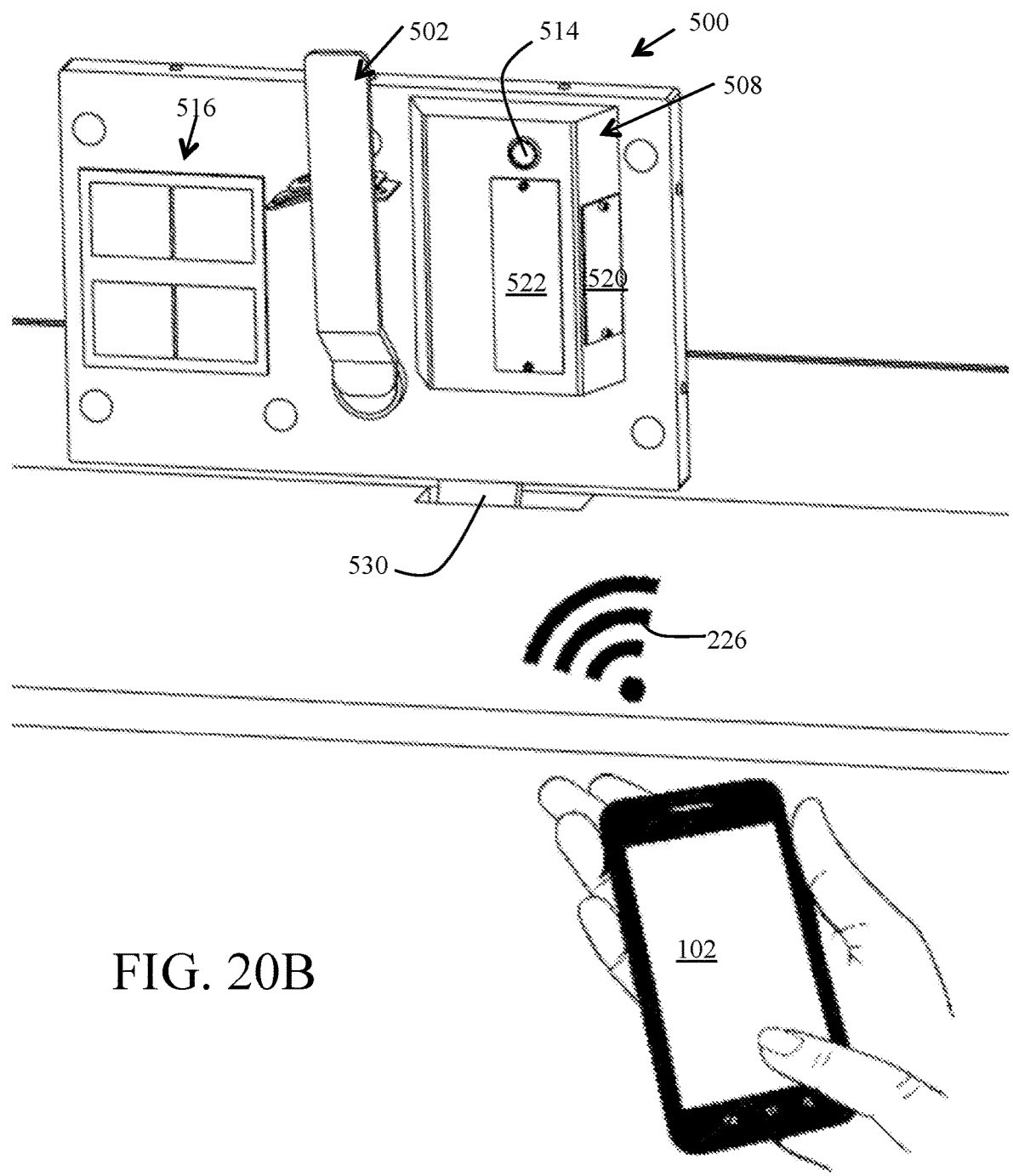

As best illustrated in FIG. 20B, computing device 102 may be used that may include a well known communications protocol such as Bluetooth, NFC, WiFi, etc. to wirelessly transmit a signal in a form of data packet 226 to control module 110 of keyless lock system 100d. As further detailed below, upon receipt of the appropriate signal (or data packet) 226 from computing device 102, control module 110 actuates latching solenoid 112 from a latched position to an unlatched position, disengaging a latch 232 (retracting the latch 232 in direction 528 shown in FIG. 21D) away from and end 526 of hook shaped lock mechanism 530 (FIG. 21D). This way, hook shaped lock mechanism 530 is free to move to an unlatched position in direction shown by arrow 533.

Figure 20C:
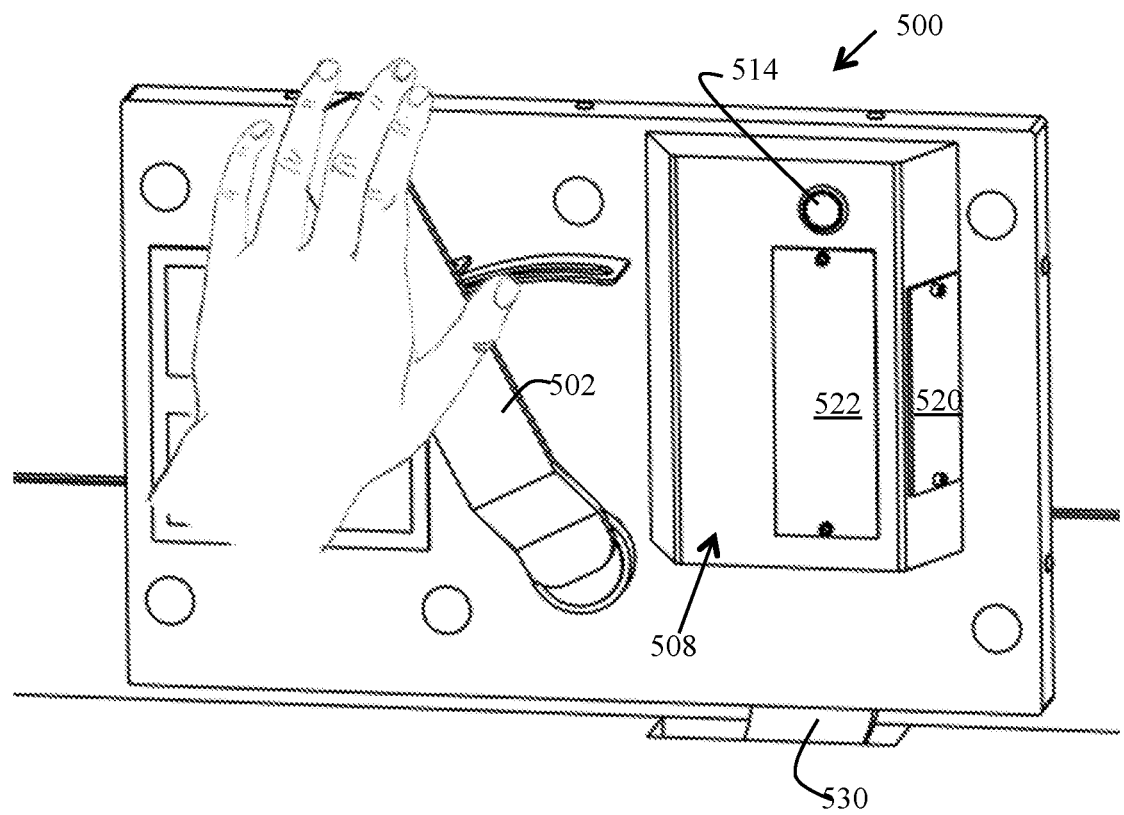
Figure 20D:
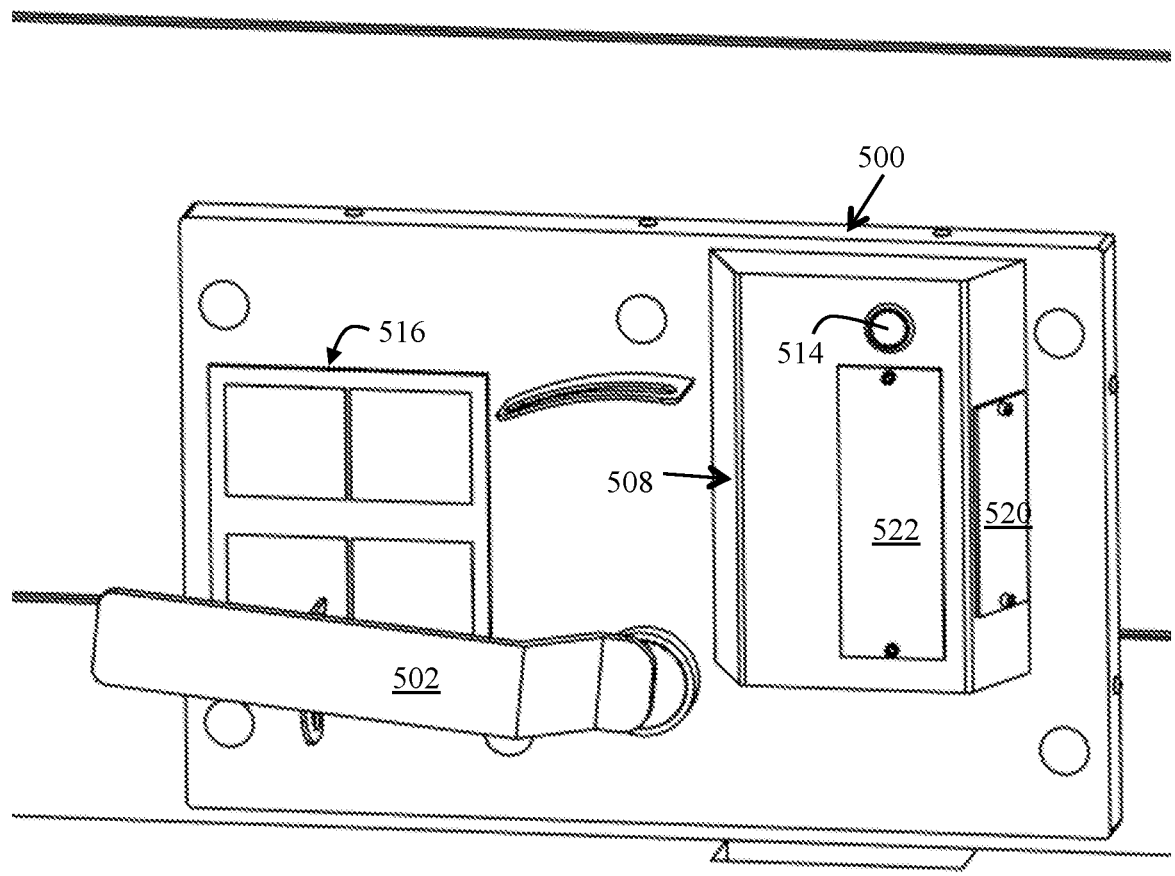
Figure 20E:
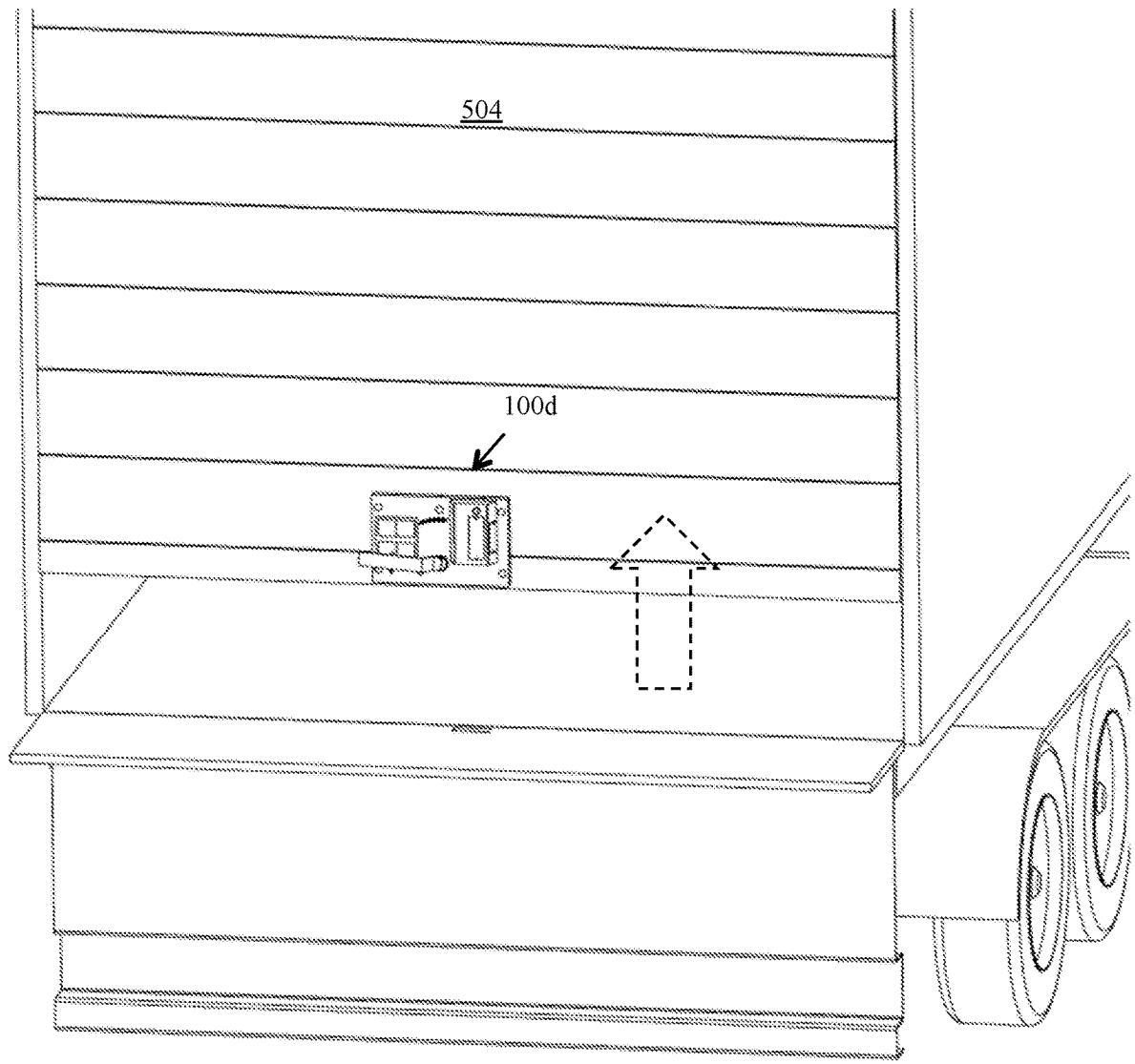

FIGS. 20C to 20E progressively illustrate a systems overview of a non-limiting, exemplary method of unlocking and opening cargo door 504 from a fully closed and locked position (FIGS. 20A) to a fully open position (FIG. 20E) in a well known manner. Accordingly, instead of using a key to unlock and open cargo door 504, a keyless lock system 100d is provided that enables keyless unlocking of keyless lock assembly 500, with keyless lock assembly 500 thereafter mechanically unlatched to an unlatched position to open cargo door 504 in well known manner.

Figure 21A:
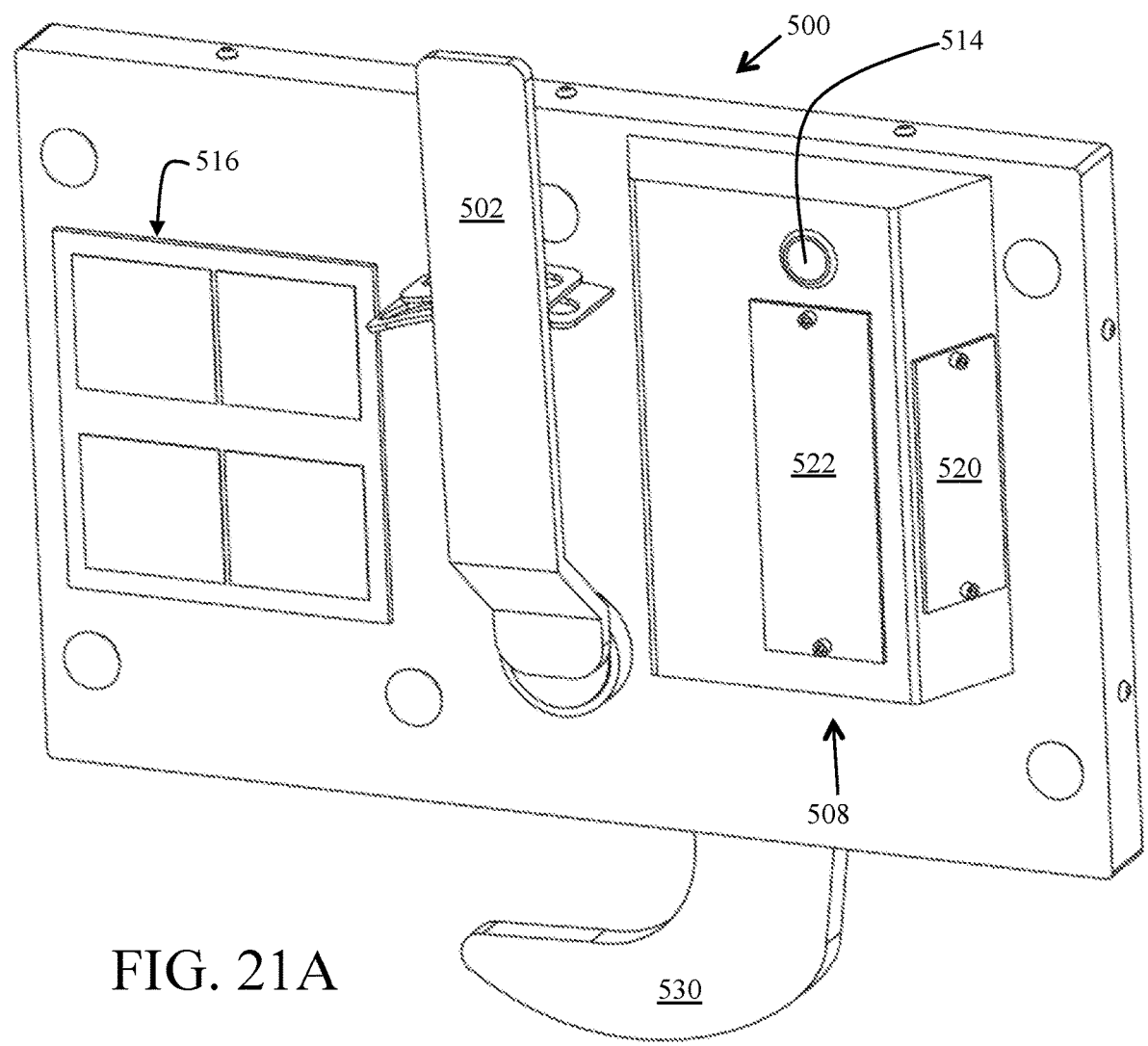
Figure 21B:
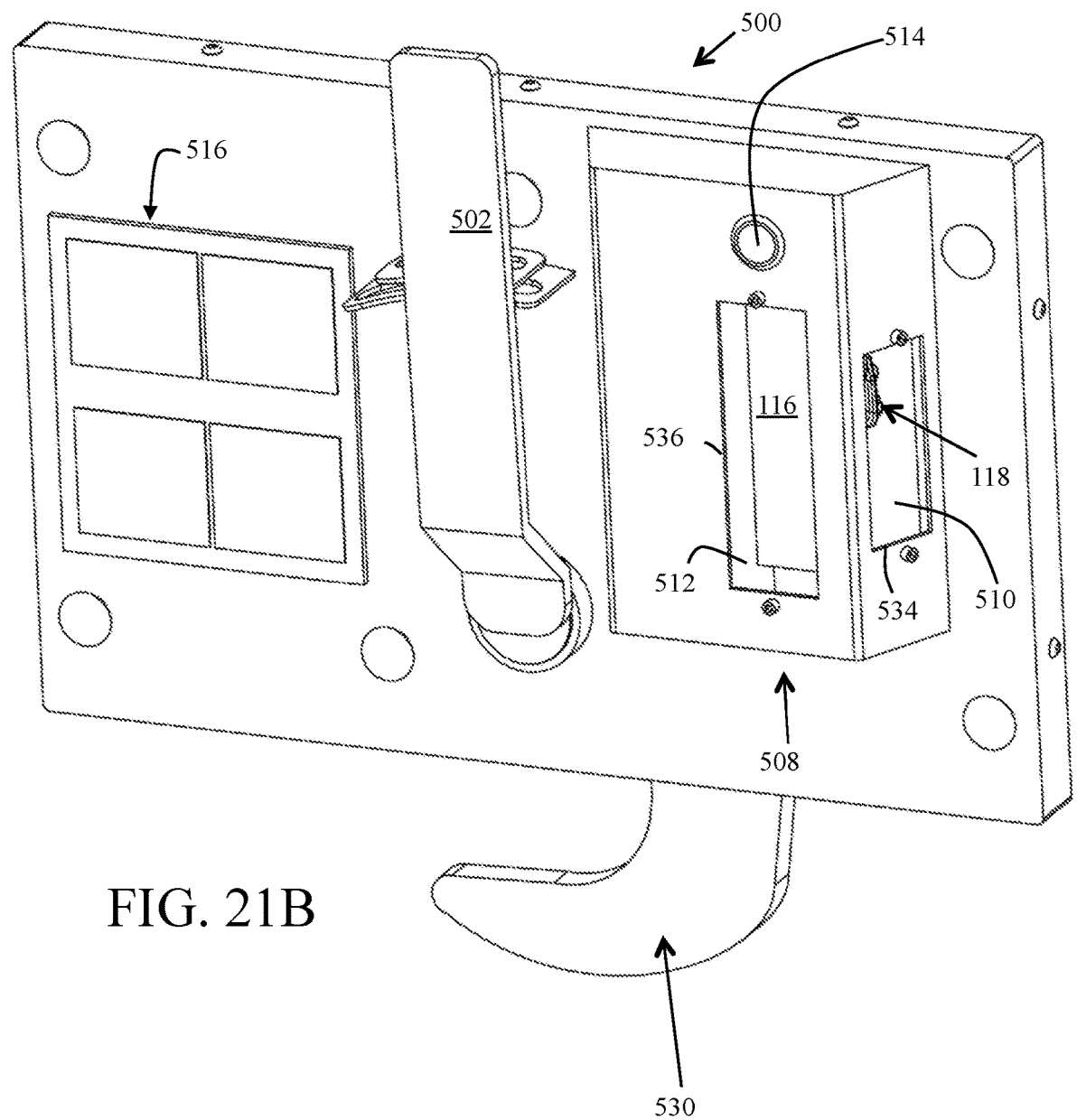

As best illustrated in FIGS. 21A and 21B, keyless lock assembly 500 includes a well-known solar panel 516 that may be used to recharge power source 116.

Housing 508 of keyless lock assembly 500 includes first access panel (or door) 520 for a first opening 534 to a first compartment 510 that houses auxiliary power terminal 118 and a second access panel (or door) 522 to a second opening 536 to a second compartment 512 for accessing power source 116. As further illustrated, in this non-limiting, exemplary instance, keyless lock system 100d further includes a wake-up feature in a form of a non-limiting, exemplary button 514 that when pressed, switches control module 110 from power saving mode (sleep mode) to active mode (wake-up mode) in a well-known manner.

Figure 21C:
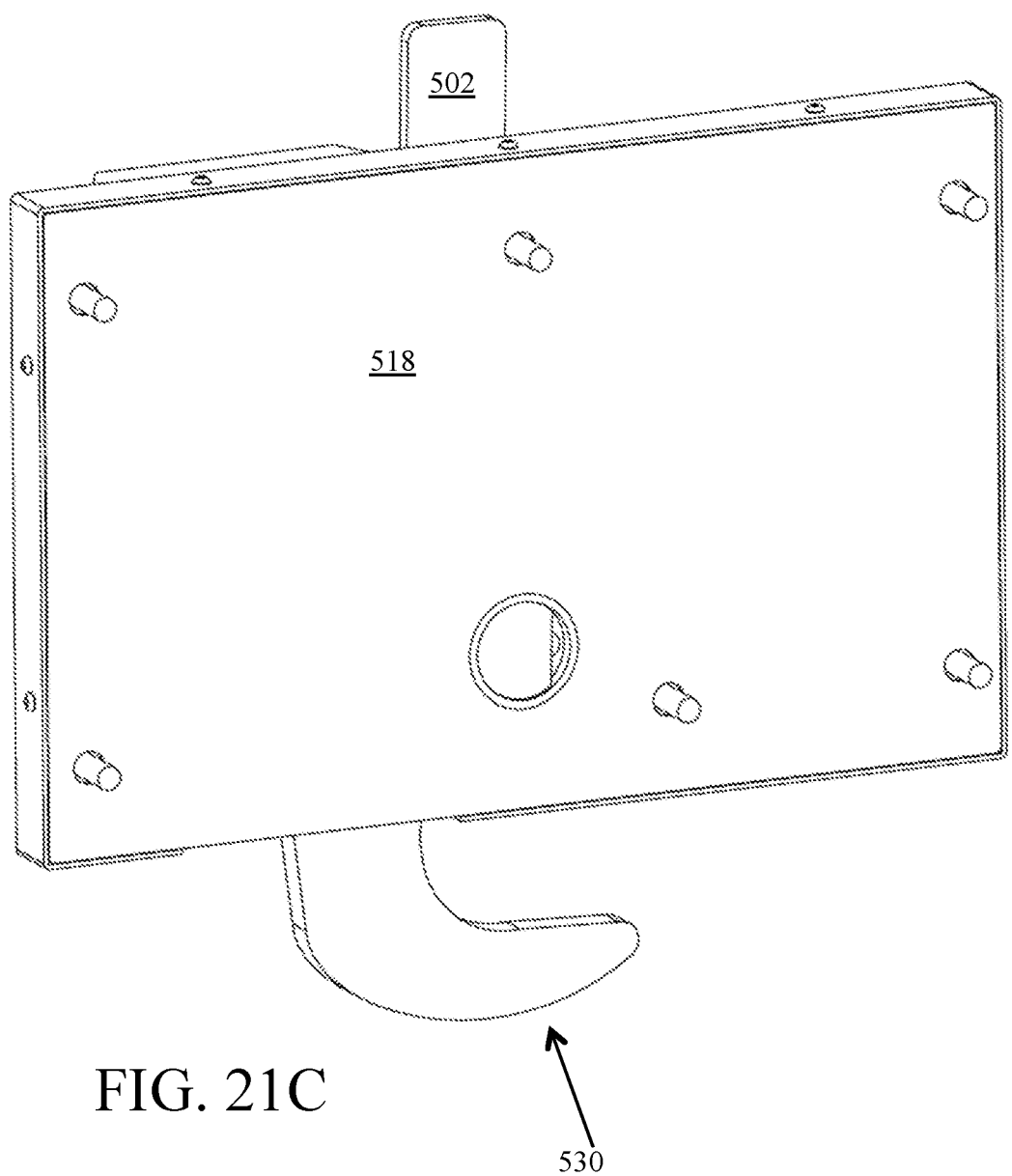
Figure 21D:
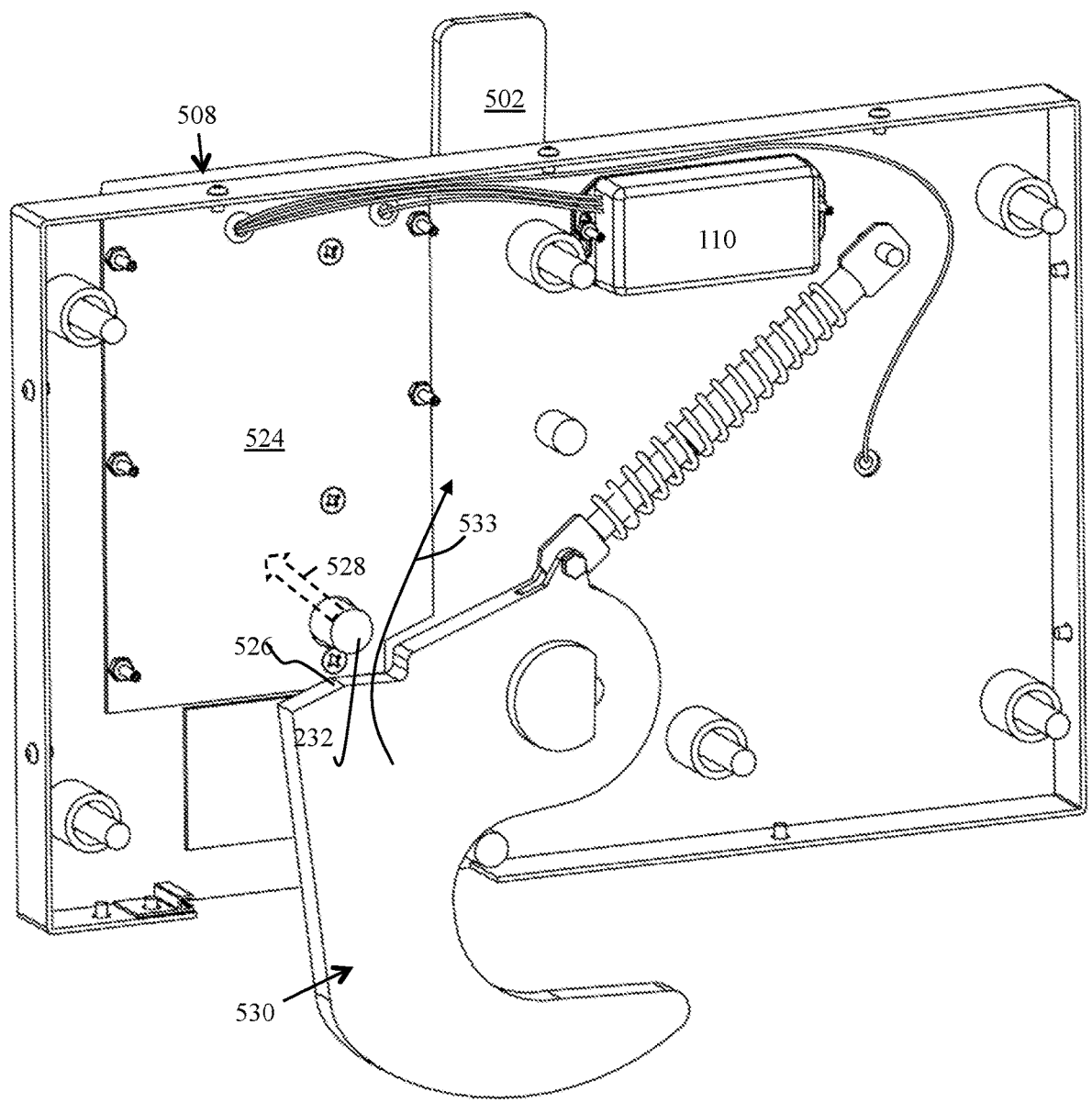
Figure 21E:
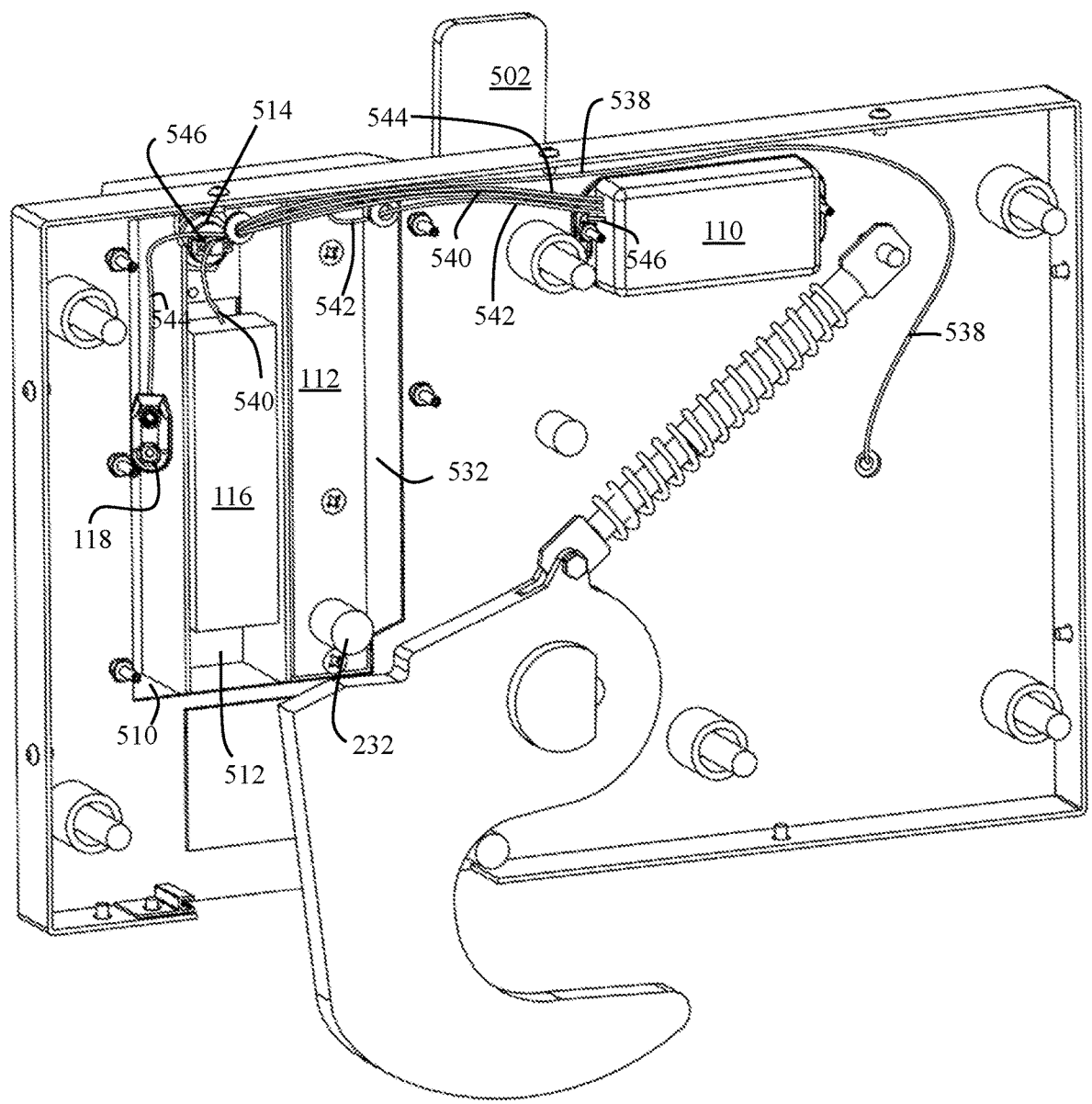

As best illustrated in FIGS. 21C to 21E, keyless lock assembly 500 includes a cover plate 518 (FIG. 21C) that when removed, provides access to keyless lock assembly 500 components, wiring, and a cover plate 524 of housing 508. As best illustrated in FIG. 21E, removing cover plate 524 provides access to back of housing 508, which houses auxiliary power terminal 118 in first compartment 510, power source 116 in second compartment 512, and latching solenoid 112 in compartment 532. As best illustrated in FIG. 21E, power charger line 538 from solar panel 516 is connected to power source 116 for charging power source 116, power line 540 from power source 116 is connected to control module 110 to power control module 110, and power and signal line 542 is connected to latching solenoid to activate solenoid latch 232. Also illustrated is an auxiliary power line 544 from auxiliary power terminal 118 connected to control module 110. A power-up/signal line 546 is also connected from "wake up" button 514 to control module 110.

Figure 22A:
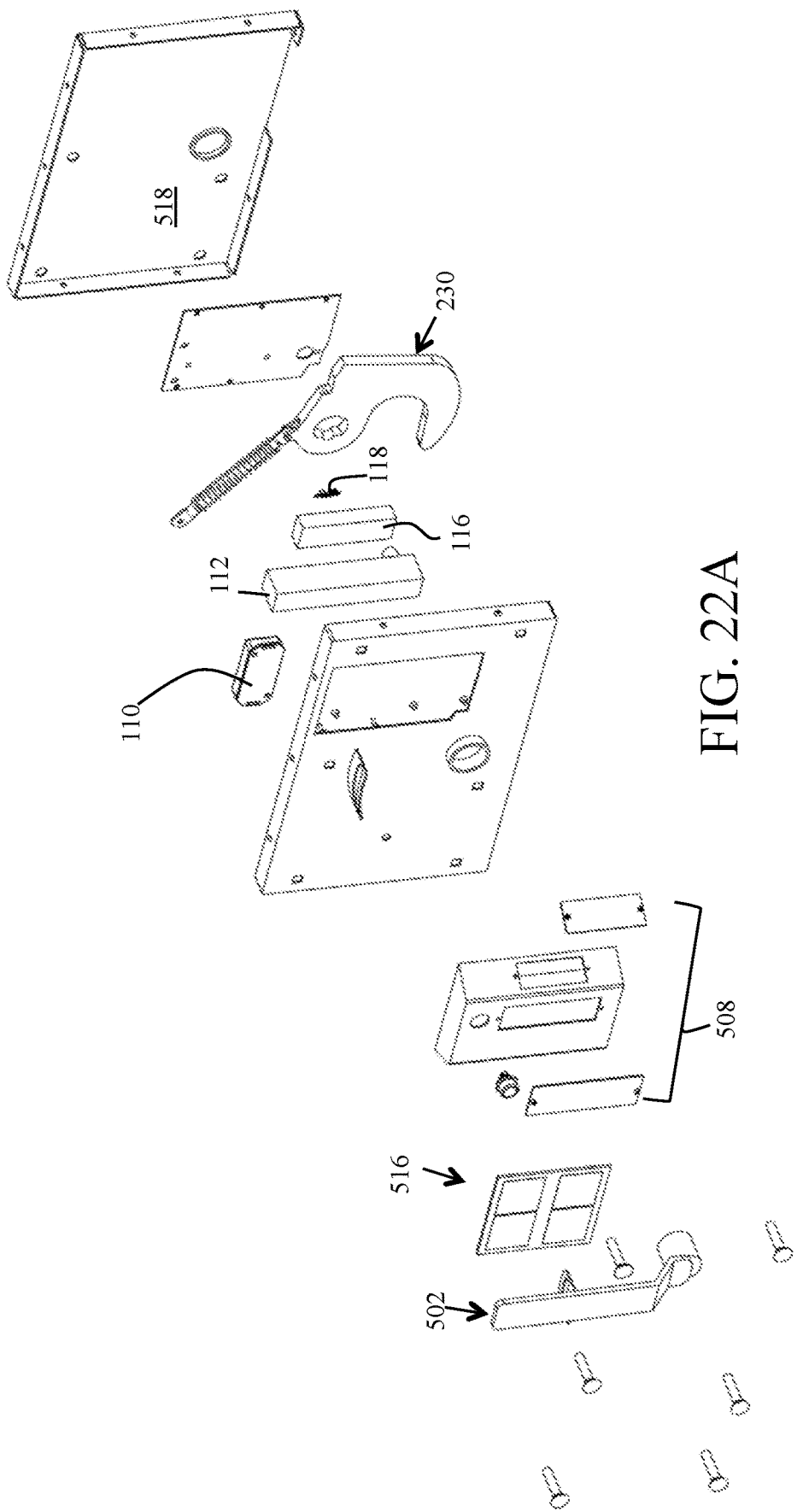
Figure 22B:
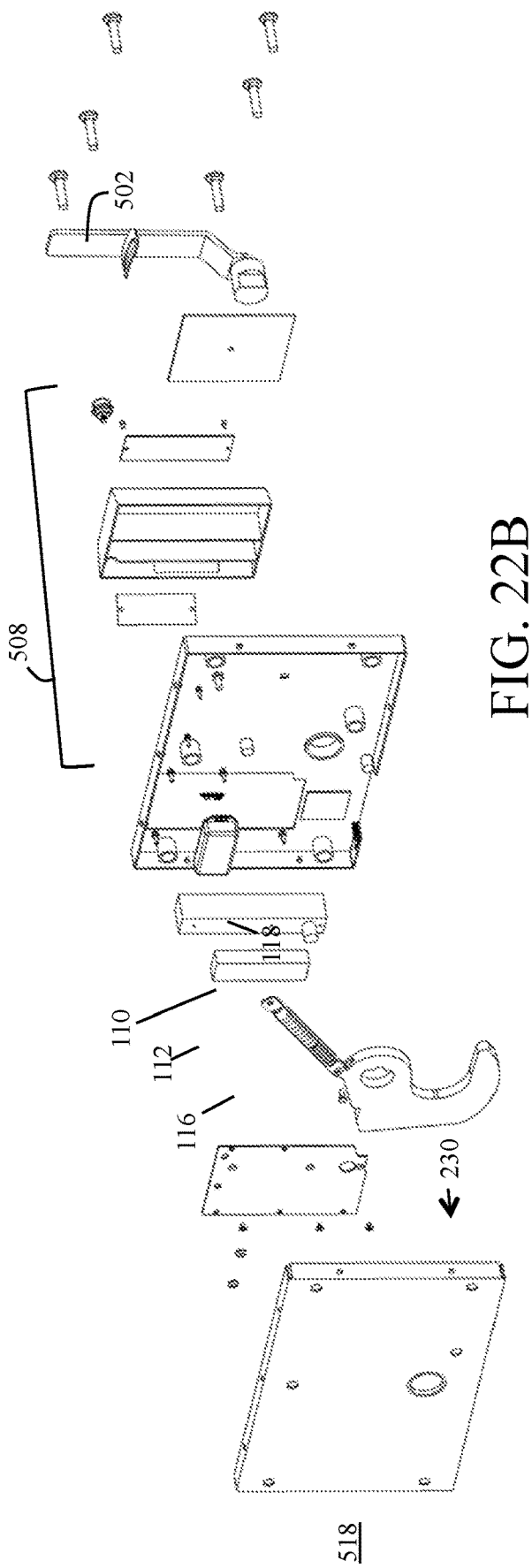
Figure 22C:
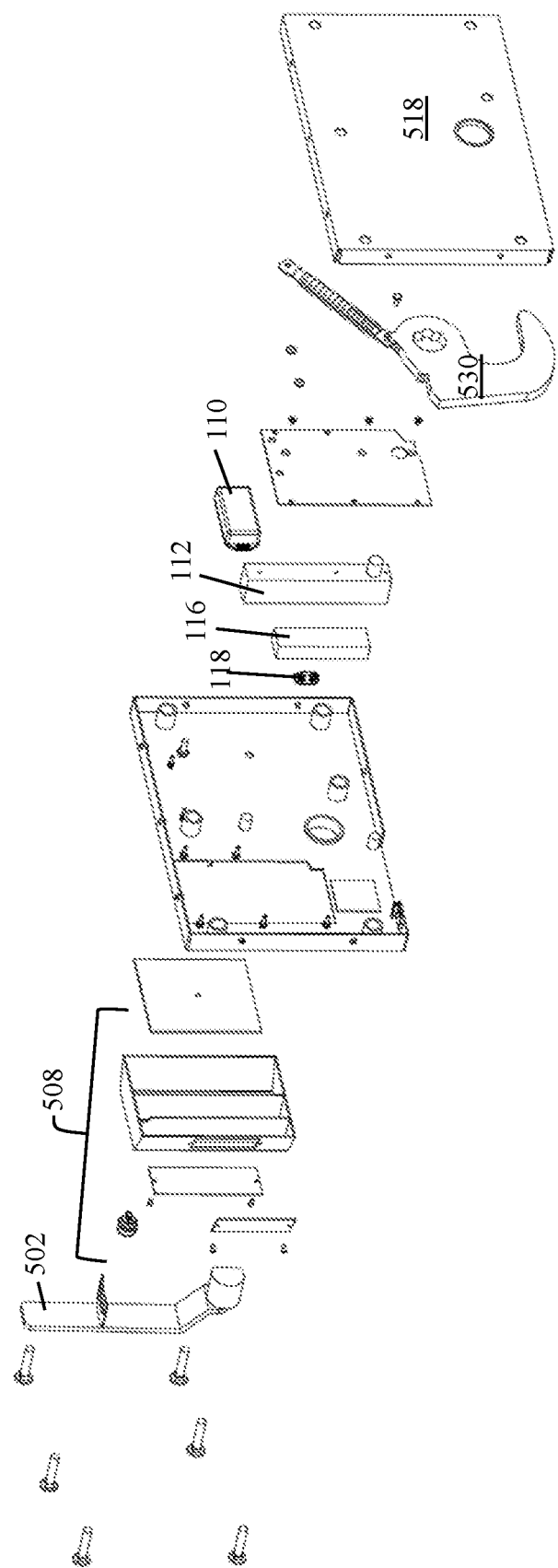

FIGS. 22A to 22C are non-limiting exemplary exploded view illustrations of the various components of the keyless lock system in accordance with one or more embodiments of the present invention. Exploded views shown in FIGS. 22A to 22C illustrate disassembled, separated components that show the cooperative working relationship, orientation, positioning, and manner of assembly of the various components of keyless lock system 100d in accordance with one or more embodiments of the present invention, with housing 508 detailed below.

Figure 23A:
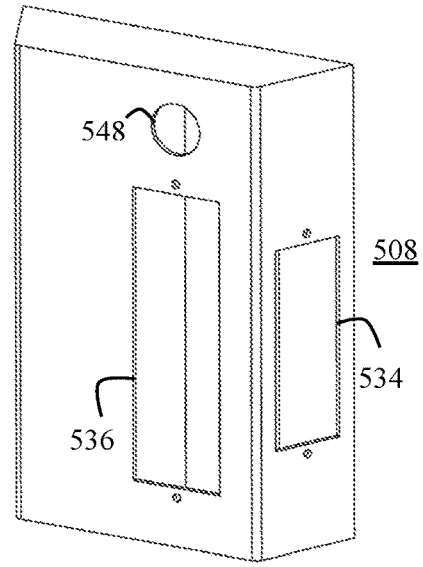
Figure 23B:
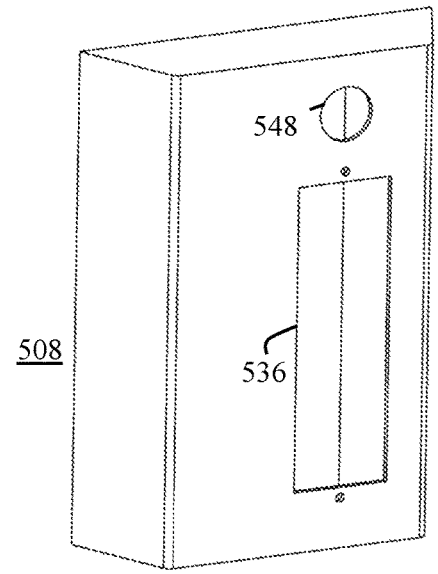
Figure 23C:
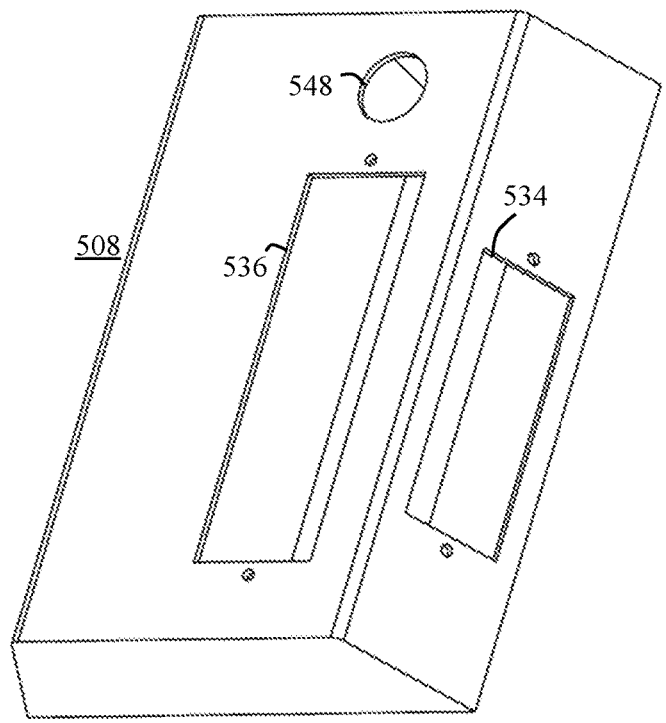
Figure 23D:
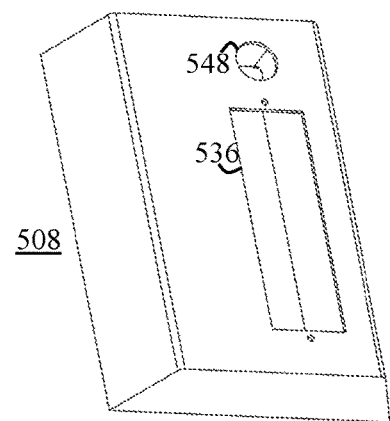
Figure 23E:
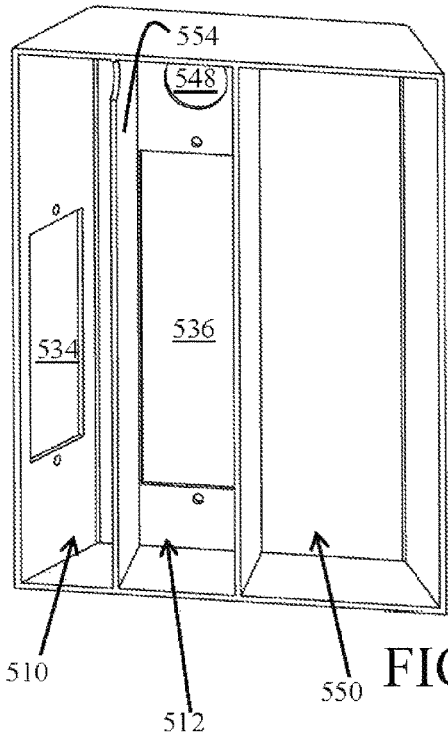
Figure 23F:
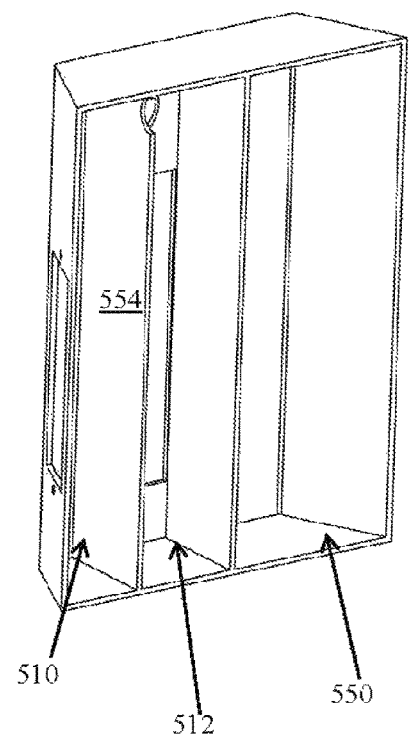
Figure 23G:
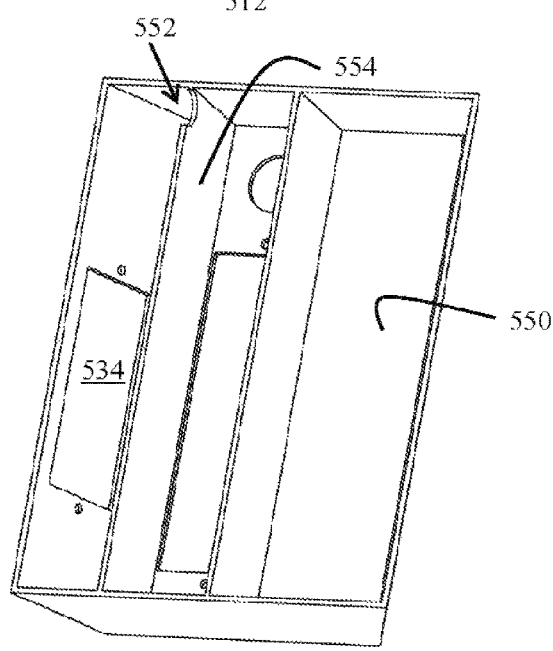
Figure 23H:
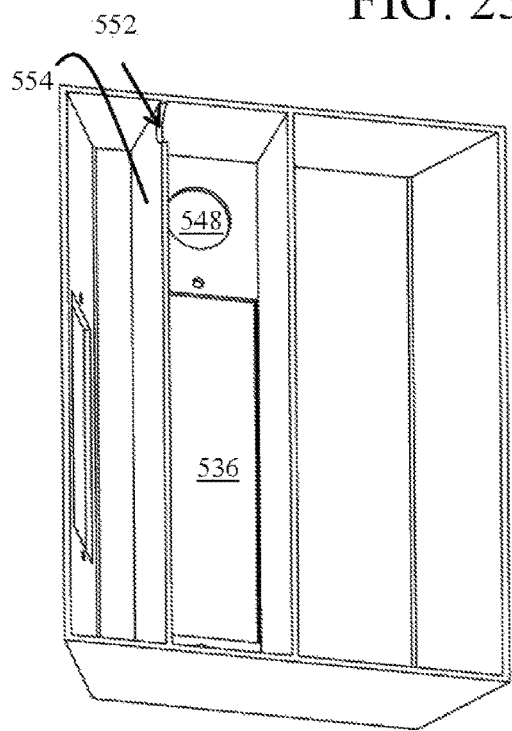

FIGS. 23A to 23N are non-limiting exemplary illustrations of the various views of the housing in accordance with one or more embodiments of the present invention. As illustrated, housing 508 of keyless lock assembly 500 includes first opening 534 to first compartment 510, second opening 536 to second compartment 512, a third opening 548 that accommodates button 514. Further included is a third compartment 550 that houses latching solenoid 112. The illustrated compartments are divided by walls, with wall 554 having a notch 552 that functions as a conduit to enable power line wiring 544 from auxiliary power terminal 118 to pass through to control module 110.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting.

Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A keyless lock system, comprising:
a casing that secures the keyless lock system;
the casing is comprised of a main panel and a main cover plate that covers a rear of the main panel, protecting the keyless lock system secured within the casing;
the casing is mounted and secured onto a sliding door of a vehicle;
the casing further includes a housing securely mounted over a housing opening of the main panel, and fixed onto an exterior side of the main panel of the casing;
the housing includes:
a trapezoidal cross section with a main side and angled first and second lateral sides;
the housing has an interior portion that is compartmentalized by interior walls into separate a first compartment, a second compartment, and a third compartment that enable individualized, separate access to the first compartment, the second compartment, and the third compartment of the housing without allowing access to an interior of the casing;
the housing further includes a housing cover plate that fully covers over and secures a rear of the first compartment, the second compartment, and the third compartment of the housing, with the housing cover plate secured to a rear of the main panel of the casing, which blocks access to inside the casing from the housing;
the first compartment separately secures an auxiliary terminal of a latching system;
the first compartment has a first front opening associated with the first lateral side secured by a first access panel to enable separate access only to the auxiliary terminal;

the second compartment separately secures a power source of the latching system;

the second compartment has a second front opening associated with the main side secured by a second access panel to enable separate access only to the power source; and the third compartment separately secures a latching solenoid of the latching system enclosed by the second lateral side;

the housing further includes an opening associated with the second compartment through which an activation switching mechanism of the latching system extends that when actuated, switches a control module of the latching system from a power saving mode to an active mode;

a handle is connected with a lock mechanism through a first handle opening of the main panel of the casing, with the lock mechanism secured within the casing;

the latching system includes the control module secured within the casing that enables the keyless lock system to network through a Communications and Control Network (CCN) via a network enabled mobile computing device for a keyless operation of the keyless lock system;

the network enabled mobile computing device transmits an unlatch signal to the control module, which actuates the latching solenoid of the latching system secured within the housing from a latched position to an unlatched position, disengaging a latch of the latching solenoid from the lock mechanism to free the lock mechanism to move to an unlatched position by the handle, with the latch securely moved from latched to unlatched positions within casing.

2. The keyless lock system as set forth in claim 1, further comprising:

a solar panel that is mounted on the main panel that recharges the power source.

3. A keyless lock system, comprising:

a casing that securely houses the keyless lock system;

the casing is mounted onto a sliding door of a vehicle;

the casing includes a housing securely mounted over a housing opening of a main panel of the casing, and fixed onto, an exterior side of the main panel;

the housing has a compartmentalized interior;

the housing includes a housing cover plate that fully covers over and secures a rear of the housing, with the housing cover plate secured to a rear of the main panel of the casing;

a first compartment of the housing separately secures an auxiliary terminal of a latching system to enable exclusive access only to the auxiliary terminal;

a second compartment of the housing separately secures a power source of the latching system to enable exclusive access only to the power source; and a third compartment of the housing separately secures a latching solenoid of the latching system;

the housing further includes an opening associated with the second compartment through which an activation switching mechanism of the latching system extends that when actuated, switches a control module of the latching system from a power saving mode to an active mode;

wherein:

the latching system includes the control module secured within the, casing that enables the keyless lock system to network through a Communications and Control Network (CCN) via a network enabled mobile computing device for a keyless operation of the keyless lock system;

the network enabled mobile computing device transmits an unlatch signal to the control module, which actuates the latching solenoid of the latching system secured within the housing from a latched position to an unlatched position, disengaging a latch of the latching solenoid from a lock mechanism to free the lock mechanism to move to an unlatched position by a handle, with the latch securely moved from latched to unlatched positions within casing.

4. A keyless lock system, comprising:

a casing that is directly mounted on a sliding door of a vehicle, and securely houses the keyless lock system;

the casing includes:

a main panel and a main cover plate, with a control module of a latching system and a lock mechanism secured within the casing, between the main panel and the main cover plate of the casing;

the main panel has an opening, with a compartmentalized housing fixed and secured to an exterior surface of the main, panel on top of the opening;

the main panel has a handle opening through which an engagement link of a handle is mechanically linked with the lock mechanism inside the casing;

the compartmentalized housing includes:

a first compartment that houses an auxiliary terminal of the latching system;

a second compartment that houses a power source of the latching system;

a third compartment that houses a latching solenoid of the latching system; and an opening through which an activation switching mechanism of the latching system extends that when actuated, switches a control module of the latching system from a power saving mode to an active mode;

wherein: the control module secured within the casing enables the keyless lock system to network through a Communications and Control Network (CCN) via a network enabled mobile computing device for a keyless operation of the keyless lock system;

the network enabled mobile computing device transmits an unlatch signal to the control module, which actuates the latching solenoid of the latching system secured within the housing from a latched position to an unlatched position, disengaging a latch of the latching solenoid from the lock mechanism to free the lock mechanism to move to an unlatched position by the handle, with the latch securely moved from latched to unlatched positions within casing.

5. The keyless lock system as set forth in claim 4, wherein:

the main panel and the main cover plate have indentations through which an interlock portion of the lock mechanism extends for direct engagement with the vehicle.

6. A keyless lock system, comprising:

a casing that is directly mounted on a sliding door of a vehicle;

the casing houses:

a latching system and a lock mechanism;

the latching system includes a control module that enables the keyless lock system to network through a Communications and Control Network (CCN) via a network enabled mobile computing device for a keyless operation of the keyless lock system;

the network enabled mobile computing device transmits an unlatch signal to the control module, which actuates a latching solenoid of the latching system from a latched position to an unlatched position, disengaging a latch of the latching solenoid from the lock mechanism to free the lock mechanism to move to an unlatched position by a handle extending out of the casing;

wherein:

the latching system further includes:

an auxiliary terminal; and a power source;

wherein: the latching solenoid, the auxiliary terminal, and the power source are housed within individual compartments of a housing mounted on the casing.

* * * * *